(12) United States Patent
Lee et al.

(10) Patent No.: US 12,552,897 B2
(45) Date of Patent: Feb. 17, 2026

(54) POLYFLUORENE-BASED IONOMER, ANION EXCHANGE MEMBRANE, METHOD FOR PREPARING THE POLYFLUORENE-BASED IONOMER AND METHOD FOR FABRICATING THE ANION EXCHANGE MEMBRANE

(71) Applicant: IUCF-HYU (INDUSTRY-UNIVERSITY COOPERATION FOUNDATION HANYANG UNIVERSITY), Seoul (KR)

(72) Inventors: Young Moo Lee, Seoul (KR); Nanjun Chen, Seoul (KR); Ho Hyun Wang, Seoul (KR); Sun Pyo Kim, Seoul (KR)

(73) Assignee: IUCF-HYU (INDUSTRY-UNIVERSITY COOPERATION FOUNDATION HANYANG UNIVERSITY), Seoul (KR)

(*) Notice: Subject to any disclaimer, the term of this patent is extended or adjusted under 35 U.S.C. 154(b) by 908 days.

(21) Appl. No.: 17/782,548

(22) PCT Filed: Nov. 9, 2020

(86) PCT No.: PCT/KR2020/015649
§ 371 (c)(1),
(2) Date: Jun. 3, 2022

(87) PCT Pub. No.: WO2021/112420
PCT Pub. Date: Jun. 10, 2021

(65) Prior Publication Data
US 2023/0038279 A1 Feb. 9, 2023

(30) Foreign Application Priority Data

Dec. 6, 2019 (KR) .................. 10-2019-0161187
Jul. 28, 2020 (KR) .................. 10-2020-0093640

(51) Int. Cl.
| | | |
|---|---|---|
| C08G 61/12 | (2006.01) | |
| C08J 5/22 | (2006.01) | |
| C25B 13/08 | (2006.01) | |
| H01M 4/86 | (2006.01) | |
| H01M 8/1004 | (2016.01) | |
| C25B 1/04 | (2021.01) | |

(52) U.S. Cl.
CPC .......... *C08G 61/122* (2013.01); *C08J 5/2262* (2013.01); *C25B 13/08* (2013.01); *H01M 4/8668* (2013.01); *H01M 8/1004* (2013.01); *C08G 2261/12* (2013.01); *C08G 2261/146* (2013.01); *C08G 2261/312* (2013.01); *C08G 2261/3142* (2013.01); *C08G 2261/3221* (2013.01); *C08J 2365/00* (2013.01); *C25B 1/04* (2013.01)

(58) Field of Classification Search
None
See application file for complete search history.

(56) References Cited

U.S. PATENT DOCUMENTS

| | | |
|---|---|---|
| 5,876,864 A | 3/1999 | Kim et al. |
| 2019/0027768 A1* | 1/2019 | Miyatake ............... C08J 5/2262 |

FOREIGN PATENT DOCUMENTS

| | | |
|---|---|---|
| CN | 104829814 A | 8/2015 |
| CN | 107910576 A | 4/2018 |
| CN | 109384908 A | 2/2019 |
| KR | 10-2018-0121961 A | 11/2018 |
| WO | 2019/068051 A2 | 4/2019 |

OTHER PUBLICATIONS

Olsson, J. S. et al., "Tuning poly(arylene piperidinium) anion-exchange membranes by copolymerization, partial quaternization and crosslinking", Journal of membrane science. vol. 578, [online] Jan. 19, 2019, pp. 183-195.
Wang, J. et al., "Poly(aryl piperidinium) membranes and ionomers for hydroxide exchange membrane fuel cells", Nature energy. [online] Apr. 8, 2019, vol. 4, No. 5, inner pp. 1-7.
Maury A, S. et al., "Rational design of polyaromatic ionomers for alkaline membrane fuel cells with> I W cm-2 power density", Energy & Environmental Science. 2018, vol. 11, No. 11, inner pp. 1-11.

* cited by examiner

*Primary Examiner* — Fred M Teskin
(74) *Attorney, Agent, or Firm* — NKL Law; Jae Youn Kim

(57) ABSTRACT

A novel polyfluorene-based ionomer, an anion exchange membrane, a method for preparing the polyfluorene-based ionomer, and a method for fabricating the anion exchange membrane are proposed. The polyfluorene-based ionomer contains no aryl ether bonds in the polymer backbone and includes piperidinium groups incorporated into the repeating units. The anion exchange membrane is fabricated from the polyfluorene-based ionomer. The anion exchange membrane has good thermal and chemical stability, excellent mechanical properties, and high ion conductivity. Due to these advantages, the anion exchange membrane can be applied as a membrane for an alkaline fuel cell and to a binder for an alkaline fuel cell or water electrolysis.

15 Claims, 62 Drawing Sheets

POLYFLUORENE-BASED IONOMER, ANION EXCHANGE MEMBRANE, METHOD FOR PREPARING THE POLYFLUORENE-BASED IONOMER AND METHOD FOR FABRICATING THE ANION EXCHANGE MEMBRANE

TECHNICAL FIELD

The present invention relates to a novel polyfluorene-based ionomer, an anion exchange membrane, a method for preparing the polyfluorene-based ionomer, and a method for fabricating the anion exchange membrane. More specifically, the present invention relates to a technology for synthesizing an aromatic polyfluorene-based ionomer containing no aryl ether bonds in the polymer backbone and including piperidinium groups incorporated into the repeating units, fabricating the aromatic polyfluorene-based ionomer into an anion exchange membrane, and applying the anion exchange membrane to an alkaline fuel cell and a water electrolysis device.

BACKGROUND ART

Polymer electrolyte membrane fuel cells (PEMFCs) have been investigated so far because of their advantages, including relatively high current density and environmental friendliness. Particularly, perfluorocarbon-based proton exchange membranes, typified by Nafion membranes, were mainly used as polymer electrolyte membranes. Nafion membranes possess the advantages of good chemical stability and high ion conductivity, but they are quite expensive and have low glass transition temperature. Thus, considerable research efforts have been made to develop electrolyte membranes as replacements for Nafion membranes as well as aromatic hydrocarbon-based polymer electrolyte membranes.

Recent attention has been paid to the use of anion exchange membranes for alkaline membrane fuel cells (AMFCs). Particularly, it is known that alkaline membrane fuel cells can use inexpensive non-noble metals such as nickel and manganese as electrode catalysts instead of platinum. Alkaline membrane fuel cells are also known to have higher performance and be much more price competitive than polymer electrolyte membrane fuel cells. Due to these advantages, continued research has focused on alkaline membrane fuel cells.

A method for synthesizing a polyarylethersulfone-based aromatic polymer structure as a material for an anion exchange membrane for an alkaline membrane fuel cell is known. The polyarylethersulfone-based aromatic polymer structure contains quaternary salts introduced therein and includes repeating units having aryl ether (C—O) bonds along its main chain. The formation of the repeating units leads to improved solubility of the polymer. However, the presence of the aryl ether bonds in the main chain of the polymer is accompanied by decomposition behavior of hydroxyl radicals in the electrolyte membrane during operation of the fuel cell, leading to poor long-term stability. Thus, preventing degradation of the polymer main chain is a prerequisite for improving the durability of the alkaline membrane fuel cell.

It is known that the use of an aryl ether bond-free aromatic polymer can improve the chemical stability of an anion exchange membrane for an alkaline membrane fuel cell. Thus, the polymer electrolyte is imparted with desirable characteristics of the aromatic polymer backbone, such as high glass transition temperature, impact strength, toughness, and thermal/chemical/mechanical stability, and low water uptake compared to polyolefin-based electrolytes. Good stability of cations incorporated into the aromatic polymer as well as alkaline stability of the aromatic polymer backbone structure contributes to long-term durability. Tetraalkylammonium, benzyltrimethylammonium, and piperidinium cations are known to be incorporated into the aromatic polymer.

However, there has been no specific report on a technology for synthesizing an aromatic polyfluorene-based ionomer containing no aryl ether bonds in the polymer backbone and including piperidinium groups incorporated into the repeating units and applying the aromatic polyfluorene-based ionomer as a membrane for an alkaline fuel cell and to a binder for an alkaline fuel cell or water electrolysis.

Under these circumstances, the present inventors have conducted continuous research to extend the application of aromatic polymer ion exchange membranes with good thermal and chemical stability and excellent mechanical properties, and as a result, found that an anion exchange membrane fabricated from an aromatic polyfluorene-based ionomer containing no aryl ether bonds in the polymer backbone and including piperidinium groups incorporated into the repeating units can be applied as a membrane for an alkaline fuel cell and to a binder for an alkaline fuel cell or a water electrolysis device. The present invention has been accomplished based on this finding.

PRIOR ART DOCUMENTS

Patent Documents

Patent Document 1: Korean Patent Publication No. 10-2018-0121961
Patent Document 2: PCT International Publication No. WO 2019/068051

DETAILED DESCRIPTION OF THE INVENTION

Problems to be Solved by the Invention

The present invention has been made in an effort to solve the above problems, and a first object of the present invention is to provide a novel polyfluorene-based ionomer with good thermal and chemical stability, excellent mechanical properties, and high ion conductivity and a method for preparing the polyfluorene-based ionomer.

A second object of the present invention is to fabricate an anion exchange membrane using the novel polyfluorene-based ionomer and apply the anion exchange membrane as a membrane for an alkaline fuel cell and to a binder for an alkaline fuel cell or a water electrolysis device.

Means for Solving the Problems

One aspect of the present invention provides a polyfluorene-based ionomer having repeating units, represented by Formula 1:

[Formula 1]

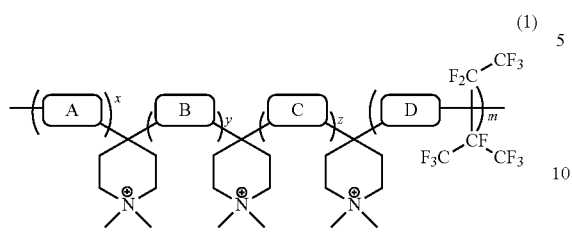

wherein the segments A, B, C, and D are identical to or different from each other and are each independently selected from

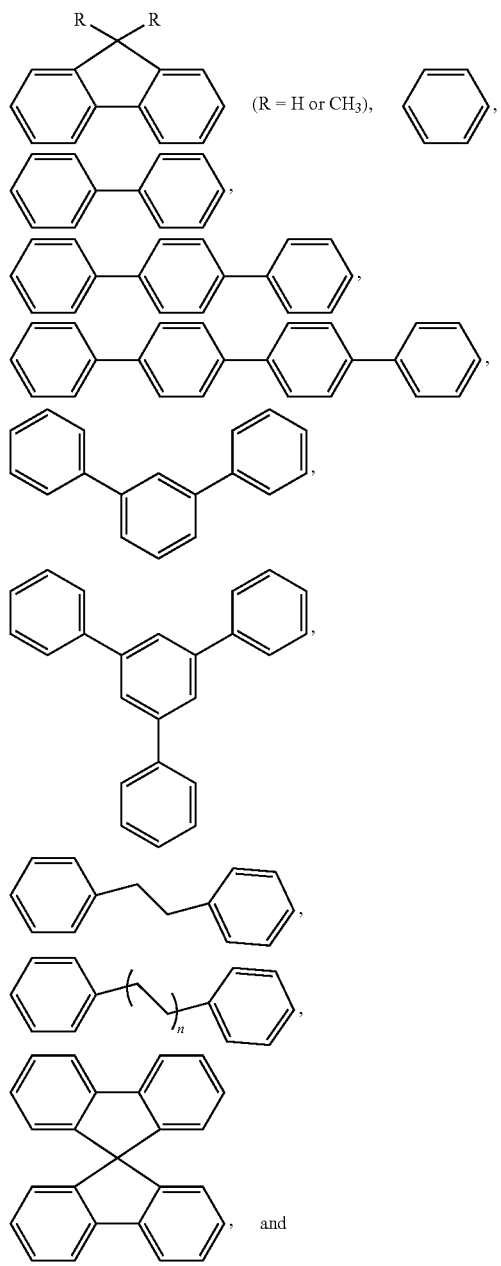

and

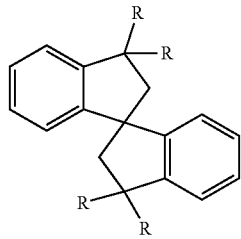

(R=H or CH₃), with the proviso that at least one of the segments is

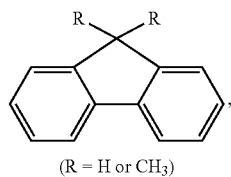

(R = H or CH₃)

and the sum of x, y, z, and m representing the mole fractions of the corresponding repeating units is 1.

The present invention also provides a method for preparing a polyfluorene-based ionomer, including: (I) dissolving fluorene or 9,9'-dimethylfluorene and 1-methyl-4-piperidone or fluorene or 9,9'-dimethylfluorene, 1-methyl-4-piperidone, and a compound selected from or 1,1,1,2,2,4,5,5,5-nonafluoro-4-(trifluoromethyl)-3-pentanone as a comonomer in an organic solvent;

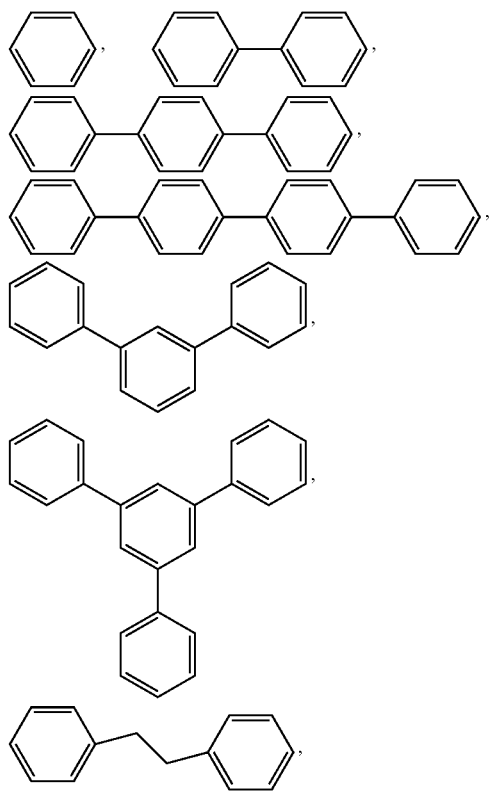

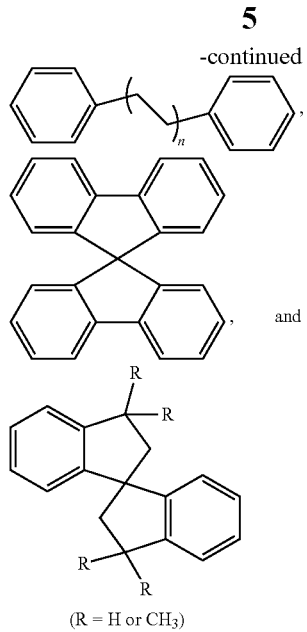

(R = H or CH₃)

(II) slowly adding a strong acid catalyst to the solution and allowing the mixture to react with stirring to obtain a viscous solution; (III) precipitating the viscous solution and washing and drying the precipitate to obtain a solid polymer; (IV) dissolving the solid polymer in an organic solvent, adding $K_2CO_3$ and an excess of a halomethane to the polymer solution, and allowing the mixture to react to form quaternary piperidinium salts; and (V) precipitating the polymer solution and washing and drying the precipitate.

The present invention also provides an anion exchange membrane including the polyfluorene-based ionomer.

The present invention also provides a method for fabricating an anion exchange membrane, including: (a) dissolving the polyfluorene-based ionomer in an organic solvent; (b) casting and drying the polymer solution on a glass plate to obtain a membrane; and (c) treating the membrane with 1 M NaOH, 1 M NaCl or 1 M $Na_2CO_3$, followed by washing with ultrapure water and drying.

The present invention also provides a binder for an alkaline fuel cell including the polyfluorene-based ionomer.

The present invention also provides a membrane electrode assembly for an alkaline fuel cell including the anion exchange membrane.

The present invention also provides an alkaline fuel cell including the anion exchange membrane.

The present invention also provides a water electrolysis device including the anion exchange membrane.

Effects of the Invention

The aromatic polyfluorene-based ionomer of the present invention contains no aryl ether bonds in the polymer backbone and includes piperidinium groups incorporated into the repeating units. The anion exchange membrane fabricated from the aromatic polyfluorene-based ionomer can be applied as a membrane for an alkaline fuel cell and to a binder for an alkaline fuel cell or water electrolysis due to its good thermal and chemical stability, excellent mechanical properties, and high ion conductivity.

BRIEF DESCRIPTION OF THE DRAWINGS

(FIG. 4A) water uptakes of the membranes in OH⁻ form in water; (FIG. 4B) swelling ratios of the membranes in OH⁻ form in water; (FIG. 4C) water uptakes of the membranes in Cl⁻ form in water; and (FIG. 4D) water sorption amounts of the ionomers in OH⁻/$CO_3^{2-}$ mix forms at different relative humidities.

(FIG. 22B).

MODE FOR CARRYING OUT THE INVENTION

Figure 1A:
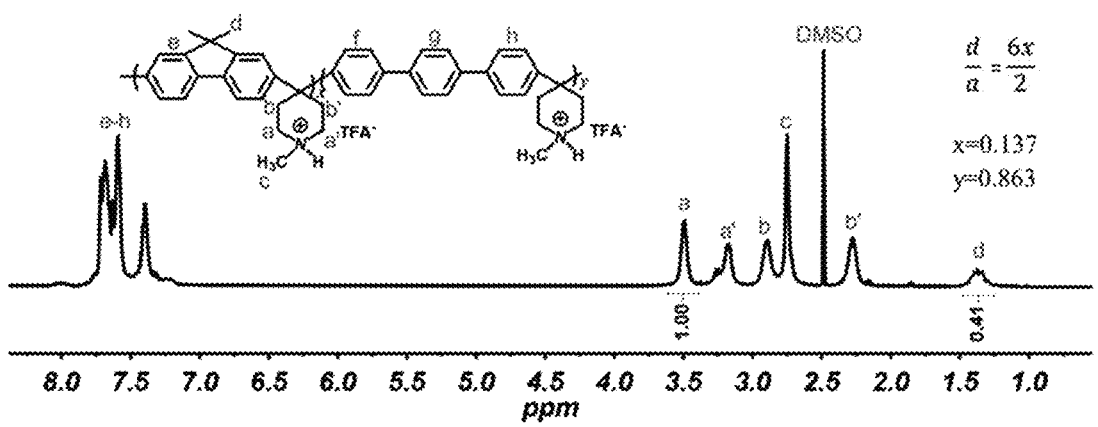
FIGS. 1A and 1B show proton nuclear magnetic resonance (¹H NMR) spectra of PFTM (FIG. 1A) and PFTP (FIG. 1B) prepared in Example 1.

A novel polyfluorene-based ionomer, an anion exchange membrane, a method for preparing the polyfluorene-based ionomer, and a method for fabricating the anion exchange membrane according to the present invention will now be described in detail.

The present invention provides a polyfluorene-based ionomer having repeating units, represented by Formula 1:

[Formula 1]

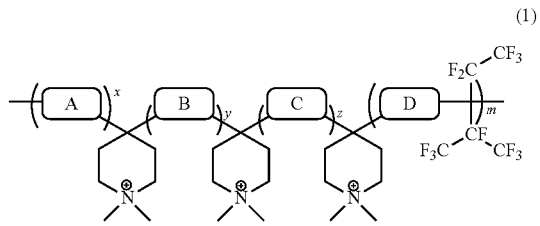

(1)

wherein the segments A, B, C, and D are identical to or different from each other and are each independently selected from

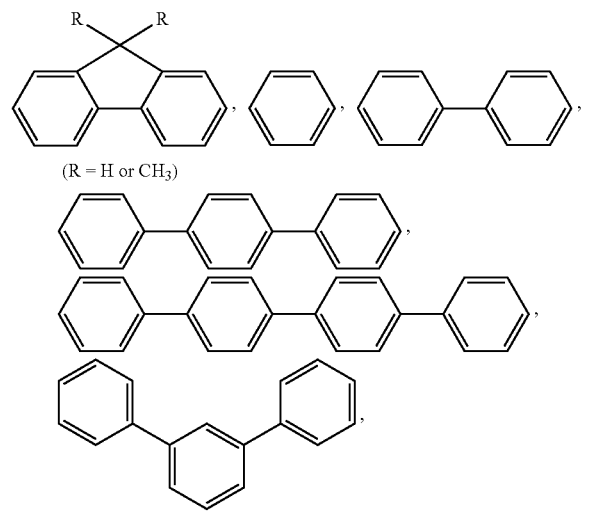

(R = H or CH₃)

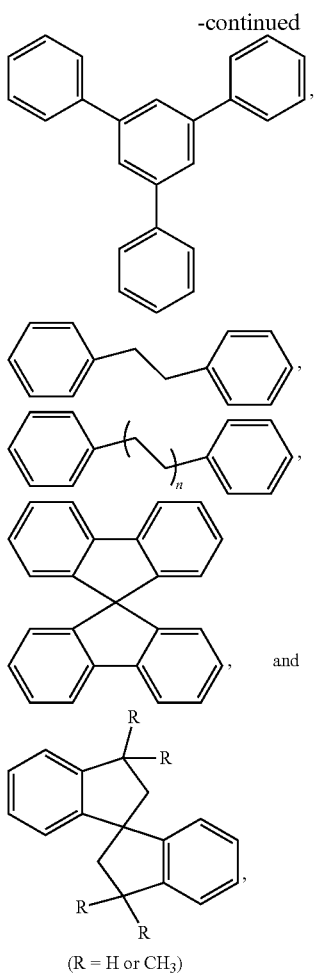

and

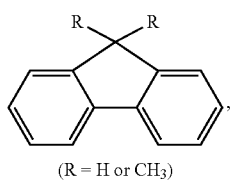

(R = H or CH₃)

with the proviso that at least one of the segments is

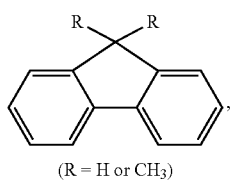

(R = H or CH₃)

and the sum of x, y, z, and m representing the mole fractions of the corresponding repeating units is 1.

Generally, fluorene-based polymers tend to have relatively poor film-forming properties and mechanical properties. In contrast, the novel polyfluorene-based ionomer of the present invention has greatly improved film-forming properties and mechanical properties due to the presence of various rotatable phenyl-based blocks in the polymer backbone, as depicted in Formula 1. The phenyl-based blocks represented by Formula 1 may be selected from phenyl, biphenyl, terphenyl, and quaterphenyl.

The polyfluorene-based ionomer represented by Formula 1 contains no aryl ether bonds in the polymer backbone and includes piperidinium groups incorporated into the repeating units. Due to this structure, the polyfluorene-based ionomer is highly stable even in alkaline media and has high ion conductivity.

The present invention also provides a method for preparing a polyfluorene-based ionomer, including: (I) dissolving fluorene or 9,9'-dimethylfluorene and 1-methyl-4-piperidone or fluorene or 9,9'-dimethylfluorene, 1-methyl-4-piperidone, and a compound selected from or 1,1,1,2,2,4,5,5,5-nonafluoro-4-(trifluoromethyl)-3-pentanone as a comonomer in an organic solvent;

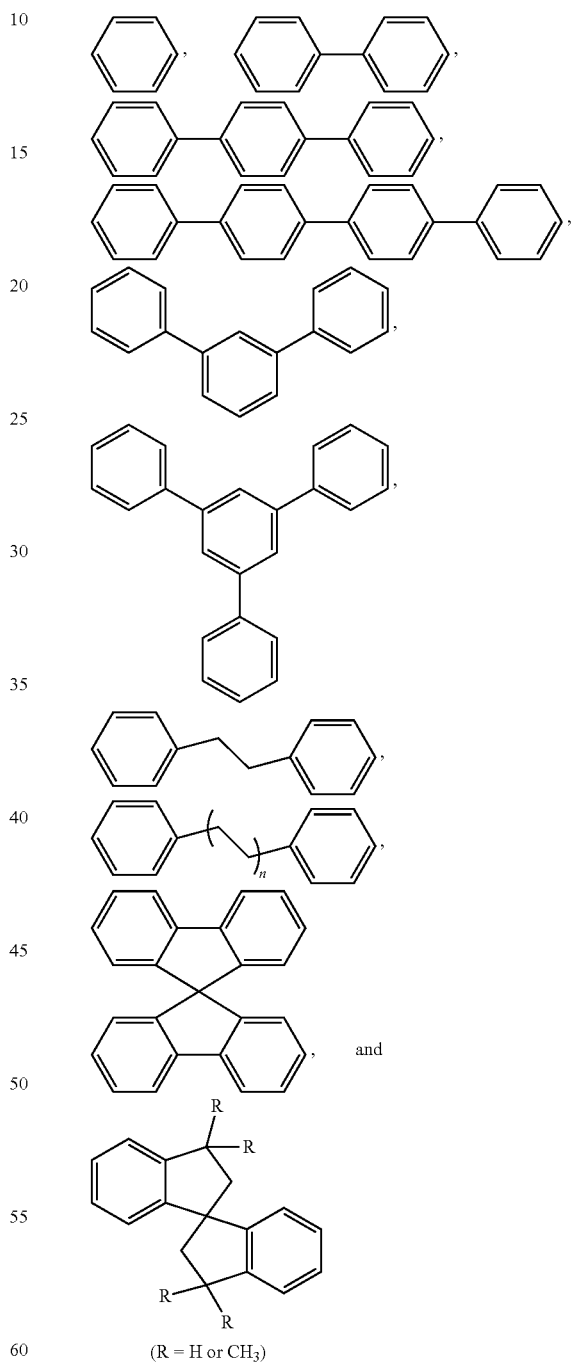

(R = H or CH₃)

(II) slowly adding a strong acid catalyst to the solution and allowing the mixture to react with stirring to obtain a viscous solution; (III) precipitating the viscous solution and washing and drying the precipitate to obtain a solid polymer; (IV) dissolving the solid polymer in an organic solvent, adding $K_2CO_3$ and an excess of a halomethane to the polymer solution, and allowing the mixture to react to form quaternary piperidinium salts; and (V) precipitating the polymer solution and washing and drying the precipitate.

First, fluorene or 9,9'-dimethylfluorene as a monomer and 1-methyl-4-piperidone are allowed to react with each other to prepare a polyfluorene-based polymer. Alternatively, fluorene or 9,9'-dimethylfluorene as a monomer, 1-methyl-4-piperidone, and a compound represented by one of the above structural formulae or 1,1,1,2,2,4,5,5,5-nonafluoro-4-(trifluoromethyl)-3-pentanone as a comonomer may be allowed to react with each other to prepare a polyfluorene-based polymer having various segments, including fluorene-based segments and segments based on the compound represented by one of the above structural formulae.

Subsequently, the polyfluorene-based polymer is allowed to react with a halomethane to prepare the desired polyfluorene-based ionomer in which quaternary piperidinium salts are formed.

The organic solvent used in step (I) may be at least one halogenated solvent selected from the group consisting of dichloromethane, chloroform, dichloroethane, dibromomethane, and tetrachloroethane. Dichloromethane is preferably used.

The strong acid catalyst used in step (II) is trifluoroacetic acid, trifluoromethanesulfonic acid, pentafluoroethanesulfonic acid, heptafluoro-1-propanesulfonic acid, perfluoropropionic acid, heptafluorobutyric acid or a mixture thereof. A mixture of trifluoroacetic acid and trifluoromethanesulfonic acid is preferably used.

The organic solvent used in step (IV) is preferably a mixture of N-methylpyrrolidone, dimethylacetamide, dimethyl sulfoxide or dimethylformamide and trifluoroacetic acid as a cosolvent.

In step (IV), the polymer is allowed to react with a halomethane to form quaternary piperidinium salts. The halomethane may be fluoromethane, chloromethane, bromomethane or iodomethane. Iodomethane is preferably used.

The present invention also provides an anion exchange membrane including the polyfluorene-based ionomer.

The present invention also provides a method for fabricating an anion exchange membrane, including: (a) dissolving the polyfluorene-based ionomer in an organic solvent; (b) casting and drying the polymer solution on a glass plate to obtain a membrane; and (c) treating the membrane with 1 M NaOH, 1 M NaCl or 1 M $Na_2CO_3$, followed by washing with ultrapure water and drying.

The organic solvent used in step (a) may be N-methylpyrrolidone, dimethylacetamide, dimethyl sulfoxide or dimethylformamide.

The polymer solution preferably has a concentration of 2 to 5% by weight, more preferably 3.0 to 3.5% by weight. If the concentration of the polymer solution is lower than 2% by weight, the ability of the polymer solution to form a membrane may be deteriorated. Meanwhile, if the concentration of the polymer solution exceeds 5% by weight, the viscosity of the polymer solution may become too high, resulting in the formation of a membrane with poor physical properties.

In step (b), the drying is preferably performed by heating in an oven at 80 to 90° C. for 24 hours to slowly remove the organic solvent and heating in a vacuum oven at 120 to 150° C. for 24 hours to completely remove the organic solvent.

Subsequently, the polyfluorene-based ionomer membrane obtained after step (b) is treated with 1 M NaOH, 1 M NaCl or 1 M $Na_2CO_3$ to fabricate an anion exchange membrane.

The treatment converts the halide form (e.g., $I^-$ form) of the polyfluorene-based ionomer to a $OH^-$, $Cl^-$ or $CO_3^{2-}$ form.

The present invention also provides a binder for an alkaline fuel cell including the polyfluorene-based ionomer.

The present invention also provides a membrane electrode assembly for an alkaline fuel cell including the anion exchange membrane.

The present invention also provides an alkaline fuel cell including the anion exchange membrane.

The present invention also provides a water electrolysis device including the anion exchange membrane.

The present invention will be more specifically explained with reference to the following examples, including comparative examples, and the accompanying drawings.

[Example 1] Preparation of Polyfluorene-Based Copolymer Ionomer (PFTP)

9,9'-dimethylfluorene (0.2914 g, 1.5 mmol) as a monomer, terphenyl (3.105 g, 13.5 mmol) as a comonomer, and 1-methyl-4-piperidone (1.919 mL, 16.5 mmol, 1.1 eq.) were placed in a two-neck flask, and then dichloromethane (13 mL) was added to dissolve the monomers with stirring. The solution was cooled to 1° C. To the solution was slowly added a mixture of trifluoroacetic acid (1.8 mL, ~1.5 eq.) and trifluoromethanesulfonic acid (12 mL, 9 eq.) with stirring for 24 h. The reaction gave a viscous solution. The viscous solution was precipitated in a 2 M NaOH solution, washed several times with deionized water, and dried in an oven at 80° C. to prepare a poly(fluorene-co-terphenyl N-methylpiperidine) copolymer as a solid (yield >95%). The copolymer was named "PFTM".

Next, PFTM (4 g) was dissolved in a mixture of dimethyl sulfoxide (40 mL) and trifluoroacetic acid (0.5 mL) as a cosolvent at 80° C. The polymer solution was cooled to room temperature. Subsequently, $K_2CO_3$ (2.5 g) and iodomethane (2 mL, 3 eq.) were added to the polymer solution. The reaction was carried out for 48 h to form quaternary piperidinium salts. Next, the reaction solution was precipitated in ethyl acetate, filtered, washed several times with deionized water, and dried in a vacuum oven at 80° C. for 24 h to afford a poly(fluorene-co-terphenyl N,N-dimethylpiperidinium) copolymer ionomer as a solid (yield >90%). The ionomer was named "PFTP".

[Example 2] Preparation of Polyfluorene-Based Copolymer Ionomer (PFBP)

A poly(fluorene-co-biphenyl N-methylpiperidine) copolymer (yield >95%) was prepared in the same manner as in Example 1, except that 9,9'-dimethylfluorene (0.2914 g, 1.5 mmol) as a monomer, biphenyl (2.079 g, 13.5 mmol) as a comonomer, and 1-methyl-4-piperidone (1.919 mL, 16.5 mmol, 1.1 eq.) were used. The copolymer was named "PFBM".

Next, a poly(fluorene-co-biphenyl N,N-dimethylpiperidinium) copolymer ionomer (yield >90%) was prepared in the same manner as in Example 1, except that PFBM (4 g) was used. The ionomer was named "PFBP".

[Example 3] Preparation of Polyfluorene-Based Ionomer (PFP)

A poly(fluorene N-methylpiperidine) polymer (yield 70%) was prepared in the same manner as in Example 1, except that 9,9'-dimethylfluorene (1.94 g, 10 mmol) as a monomer, 1-methyl-4-piperidone (1.28 mL, 11 mmol, 1.1 eq.), dichloromethane (8.7 mL), trifluoroacetic acid (1.2 mL, ~1.5 eq.), and trifluoromethanesulfonic acid (8 mL, 9 eq.) were used. The polymer was named "PFM".

Next, a poly(fluorene N,N-dimethylpiperidinium) polymer ionomer (yield 80%) was prepared was obtained in the same manner as in Example 1, except that PFM (2 g) was dissolved in dimethyl sulfoxide (20 mL) to obtain a polymer solution. The ionomer was named "PFP".

[Example 4] Preparation of Polyfluorene-Based Copolymer Ionomer (PFPN)

A poly(fluorene N-methylpiperidine-co-nonafluoride) copolymer (where the fluorene and nonafluoride segments in the repeating units were in a molar ratio of 0.85:0.15) was prepared in the same manner as in Example 1, except that 9,9'-dimethylfluorene as a monomer, 1,1,1,2,2,4,5,5,5-nonafluoro-4-(trifluoromethyl)-3-pentanone as a comonomer, and 1-methyl-4-piperidone were used. The copolymer was named "PFMN".

Next, a poly(fluorene N,N-dimethylpiperidinium-co-nonafluoride) copolymer ionomer (yield 72%) was prepared in the same manner as in Example 1, except that PFMN was used. The ionomer was named "PFPN".

[Example 5] Fabrication of Anion Exchange Membranes from the Polyfluorene-Based Ionomers PFTP (0.9 g) prepared in Example 1 was dissolved in dimethyl sulfoxide to prepare a polymer solution having a concentration of 3.2-3.3 wt %. Subsequently, the polymer solution was collected into a syringe and filtered through a 0.4 µm filter. The resulting transparent solution was cast on a 14×21 cm glass plate. The cast solution was dried in an oven at 85° C. for 24 h to slowly remove the solvent and heated in a vacuum oven at 150° C. for 24 h for complete removal of the solvent to obtain a PFTP membrane (I⁻ form, 20±5 µm). The PFTP membrane was soaked in 1 M NaOH, 1 M NaCl, and 1 M Na$_2$CO$_3$ (60° C., 24 h) for ion-exchange to OH⁻, Cl⁻, and CO$_3^{2-}$, respectively, washed several times with ultrapure water, and dried to fabricate a PFTP anion exchange membrane.

PFBP, PFP, and PFPN anion exchange membranes were fabricated in the same manner as described above, except that PFBP, PFP, and PFPN prepared in Examples 2-4 were used instead of PFTP, respectively.

[Comparative Example 1] Preparation of Polymer Ionomer (PBP) without Fluorene Segment A poly(biphenyl N,N-dimethylpiperidinium) ionomer (yield >90%) was prepared in a similar manner to in Example 2, except that biphenyl as a monomer and 1-methyl-4-piperidone were allowed to react with each other. The ionomer was named "PBP".

[Comparative Example 2] Preparation of Polymer Ionomer (PTP) without Fluorene Segment A poly(terphenyl N, N-dimethylpiperidinium) ionomer (yield >90%) was prepared in a similar manner to in Example 1, except that terphenyl as a monomer and 1-methyl-4-piperidone were allowed to react with each other. The ionomer was named "PTP".

[Comparative Example 3] Fabrication of Anion Exchange Membranes from the Polymer Ionomers without Fluorene Segment PBP and PTP anion exchange membranes were fabricated in the same manner as in Example 5, except that PBP and PTP prepared in Comparative Examples 1 and 2 were used, respectively.

[Instrumental Analyses and Tests]
1. Proton Nuclear Magnetic Resonance ($^1$H NMR) Spectroscopy The chemical structures of the polymer ionomers were confirmed by $^1$H NMR (VNMRS 600 MHz, Varian, CA, USA). DMSO-d$_6$ was used as a solvent for all ionomers (standard chemical shift=2.5 ppm). 10% TFA was added to all NMR samples to eliminate the water peak (3.34 ppm) at a high chemical shift (>12 ppm).

2. Ion Exchange Capacity (IEC), Water Uptake (WU), Swelling Ratio (SR), and Ion Conductivity (σ)

All ionomers have 4 functional groups owing to the high reactivity of CH$_3$I, as well reported in other studies. Thus, the ion exchange capacity values of the polymers were calculated by $^1$H NMR through the relative integral area between the aromatic and methyl protons. The water uptake (WU) and swelling ratio (SR) of each membrane were measured in OH⁻ and Cl⁻ forms. After ion exchange, a membrane in a specific form was washed several times with ultrapure water, and then the hydrated membrane was wiped quickly using a filter paper to remove the surface water. The weight ($m_{wet}$) and unidirectional length ($L_{wet}$) of the wet membrane were recorded. Then, the membrane was dried in a vacuum oven to constant weight by covering it with a filter paper to avoid membrane shrinkage. Subsequently, the dry weight ($m_{dry}$) and length ($L_{dry}$) of the membrane were recorded immediately. In-plane and through-plane swelling ratios (SRs) were measured. Water uptake (WU) and swelling ratio (SR) were calculated according to the following equations:

$$WU\ (\%) = [(m_{wet} - m_{dry})/m_{dry}] \times 100 \tag{1}$$

$$SR\ (\%) = [(L_{wet} - L_{dry})/L_{dry}] \times 100 \tag{2}$$

The ion conductivities of the ionomers were measured using a four-probe method by an AC impedance analyzer (VSP and VMP3 Booster, Bio-Logic SAS, Grenoble, France) over the frequency range from 0.1 to 100 kHz. All membrane samples in different forms were cut into 1×3 cm rectangular shapes (width=1 cm), and then the membranes were fixed between two Pt wire electrodes in a fuel cell test station (CNL, Energy Co., Seoul, Korea). The distance (L) between the two electrolytes was 1 cm. The thickness (d) of the membrane sample was measured using a micrometer caliper. In-plane ion conductivity was measured at fully hydrated conditions (RH=100%) at elevated temperatures, and the resistance (R) of the membrane was recorded. The ion conductivity was calculated from the following equation:

$$\sigma = d/RLW \tag{3}$$

Hydration number (λ), which represents the number of water molecules per OH⁻, was calculated by the following equation:

$$\lambda = Wu \times 10/IEC \times 18 \tag{4}$$

3. Mechanical Properties and Thermal Stability

A universal testing machine (UTM, AGS-J 500N, Shimadzu, Japan) was used to measure the mechanical properties of membrane samples. The tensile strengths (TSs) and elongations at break (EBs) of the PFBP, PBP, PFTP, PTP, and commercial FAA-3-20 membranes in halogen form were measured in the dry state. All membrane samples were cut into dumbbell shapes (2×10 mm), and the stretching rate was set to 1 mm/min. The thicknesses of the membranes were recorded using micrometer-scale calipers. The mechanical properties of the PFTP and PTP membranes in different forms and at different temperatures were also investigated. The TS and EB of the PFTP membrane were first investigated after in-situ stability testing.

The thermal stabilities of the polymer ionomers were measured using a thermogravimetric analysis instrument (TGA, Q500, TA Instrument, USA) coupled to a mass spectrometer (MS, ThermoStar™ GSD 301T, Pfeiffer Vacuum GmbH, Germany). The temperature was increased from 30° C. to 800° C. at a 10° C./min ramping rate under a nitrogen gas atmosphere. Mass spectroscopy (MS) was used to detect the thermally decomposed species released from polymer ionomers at related temperatures. Differential scanning calorimetry (DSC, Q20, TA Instrument, DE, USA) was employed to determine the number of free water molecules ($N_{free}$ water) and bound water molecules ($N_{bound}$ water) present on the polymer ionomers in OH⁻ form. DSC analysis was performed with an aluminum pan under a 50 mL/min nitrogen flow rate, and the heating temperature was gradually increased from −55 to 20° C. along with a 3° C./min ramping rate. $N_{free}$ and $N_{bound}$ were calculated by the following equations:

$$\lambda = N_{free} + N_{bound} \quad (5)$$

$$N_{free} = (H_f/H_{ice})/(M_{wet} - M_{dry})/m_{wet} \times \lambda \quad (6)$$

(where $H_f$ is the enthalpy obtained by the integration of the freezing peak calculated from the DSC program, $H_{ice}$ is the enthalpy of water fusion, and $M_{wet}$ and $M_{dry}$ are wet and dry masses of a membrane sample, respectively.)

$$H_{ice} = H°_{ice} - \Delta C_p \Delta T_f \quad (7)$$

(where $\Delta C_p$ is the difference between the specific heat capacity of liquid water and ice and $\Delta T_f$ is the freezing point depression.)

Dynamic mechanical analysis (DMA, Q800, TA Instrument, DE, USA) was employed to measure the glass transition temperature ($T_g$), storage modulus (SM), and loss modulus (LM) of polymer ionomers. Specifically, all membrane samples were cut into 0.9×2 cm shapes and were fixed with tension clamps in the DMA system. DMA testing was performed with a 1 Hz single-frequency strain mode, a preload force of 0.01 N and a force track of 125% under a nitrogen atmosphere. The target temperature was set to 450° C. along with a 10° C./min ramping rate.

4. Intrinsic Viscosity and Molecular Weight

The intrinsic viscosity ([η]) of anion exchange polymers (polymer ionomers) was measured using a viscometer in a DMSO solvent at 25° C. The viscometry system is composed of a Schott Viscosystem (AVS 370, Germany), Ubbelohde viscometer (SI Analytics, Type 530 13: Capillary No. Ic, K=0.03) and piston burette (TITRONIC universal). The polymer solution was gradually diluted into five different concentrations, and the efflux time was automatically and repetitively recorded five times. The reduced ($\eta_{red}$), inherent ($\eta_{inh}$), and intrinsic viscosities were calculated using the following equations:

$$\eta_{red} = [(t_1/t_0) - 1]/C \quad (8)$$

$$\eta_{inh} = (\ln t_1/t_0)/C \quad (9)$$

(where $t_1$ is the efflux time of the polymer solution, $t_0$ is the efflux time for the DMSO solution, and c is the concentration of the polymer solution)

In a plot of η versus c, the y-intercept was obtained by extrapolating the $\eta_{red}$ and $\eta_{inh}$ to c=0. The intrinsic viscosity was obtained by calculating the average of the obtained y-intercept values.

The molecular weight of anion exchange polymers was measured by gel permeation chromatography (GPC, YL9112 Isocratic Pump, YL9130 Column Compartment, YL9170 RI Detector). NMP was used as both mobile phase and solvent. The concentration of the polymer solution was 1-2 mg/mL. The polymer chain was dissociated using 5% LiBr as a cosolvent. The polymer solution was filtered before injection into the GPC system.

5. Morphology

The surface and cross-section morphologies of anion exchange membranes and membrane electrode assemblies were observed using a scanning electron microscope (SEM, FE-SEM S-4800, Hitachi, Japan) at 15 kV. Membrane and membrane electrode assembly samples for observing the cross-section morphologies were fractured in liquid nitrogen, and all samples were coated with a thin platinum layer using an ion sputtering system (E-1045, Hitachi). Atomic force microscopy (AFM) was used to observe the microphase separation of anion exchange membranes on a MultiMode 8 AFM (Veeco) with a NanoScope V controller. Anion exchange membranes were tested in I⁻ form in the dry state. In addition, the internal microphase separation of anion exchange membranes was observed using a transmission electron microscope (TEM, JEM2100F, JEOL, Japan) at 120 kV. Anion exchange ionomers (polymer ionomers) stained with I⁻ ions were dissolved in a DMSO/IPA/DI water solution. Each polymer solution was dropped onto a copper grid and dried in an oven before TEM measurements.

6. Single Cell Fabrication and Fuel Cell Performance Testing

PFTP (Example 5), PTP (Comparative Example 3), and commercial FAA-2-30 membranes were employed as anion exchange membranes. PFTP (Example 1), PBP (Comparative Example 1), PTP (Comparative Example 2), PFP (Example 3), PFPN (Example 4), and commercial FuMA-Tech Fumion ionomers were used as anion exchange ionomers. Pt/C (Tanaka Kikdfinzoku Kogyo-TKK, 46.6 wt % Pt/C), Pt/C (Johnson Matthey HiSpec 4000, 40 wt % Pt/C), and Pt—Ru/C (Johnson Matthey HiSpec 10,000, 40 wt % Pt and 20 wt % Ru) were used as catalysts. Each anion exchange ionomer was dissolved in DMSO to prepare a 5% polymer solution, and then the polymer solution was filtered through a 0.45 μm PTFE filter. The catalyst slurry was prepared by adding the 5% AEI/DMSO solution and catalysts into IPA/DI water (10/1), and then the slurry was sonicated for 1 h. Subsequently, the catalyst slurry was sprayed onto both sides of anion exchange membrane using an airbrush to produce catalyst coated membranes (CCMs). Thereafter, CCMs were directly assembled with two gas diffusion layers, fluorinated ethylene propylene gaskets, and graphite bipolar plates with a 5 cm² flow field to obtain a complete anion exchange membrane fuel cell.

The performance of the anion exchange membrane fuel cell was measured using a fuel cell test station (CNL, Seoul, Korea). After the cell was paused for a while, the current was scanned at a rate of 0.1 A and the polarization curve and power density curve were recorded. Fuel cell performance was tested under different conditions, including temperature, relative humidity (RH), backpressure, flow rate, and feed gas.

7. Ex-Situ and In-Situ Durability

The ex-situ durability of the PFTP membrane was measured in 1 M, 5 M, and 10 M NaOH at 80° C. for 2000 h. The degradation ratio of PFTP was calculated by the changes in chemical structure detected by $^1$H NMR and Cl$^-$ conductivity at room temperature. Changes in the mechanical properties and thermal stability were also investigated after alkaline treatment in 10 M NaOH at 80° C. for 168 h. After the cell was paused, the in-situ durability was measured at different current densities (0.2 A/cm$^2$ and 0.4 A/cm$^2$) at 80° C. under H$_2$—O$_2$ conditions. The dew points and flow rates in the anode and cathode were slightly adjusted to optimize water management during durability testing. Importantly, in-situ durability was measured twice repeatedly at different current densities. After measurement of the in-situ durability, the catalyst coated membranes (CCMs) cut in the membrane electrode assembly testing were used for mechanical property testing and $^1$H NMR analysis. CCMs were degraded with DMSO-d$_6$ and carefully filtered before $^1$H NMR analysis.

[Results and Discussion]

(Solubility, Intrinsic Viscosity and Molecular Weight)

The solubilities of the polymers in various forms have been carefully tested using general-purpose solvents as they are associated with GPC testing and membrane formation. The solubilities of the ionomers were studied in IPA/water to provide clear information about the fabrication of membrane electrode assemblies. The solubilities of all polymers were found to be very different before and after quaternization. Particularly, PFBM, PFTM, PBM and PTM displayed very low solubilities in DMSO due to low polarities of the polymers and π-π stacking of the polymer chains. In contrast, the solubilities of PFBT, PFTP, PBP and PTP were greatly improved due to increased polymer polarities after quaternization or acidification. In addition, all these ionomers displayed good solubilities in IPA/water solution, indicating that the solution is efficient for ionomer production. In contrast, non-acidified PFM and PFMN displayed good solubilities in many solvents, including THF, CH$_2$Cl$_2$, and CHCl$_3$, due to their relatively low polarities and π-π stacking. Particularly, the polyfluorene-based copolymers containing large amounts of fluorene showed improved solubility in acid-free solvents. In addition, the PFBP and PFTP ionomers showed better solubilities in IPA/water than the PBP and PTP ionomers, indicating that the fluorene segments can improve the solubilities of these ionomers.

The intrinsic viscosities of the ionomers were investigated using DMSO solvent at 25° C. The PTP, PBP, PFTP and PFBP ionomers had high intrinsic viscosities (≥2 dL/g). Previous studies revealed that the intrinsic viscosity of a polyimide having excellent film-forming properties and mechanical properties is generally lower than 2 dL/g even though the weight average molecular weight (M$_w$) of the polyimide is 100 kg/mol or more. The intrinsic viscosity of polyfluorene-based copolymers decreases with increasing ratio of fluorenes, limiting the film-forming properties of the polyfluorene-based copolymers.

(Structural Analysis)

Figure 1B:
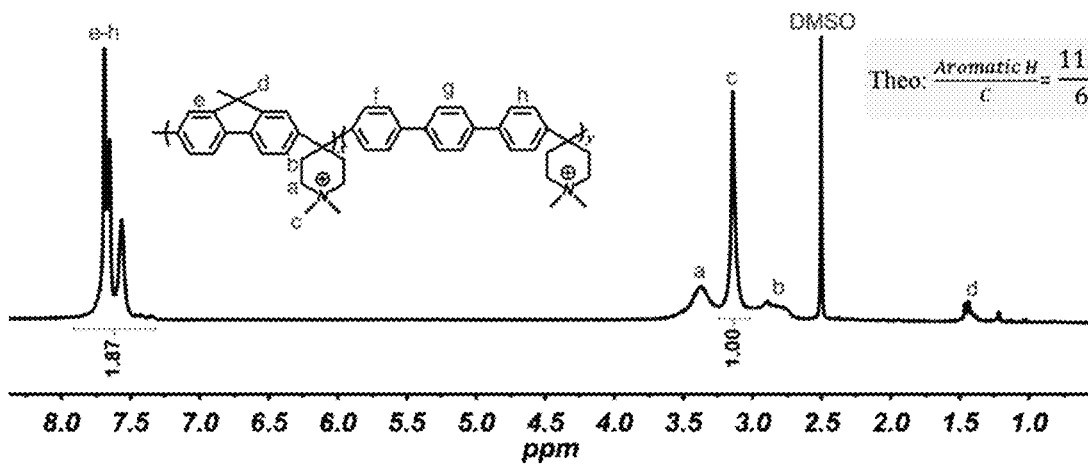
Figure 2:
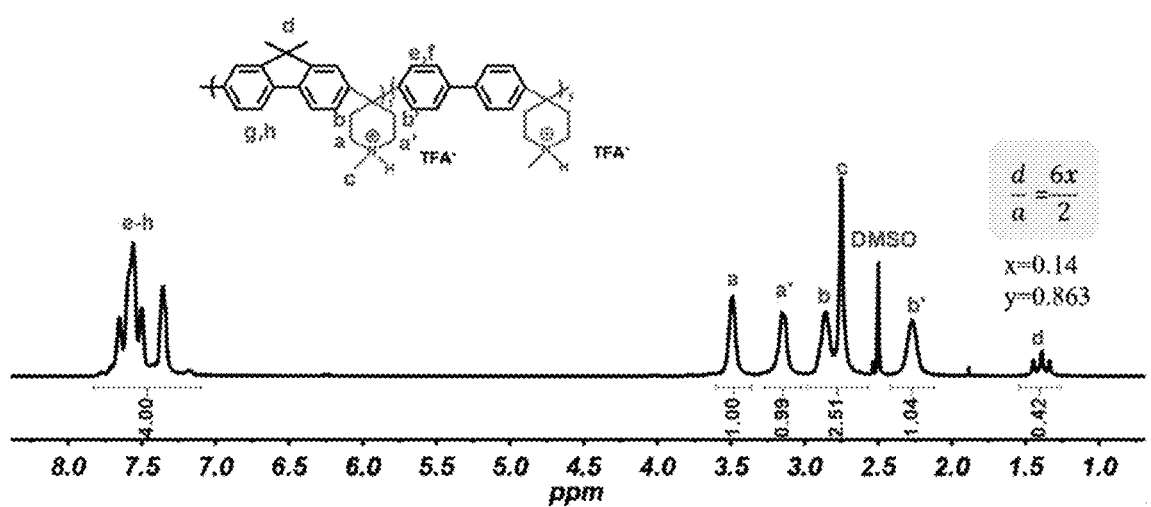
FIG. 2 is a proton nuclear magnetic resonance (¹H NMR) spectrum of PFBM prepared in Example 2.
Figure 3:
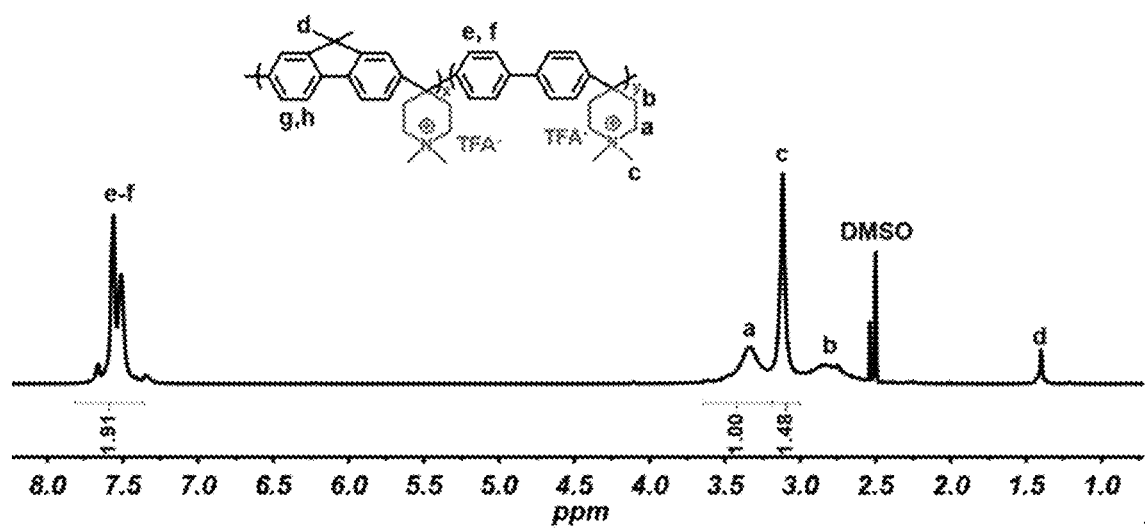
FIG. 3 is a proton nuclear magnetic resonance (¹H NMR) spectrum of PFBP prepared in Example 2.

The chemical structures of the polymer ionomers prepared in Examples 1-4 were confirmed by proton nuclear magnetic resonance ($^1$H NMR) spectra. FIGS. 1A and 1B show proton nuclear magnetic resonance ($^1$H NMR) spectra of PFTM (FIG. 1A) and PFTP (FIG. 1B) prepared in Example 1. FIG. 2 is a proton nuclear magnetic resonance ($^1$H NMR) spectrum of PFBM prepared in Example 2. FIG. 3 is a proton nuclear magnetic resonance ($^1$H NMR) spectrum of PFBP prepared in Example 2.

Before quaternization, 10% trifluoroacetic acid (TFA) was added to DMSO-d$_6$ to increase the solubilities of some of the polymers and eliminate the negative effect of the H$_2$O peak (3.34 ppm) in $^1$H NMR analysis. The chemical shift of TFA was observed around 13 ppm with a broad peak that was hidden for better clarity. Typically, the protons a and b in the piperidinium ring are split into different peaks by TFA before quaternization. Four split peaks with the same integrated area were observed around 3.50 ppm, 3.20 ppm, 2.90 ppm, and 2.30 ppm. The chemical shift of N—CH$_3$ appeared around 2.77 ppm. After quaternization, the splitting disappeared and the chemical shifts of the protons a, b, and c in the piperidinium ring were moved to 3.35 ppm, 3.14 ppm, and 2.86 ppm, respectively.

The ratio of fluorenes (x) in polyfluorene-based copolymer can be calculated by the equation: $d/a=6x/2(x+y)=6x/2$, where d represents six methyl protons in fluorene segments and a represents two protons in the piperidinium ring. Therefore, x$_1$ was calculated to be 0.137 in PFTM and x$_2$ was calculated to be 0.14 in PFBM, as shown in FIGS. 1 and 2.

(Physical Properties of the Anion Exchange Membranes)

Table 1 shows the ion exchange capacity (IEC), water uptake (WU), swelling ratio (SR), hydration number (λ), OH$^-$ conductivity (σ), and intrinsic viscosity (η) values of the anion exchange membranes fabricated in Example 5 and Comparative Example 3 and commercial Fumion and FAA-20 membranes.

TABLE 1

Figure 4A:
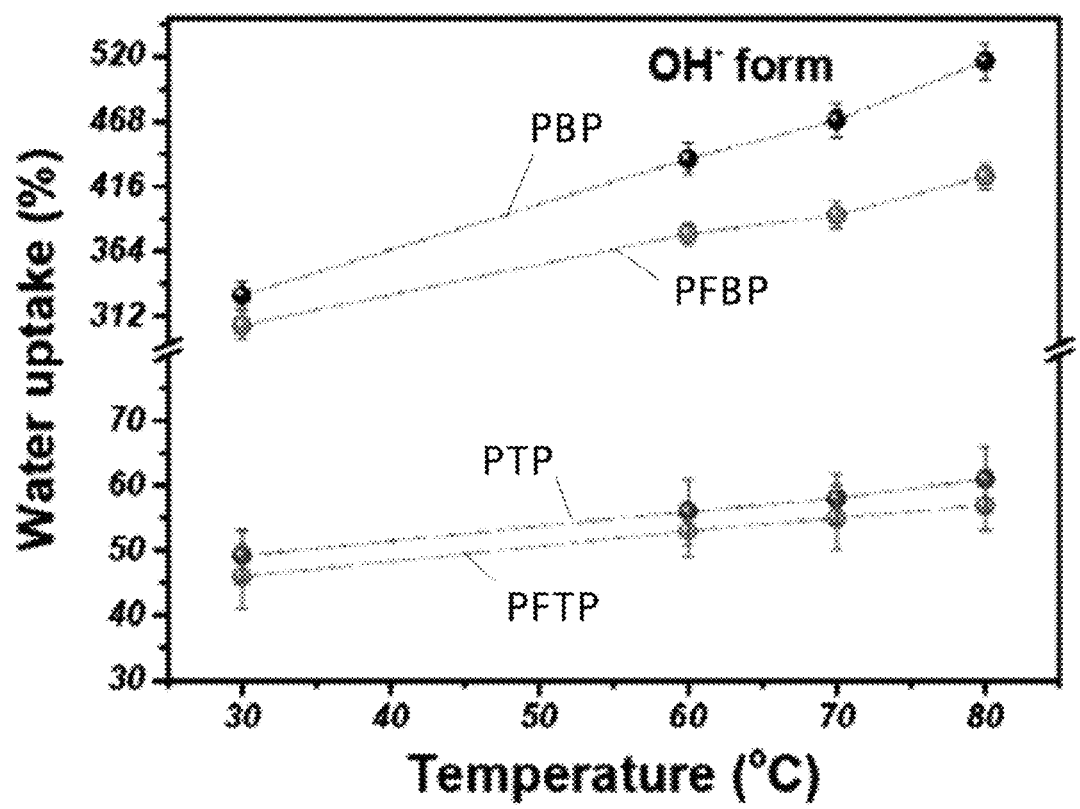
FIGS. 4A to 4D show the water behaviors of PFTP and PFBP membranes fabricated in Example 5 and PBP and PTP membranes fabricated in Comparative Example 3.
Figure 4B:
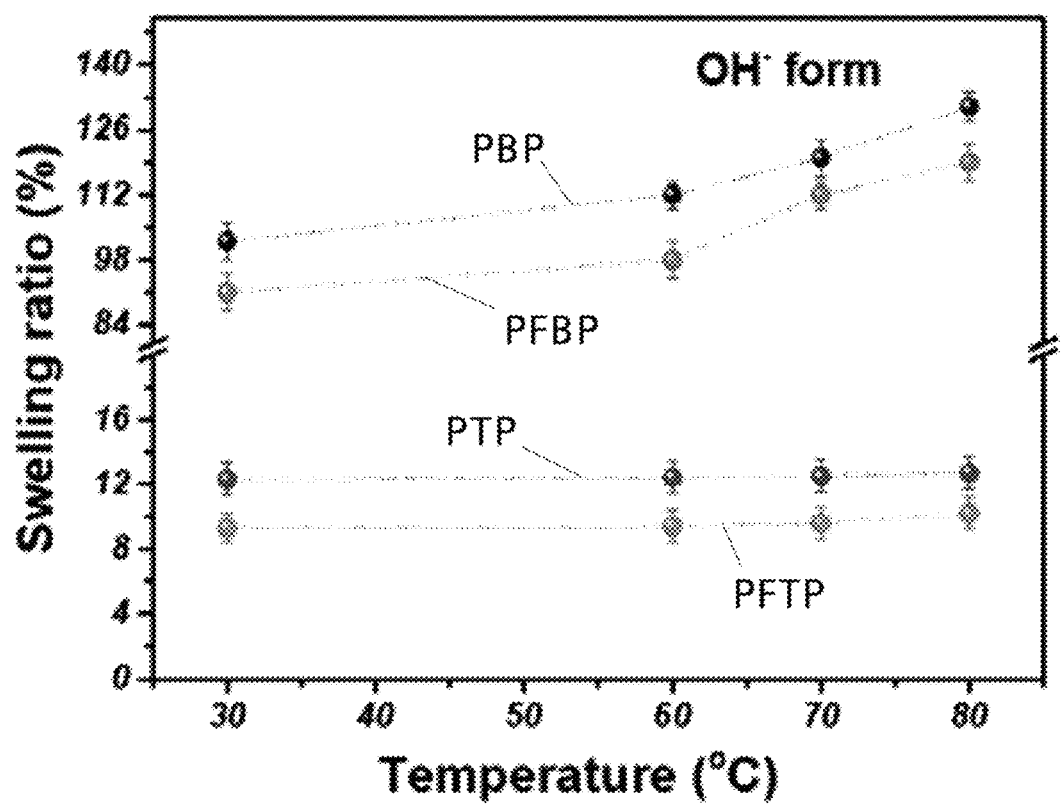
Figure 4C:
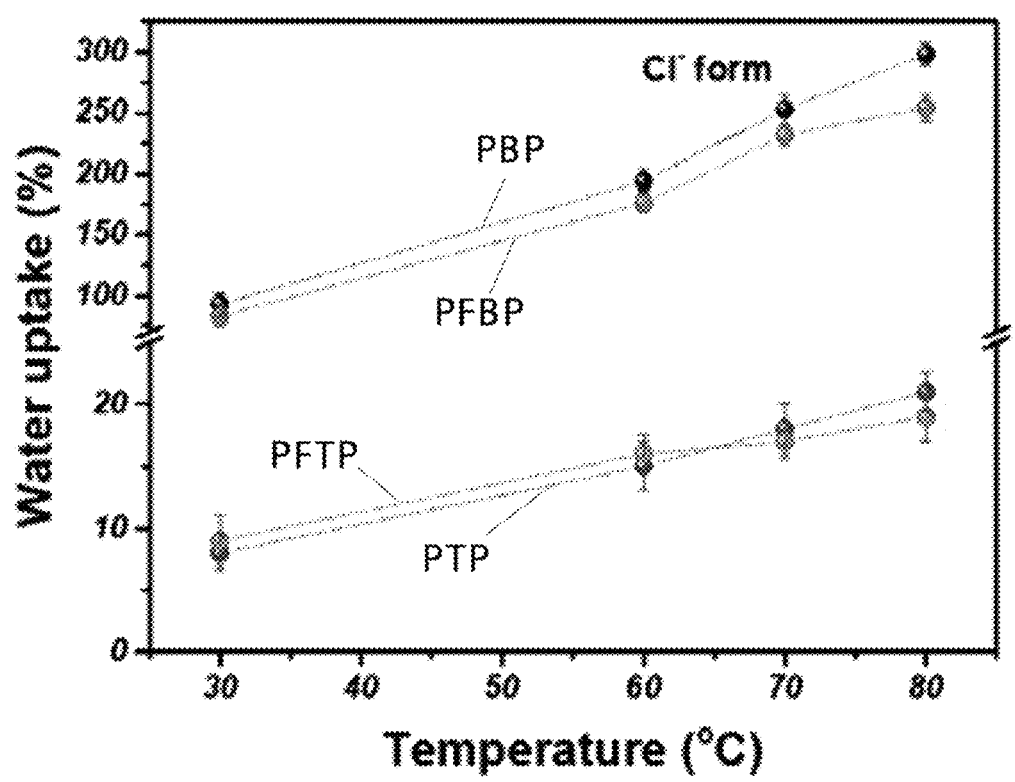

| Membrane | IEC (mmol/g) Theo (OH$^-$) | IEC (mmol/g) Theo (I$^-$) | IEC (mmol/g) NMR (I$^-$) | WU (%)$^a$ | SR (%)$^a$ | λ | N$_{free}$ | N$_{bound}$ | σ (mS/cm)$^a$ | η (dL/g)$^b$ |
|---|---|---|---|---|---|---|---|---|---|---|
| PBP | 3.52 | 2.54 | 2.54 | 330 ± 10 | 107 ± 5 | 52 | 18 | 34 | 58 ± 2 | 5.23 |
| PFP | 3.09 | 2.31 | 2.31 | 78 ± 12 | — | 14.02 | — | — | NE | 0.25 |
| PFBP | 3.43 | 2.49 | 2.49 | 310 ± 5 | 94 ± 5 | 50.35 | 29 | 21 | 63 ± 3 | 2.34 |
| PFPN | 2.86 | 2.25 | 2.25 | 46 ± 12 | — | 8.94 | — | — | NE | 0.38 |
| PTP | 2.78 | 2.13 | 2.13 | 49 ± 5 | 12 ± 1 | 9.79 | 0 | 9.79 | 48 ± 2 | 4.875 |
| PFTP | 2.82 | 2.16 | 2.16 | 45 ± 5 | 9.6 ± 1 | 8.86 | 0 | 8.86 | 66 ± 4 | 2.76 |
| Fumion | | NE | | 56 ± 5 | 20.25 | NE | — | — | 26.7 ± 2 | — |
| FAA-20 | | | 1.72 | 7.0 (Cl$^-$ form) | <2.0Cl$^-$ form | NE | — | — | 40 ± 2 | — | a: at 30° C. in water, b: at 25° C. in DMSO, -: cannot test, NE: not evaluated, N$_{free}$: number of free water molecules, N$_{bound}$: number of bound water molecules As shown in Table 1 and FIGS. 4A to 4C, the anion exchange membranes with different ion exchange capacity values displayed very different water uptakes at elevated temperatures in liquid water. The PFTP and PTP membranes exhibited very low water uptakes (~60% in OH⁻ form and ~20% in Cl⁻ form) and swelling ratios (~10% in OH⁻ form and <5% in Cl⁻ form) at 80° C. In contrast, the PFBP and PBP membranes exhibited much higher water uptakes (450-500% in OH⁻ form and 230-250% in Cl⁻ form) and swelling ratios (120-135% in OH⁻ form and 45-50% in Cl⁻ form) at 80° C. than the PFTP and PTP membranes due to their higher ion exchange capacity values (>3 mmol/g). Owing to the rigidity of fluorene groups, the PFTP and PFBP membranes having higher ion exchange capacity values exhibited low water uptakes and swelling ratios compared to the PTP and PBP membranes, respectively. In short, the polyfluorene-based anion exchange copolymers exhibited higher ion conductivity and better dimensional stability.

Figure 4D:
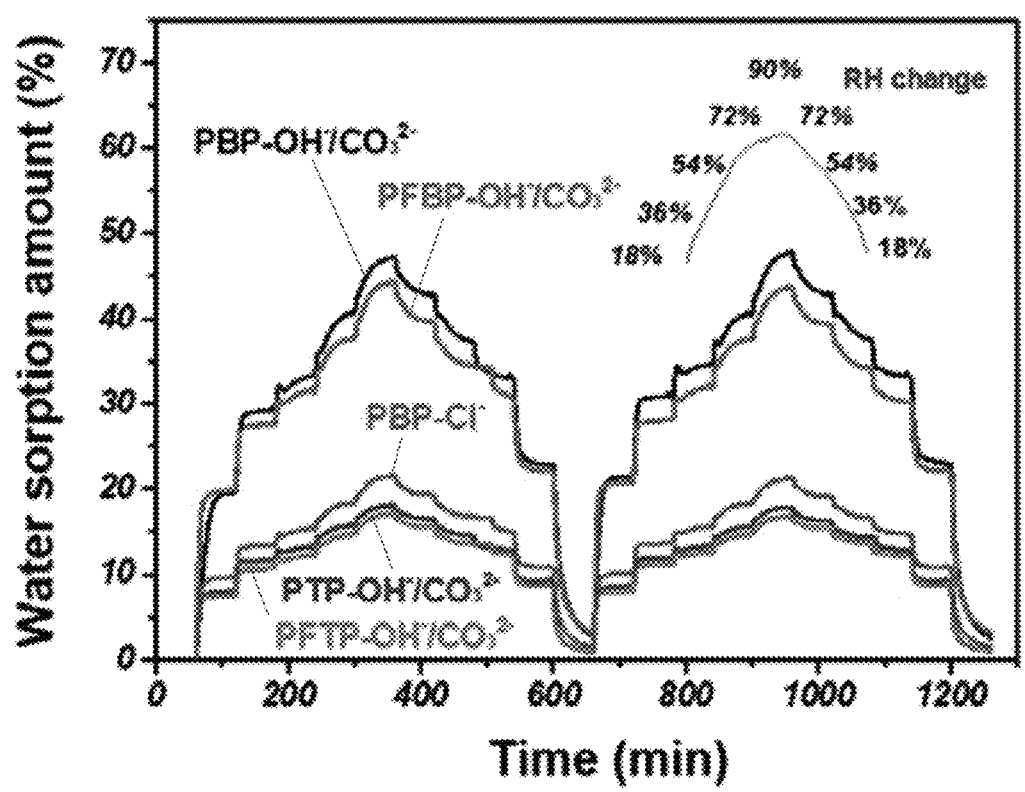

The water sorption behaviors of the anion exchange polymers at different relative humidities were investigated through dynamic vapor sorption (DVS) analysis. The results are shown in FIG. 4D. Two hydration-dehydration cycles were recorded and matched well with each other at different relative humidities. Relative humidity was controlled to automatically increase in a DVS instrument at a given time interval. The DVS behaviors of the anion exchange polymers at different relative humidities were completely different and were much lower than those in ultrapure water. Typically, the water vapor sorption amounts of the PFBP and PBP membranes having high water uptakes in ultrapure water were only less than 50% in OH⁻ ($CO_3^{2-}$) form and ~20% at 90% relative humidity. These results indicate that the water transport behaviors of the anion exchange membranes or the anion exchange ionomers may be very different between dynamic water vapor and liquid water in equilibrium, especially in fuel cell systems.

(Ion Conductivity)

Figure 5:
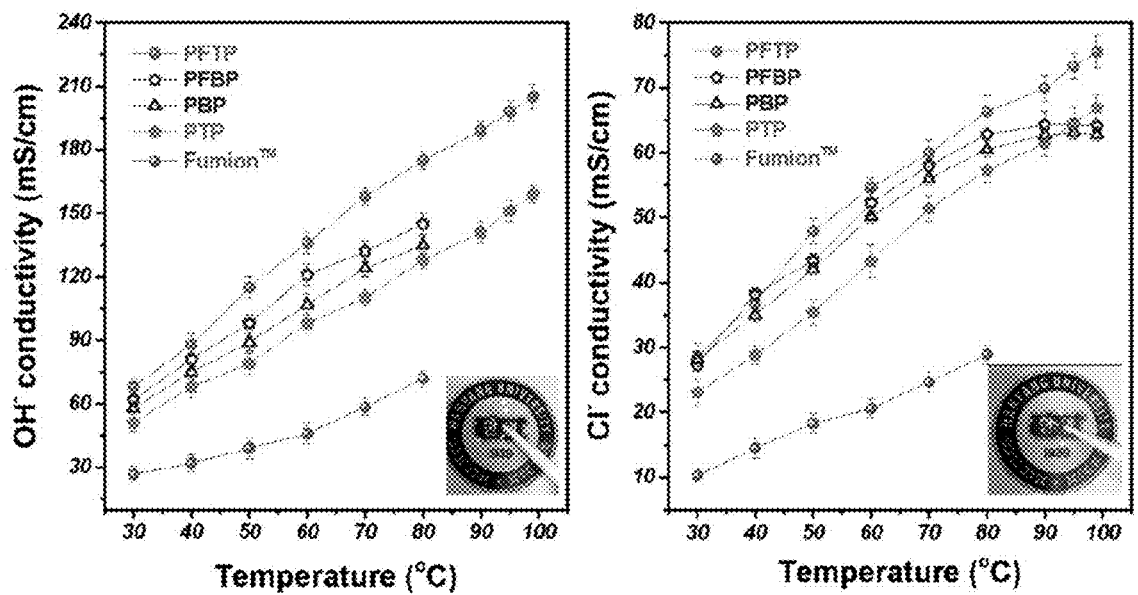
FIG. 5 shows the ion conductivities of anion exchange membranes in OH⁻ and Cl⁻ forms fabricated in Example 5 as a function of temperature, with the inset images showing the states of PFTP membranes after measurement at 98° C.
Figure 6:
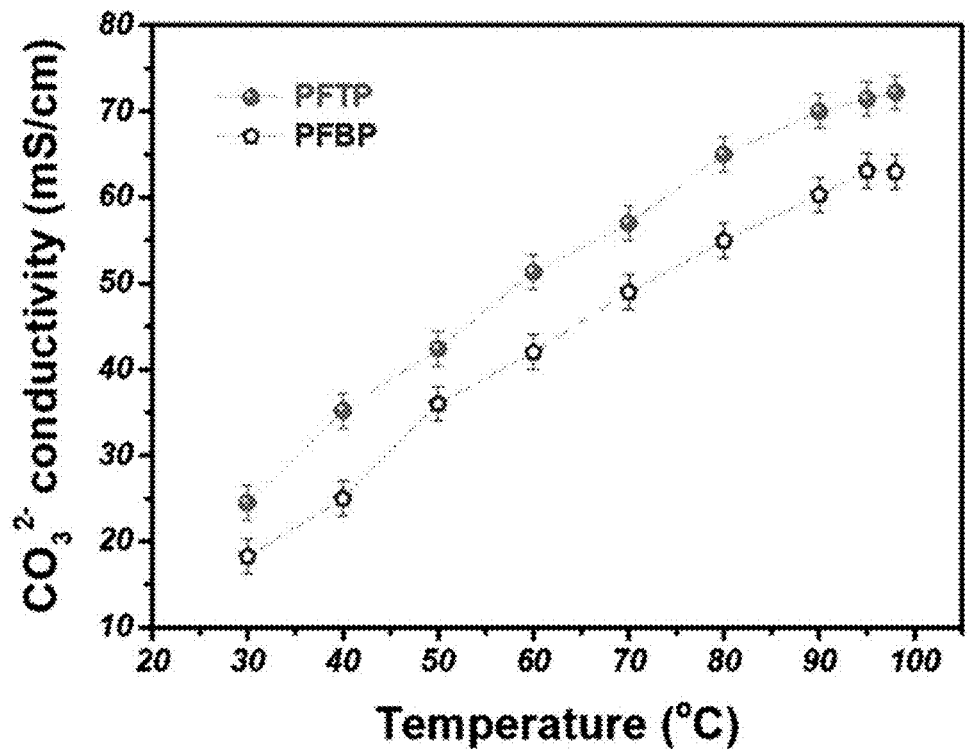
FIG. 6 shows the $CO_3^{2-}$ conductivities of PFTP and PFBP membranes fabricated in Example 5 as a function of temperature.
Figure 7A:
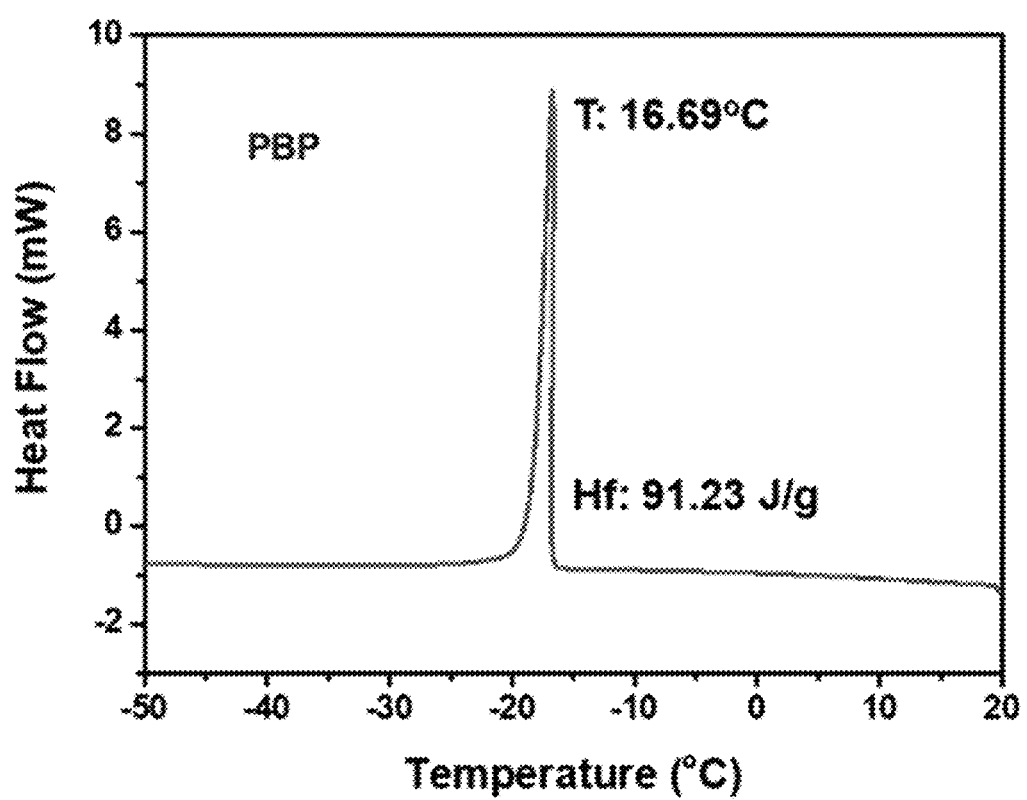
FIGS. 7A to 7D show differential scanning calorimetry (DSC) curves of PBP (FIG. 7A), PFBP (FIG. 7B), PTP (FIG. 7C), and PFTP (FIG. 7D) anion exchange membranes in OH⁻ form fabricated in Example 5 and Comparative Example 3.
Figure 7B:
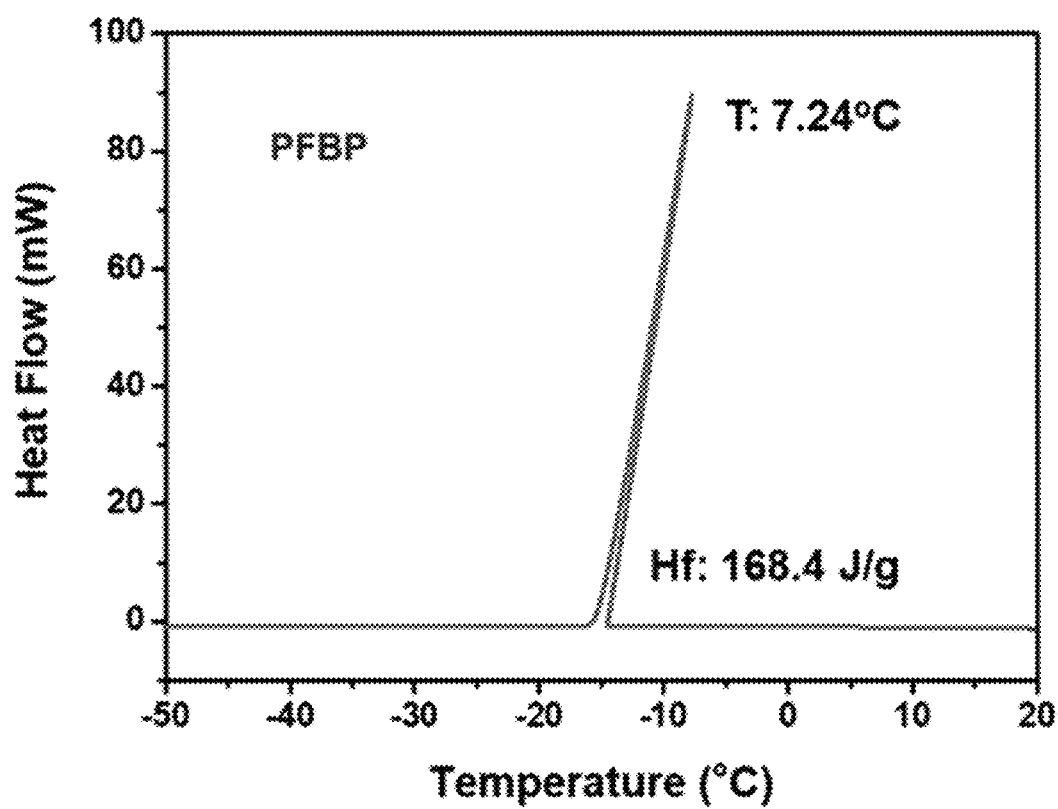
Figure 7C:
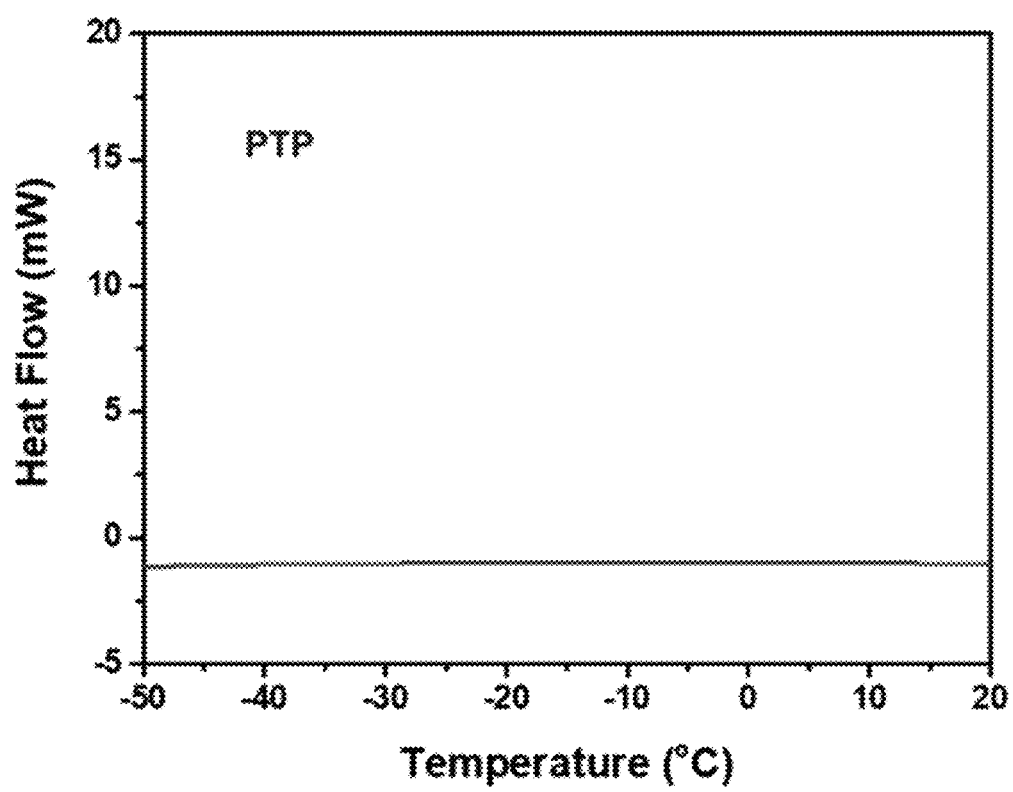
Figure 7D:
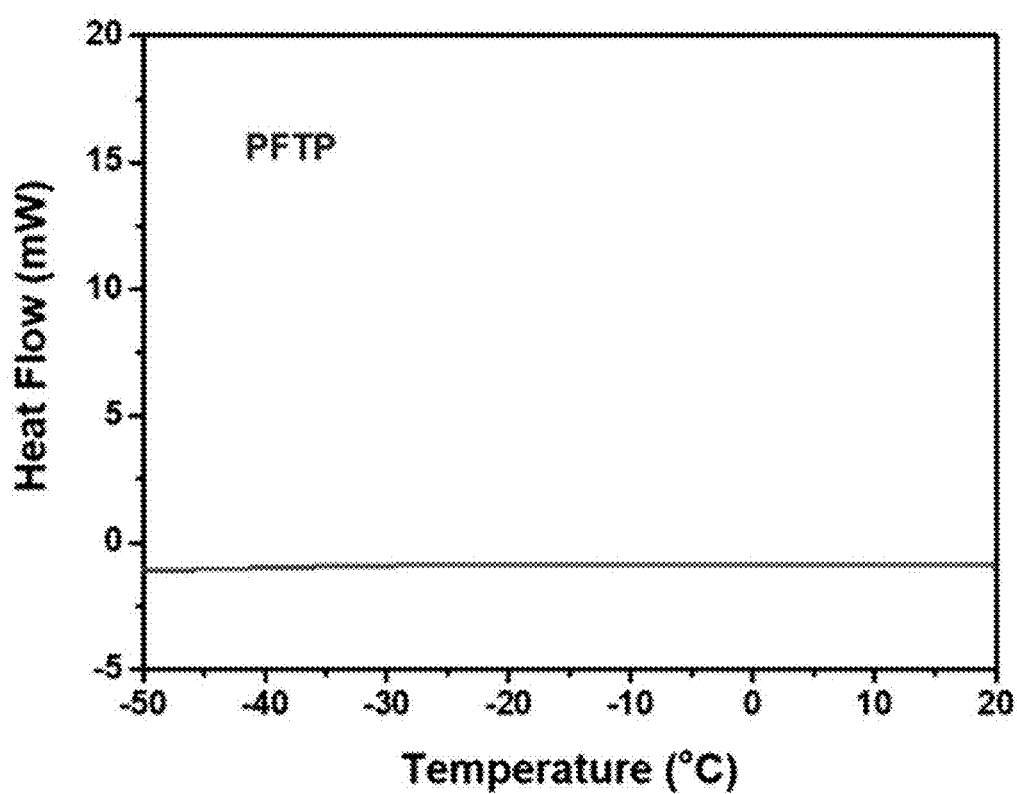

The ion conductivities of the membranes were measured in Cl⁻, OH⁻, and $CO_3^{2-}$ forms in the fully hydrated state. As shown in FIG. 5, all membranes with high ion exchange capacity values (>2.7 mmol/g in OH⁻ form) exhibited very high OH⁻ conductivities of ≥120 mS/cm exceeding the benchmark of Nafion membrane at 80° C. in polymer electrolyte membrane fuel cells (PEMFCs). Further, since the effect of $CO_2$ poisoning on the OH⁻ conductivity of the anion exchange polymers is inevitable, the Cl⁻ and $CO_3^{2-}$ conductivities of the anion exchange membranes were also investigated, as shown in FIGS. 5 and 6.

Particularly, Cl⁻ conductivity is currently being reviewed as a standard evaluation approach for ion conductivity. Among these anion exchange membranes, the PFTP membrane displayed high ion conductivities of 208 mS/cm and 77 mS/cm in OH— and Cl⁻ forms, respectively, at 98° C. The PTP membrane displayed high OH⁻ conductivities of ≥150 mS/cm at high temperatures. Similarly, the PFBP membrane also displayed higher ion conductivities than the PBP membrane despite its slightly lower IEC. Clearly, the polyfluorene-based copolymers had significantly higher conductivities than the terphenyl or biphenyl-based polymers (PFTP vs. PTP and PFBP vs. PBP). An appropriate fluorene segment bonded to the polyarylpiperidinium (PAP) backbone is beneficial for improving ion conductivity because it optimizes microphase separation.

However, the OH⁻ conductivities of the PFBP and PBP membranes could not be measured above 90° C. The PFBP and PBP membranes were severely deformed after testing due to their high water uptakes (WU). No problems were found in the PFBP and PBP membranes in Cl⁻ form. The Cl⁻ conductivities of PFBP and PBP were not improved any more at high temperatures (>90° C.). Particularly, the molecular weights and WUs of these PAP-based anion exchange polymers had significant effects on their ion conductivities. Very high WUs and SRs are likely to be detrimental to the ion conductivity.

FIGS. 7A to 7D show differential scanning calorimetry (DSC) curves of PBP (FIG. 7A), PFBP (FIG. 7B), PTP (FIG. 7C), and PFTP (FIG. 7D) anion exchange membranes in OH⁻ form fabricated in Example 5 and Comparative Example 3. The swollen membranes were found to contain two types of water: bound water and free water. Bound water is defined as water molecules bound with ionic species in the copolymers. As shown in FIGS. 7A to 7D and Table 1, the PFBP and PBP membranes showed much higher λ values with reasonable free and bound water than the PFTP and PTP membranes. Free water could not be measured in the PFTP and PTP membranes, suggesting that only bound water was surrounded by DMP groups of the PFTP and PTP membranes. On the other hand, $CO_3^{2-}$ conductivity reflects the ion conducting capacities of the anion exchange membrane and the anion exchange ionomer after carbonation, showing significant ion conductivity and voltage losses in fuel cells. As shown in FIG. 6, the $CO_3^{2-}$ conductivities of the PFTP and PFBP membranes at high temperatures were >65 mS/cm, meaning that the anion exchange membranes or the anion exchange ionomers still possess very high ion conductivities even when impaired by carbonation of fuel cells.

(Mechanical Properties and Thermal Stability)

Table 2 shows the tensile strength (TS), elongation at break (EB), Young's modulus (YM), glass transition temperature ($T_g$), and storage modulus (SM, 80° C.) values of the PFTM membrane (Example 1), the PFTP membranes in I⁻ and OH⁻ forms (Example 5), the PTP membranes in I⁻ and OH⁻ form (Comparative Example 3), the PFBP membrane in I⁻ form (Example 5), the PBP membrane in I⁻ form (Comparative Example 3), and a commercial FAA-2-30 anion exchange membrane.

TABLE 2

| Sample | TS (Mpa) | EB (%) | YM (Gpa) | $T_g$ (° C.) | SM (Mpa) |
|---|---|---|---|---|---|
| PFTM | 83.2 ± 3 | 10.3 ± 2 | 2.152 | 349, 406 | 1610 |
| PFTP (I⁻) | 84.6 ± 2 | 25.6 ± 3 | 1.582 | — | — |
| PFTP (OH⁻) | 48.5 ± 5 | 30.2 ± 2 | 0.521 | — | — |
| PTP (I⁻) | 71.1 ± 5 | 45.7 ± 3 | 0.1201 | 392 | 1780 |
| PTP (OH⁻) | 52 ± 5 | 71 ± 3 | 0.368 | — | — |
| PFBP (I⁻) | 52.9 ± 4 | 13.6 ± 2 | 1.052 | 320, 378 | 2050 |
| PBP (I⁻) | 46 ± 4 | 14.8 ± 2 | 0.987 | 357 | 1050 |
| FAA-2-30 | 47 ± 2 | 12.5 ± 2 | 0.876 | — | — |

Figure 8A:
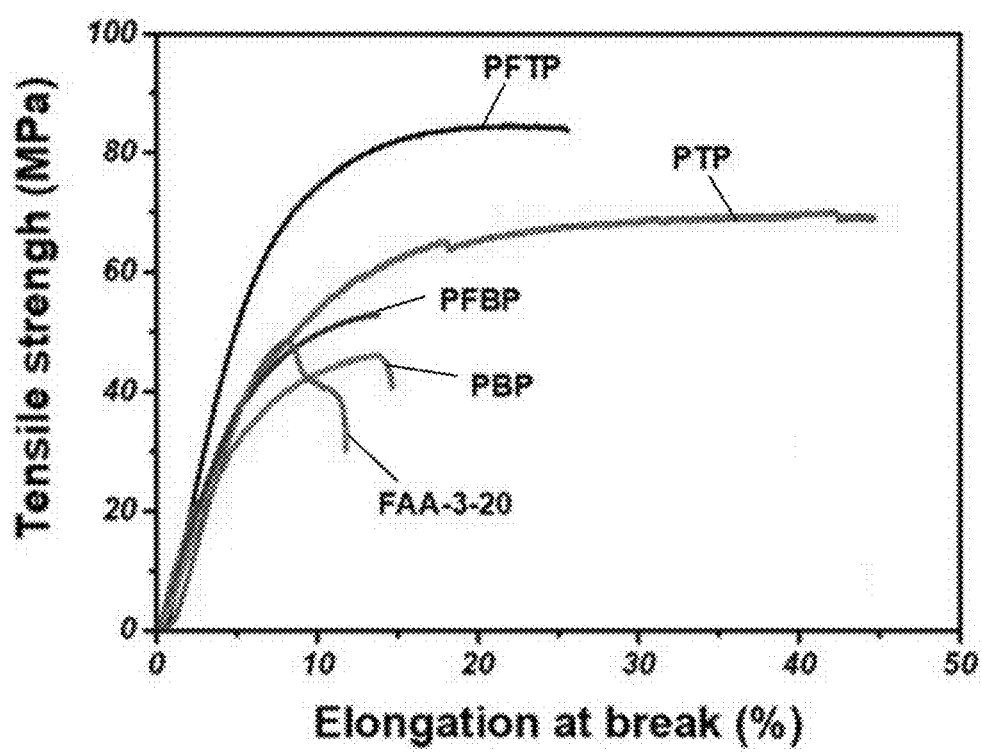
FIGS. 8A and 8B shows room temperature tensile strengths and elongations at break of anion exchange membranes in I⁻ form fabricated in Example 5 and Comparative Example 3 (FIG. 8A) and tensile strengths and elongations at break of anion exchange membranes in different anion forms fabricated in Example 5 and Comparative Example 3 (FIG. 8B), which were measured at different temperatures.
Figure 8B:
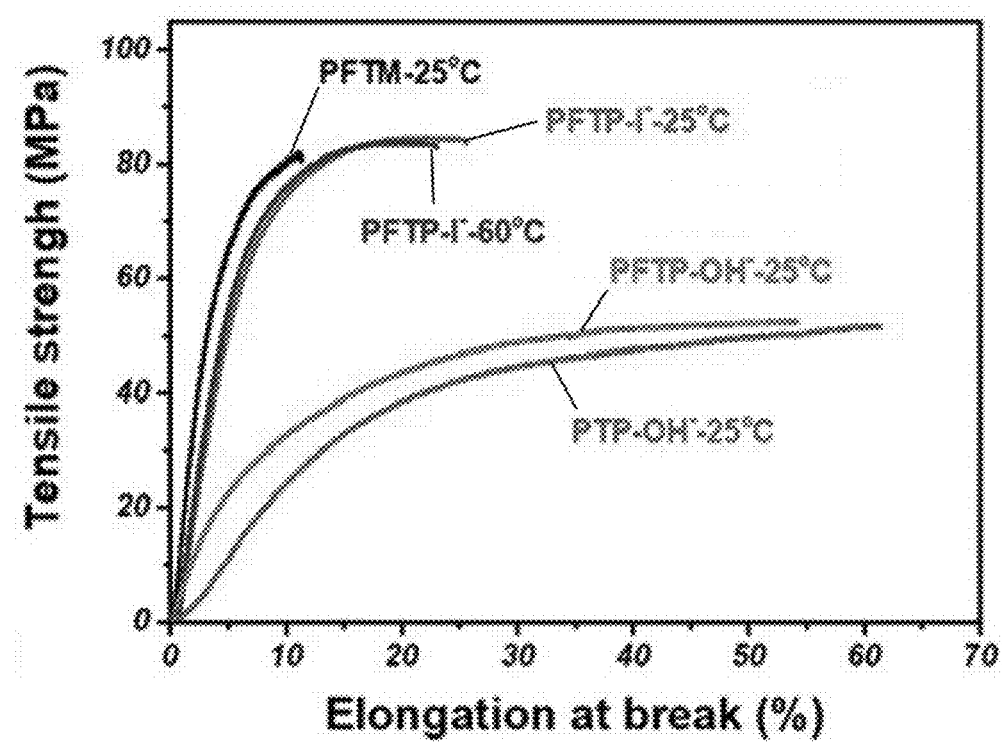

FIGS. 8A and 8B shows room temperature tensile strengths and elongations at break of the anion exchange membranes in I⁻ form fabricated in Example 5 and Comparative Example 3 (FIG. 8A) and tensile strengths and elongations at break of the anion exchange membranes in different anion forms fabricated in Example 5 and Comparative Example 3 (FIG. 8B), which were measured at different temperatures.

As shown in FIGS. 8A to 8B and Table 2, the PFTP and PTP membranes showed higher tensile strengths (TSs) and elongations at break (EBs) than the other membranes. Particularly, the TS and Young's modulus (YM) of the PFTP membrane reached 84.6 MPa and 1.58 GPA at room temperature, respectively. In comparison with the PTP membrane (TS: 71 MPa, EB: 45.7%, YM: 1.2 GPA), the PFTP membrane had high TS and YM values but showed a low EB, indicating low deformation resistance owing to the rigidity of the fluorene segments. Clearly, the PFTP and PTP membranes whose intrinsic viscosities were as high as 2.73 dL/g and 4.775 dL/g, respectively, had excellent mechanical properties. Particularly, the TS and EB of the PFTP membrane were very similar to those of commercial polyimide membranes (TS: ~90 MPa, EB: 30%) which are currently in the spotlight for gas separation, indicating that the PFTP membrane is mechanically robust enough to be used as an anion exchange membrane. When Peng et al.'s QAPPT membrane (Table 3) was compared with the synthesized PTP membrane (TS: 52 MPa and EB: 71% in OH⁻ form, the QAPPT membrane showed much lower TS (35 MPa) and EB values (40%) due to the low molecular weight of QAPP despite the structural similarity of the two membranes. Further, as shown in FIG. 8B, PFTM before quaternization showed a similar TS (83.2 MPa) and a low EB (10.3%) compared to PFTP but it had a much higher YM (2.25 GPA) than PFTP. Indeed, the EB of PFTP was significantly increased after quaternization. Particularly, anion exchange membranes in different ion forms have a great influence on mechanical properties. Generally, the PFTP and PTP membranes in OH⁻ form had low TS and significantly high EB values, because hydration reduces the π-π stacking of the polymer chains but increases the interaction between ammonium groups and water. The mechanical properties of the PFTP membrane were also investigated at 60° C. The TS and EB of the PFTP membrane were not distinctly altered at 60° C. This is the result corresponding to the dimensional stability of the membrane, suggesting that the PFTP membrane is highly thermally resistant and has good deformation resistance for use in fuel cell applications. On the other hand, the thermal behaviors of the anion exchange polymers were systematically and comprehensively investigated by thermogravimetric analysis-mass spectrometry (TGA-MS) and dynamic mechanical analysis (DMA).

Figure 9A:
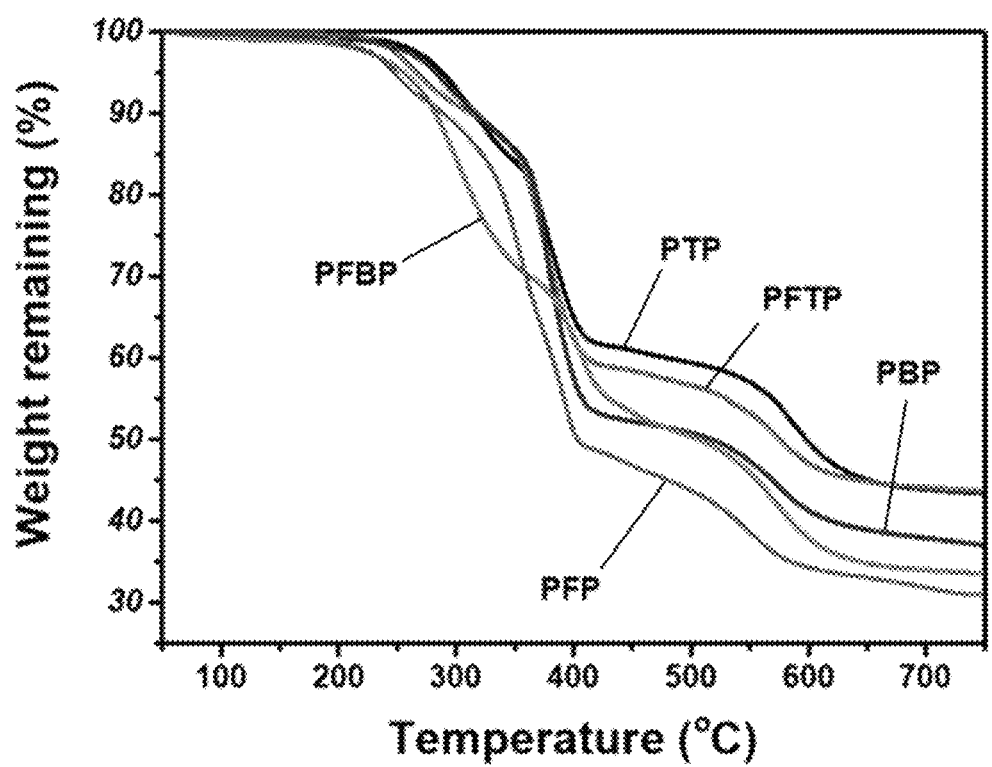
FIGS. 9A and 9B show thermogravimetric analysis (TGA) curves of various polymer ionomers prepared in Examples 1 to 3 and Comparative Examples 1 and 2, which were measured from 30° C. to 800° C. at a heating rate of 10° C./min under a nitrogen atmosphere. Every sample was isothermal at 150° C. for 5 min for solvent and water removal before data recording.
Figure 9B:
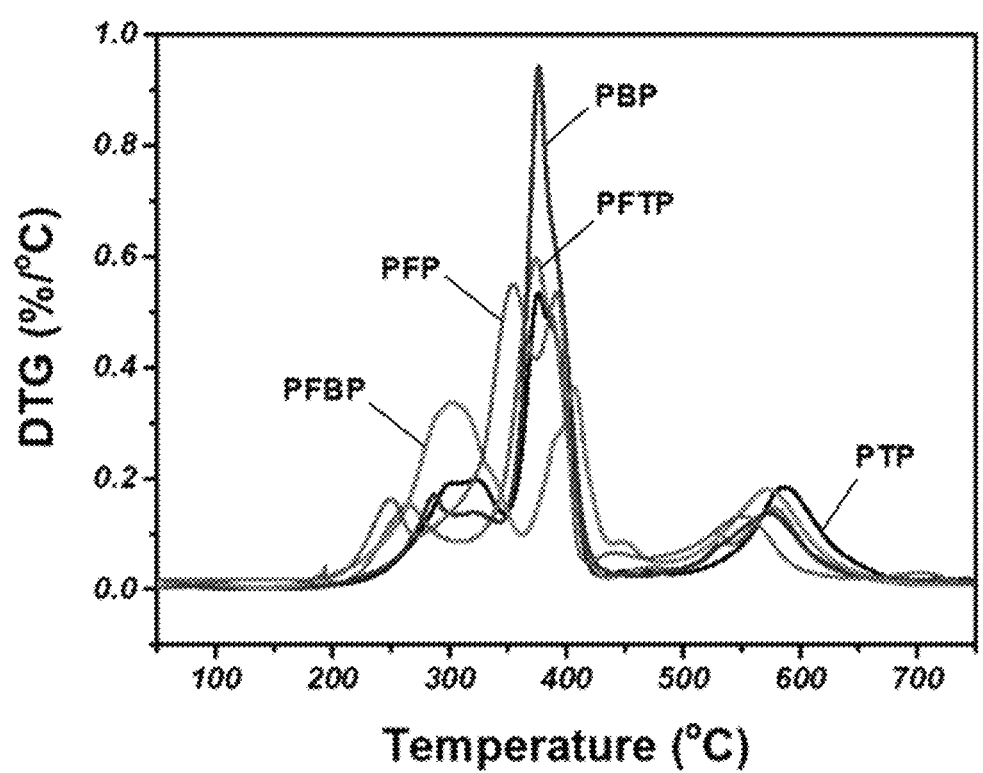
Figure 10A:
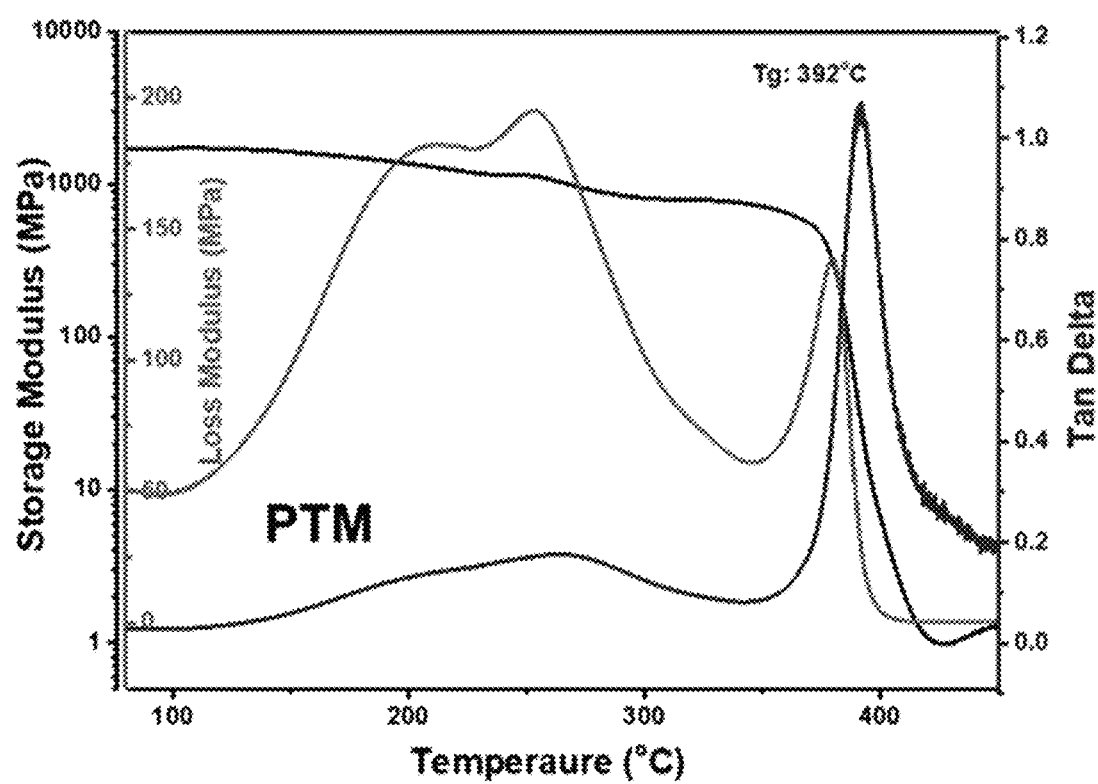
FIGS. 10A to 10D show dynamic mechanical analysis (DMA) curves of PFTM prepared in Example 1, PFBM prepared in Example 2, PTM prepared in Example 3, and PBP prepared in Comparative Example 1.
Figure 10B:
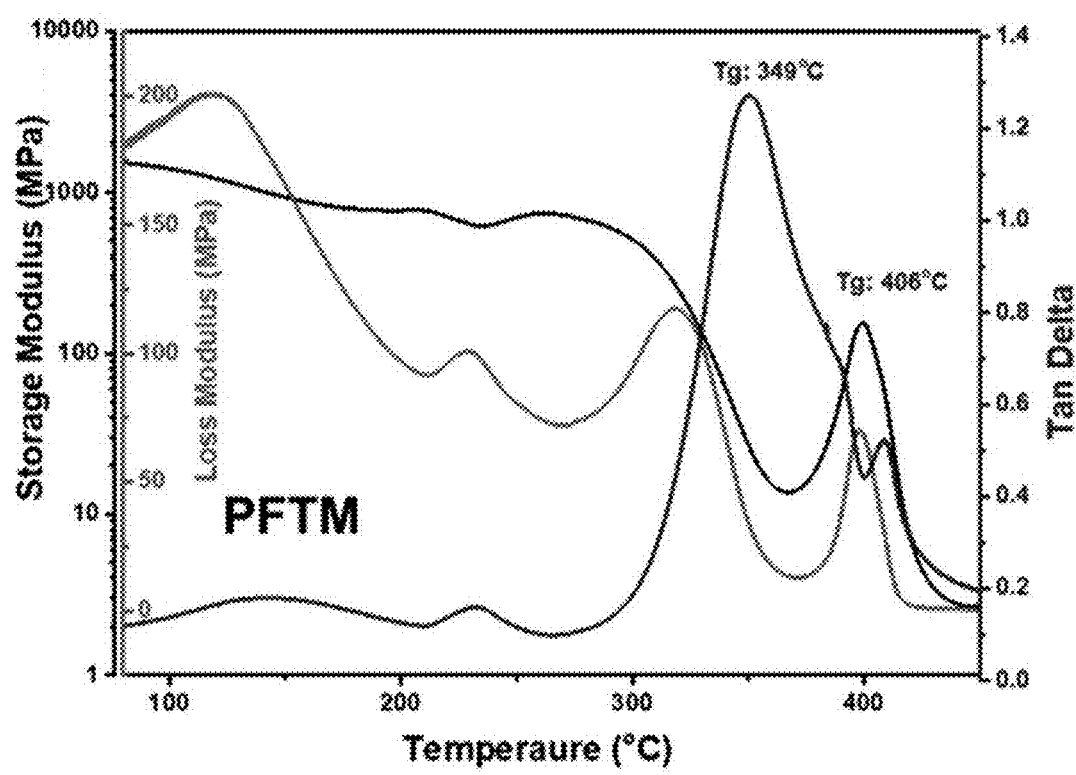
Figure 10C:
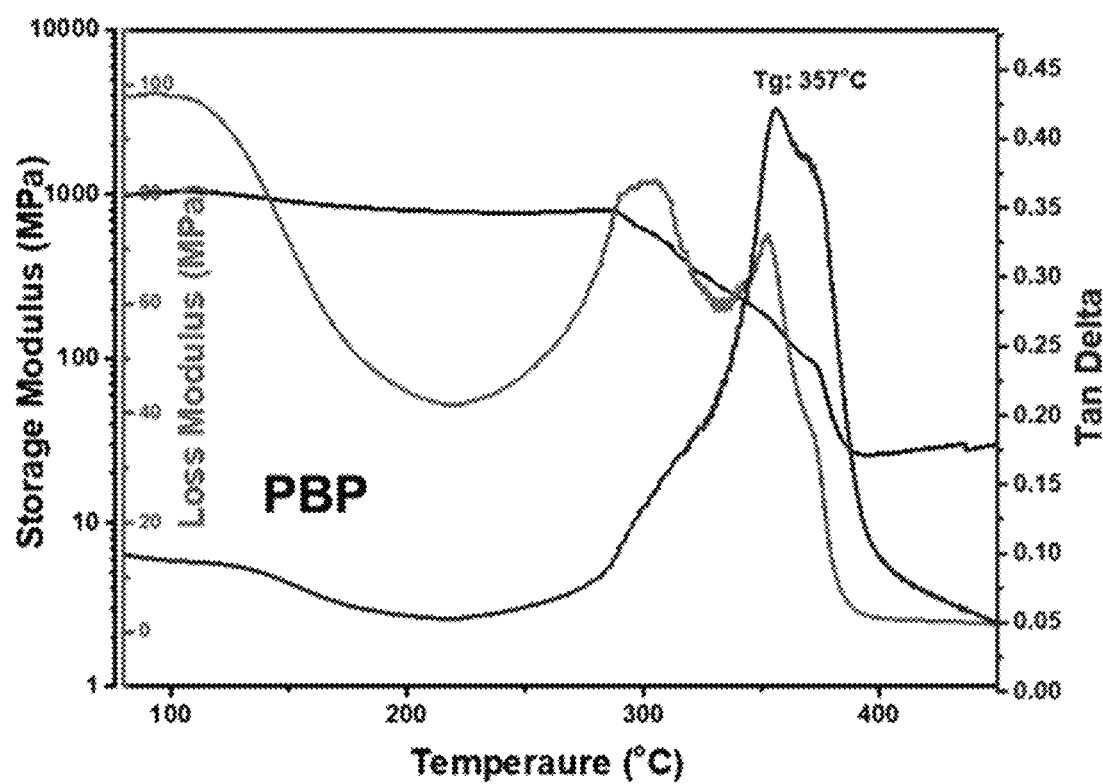
Figure 10D:
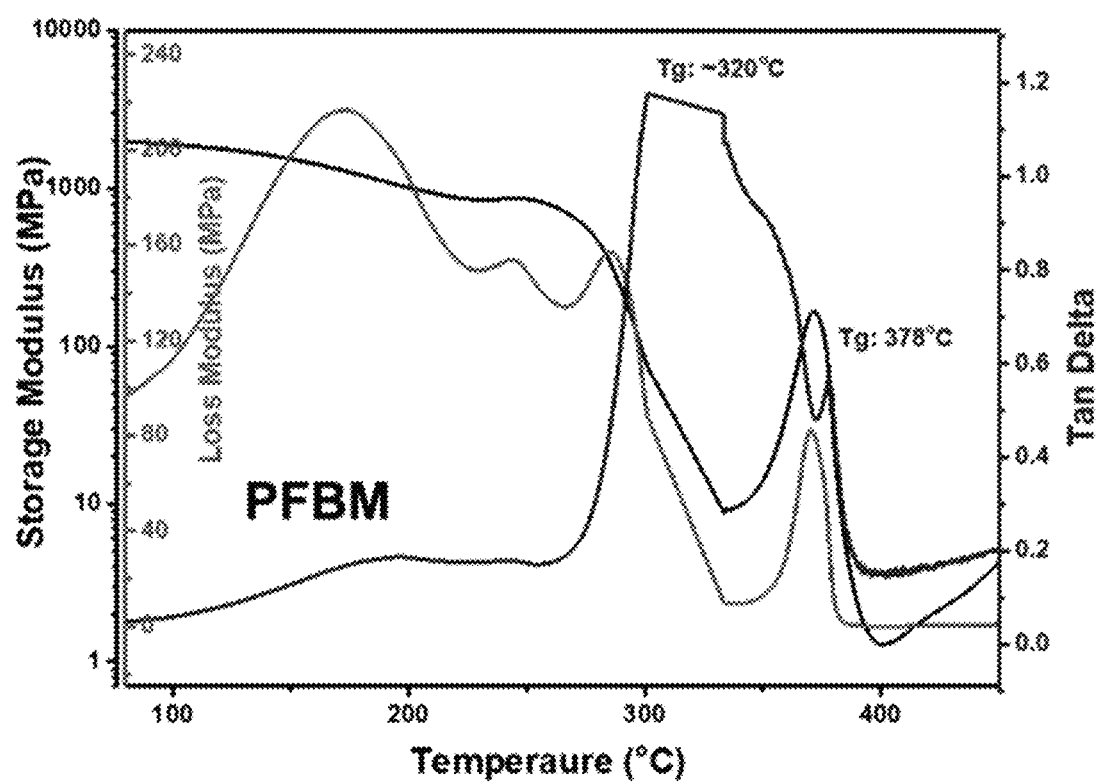

FIGS. 9A and 9B show thermogravimetric analysis (TGA) curves of the polymer ionomers prepared in Examples 1 to 3 and Comparative Examples 1 and 2, which were measured from 30° C. to 800° C. at a heating rate of 10° C./min under a nitrogen atmosphere. Every sample was isothermal at 150° C. for 5 min for solvent and water removal before data recording. As shown in FIGS. 9A and 9B, the degradation temperatures of the anion exchange ionomers were ≥200° C., thus being sufficient for application to anion exchange membrane fuel cells operating at 100° C. or lower. The first weight loss stage between 200 and 350° C. corresponds to the decomposition of the ammonium groups and the weight loss above 400° C. corresponds to the decomposition of the polymer backbone.

FIGS. 10A to 10D show dynamic mechanical analysis (DMA) curves of PFTM prepared in Example 1, PFBM prepared in Example 2, PTM prepared in Example 3, and PBP prepared in Comparative Example 1. PTM (392° C.) and PBP (357° C.) exhibited higher single $T_g$s than PFBM and PFTM. The PFBM and PFTM copolymers exhibited two $T_g$s, indicating that the copolymers have two different segments (blocks). These polymers showed very high storage moduli of ≥1000 MPa at 80° C. and the polyfluorene-based copolymers showed higher storage moduli than PTM and PBP, suggesting that the copolymers have better thermodynamic properties.

(Morphology Analysis)

Figure 11A:
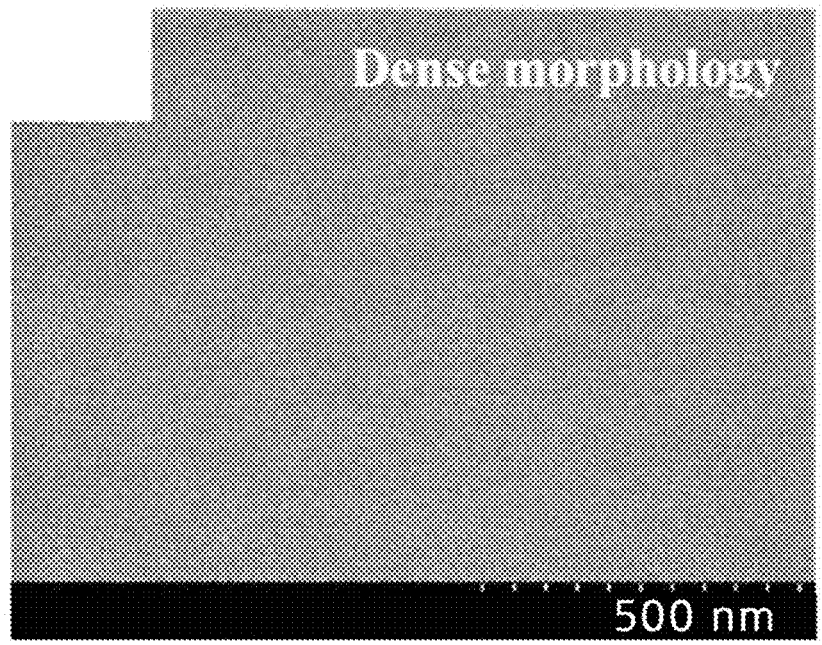
FIGS. 11A to 11F show in-plane (FIG. 11A) and cross-sectional scanning electron microscopy (SEM) images of a PFTP membrane fabricated in Example 5 (FIG. 11B), and atomic force microscopy (AFM) images of hydrated PBP (Comparative Example 3) (FIG. 11C), PFBP (Example 5) (FIG. 11D), PTP (Comparative Example 3)(FIG. 11E), and PFTP membranes (Example 5) (FIG. 11F) in OH⁻ form, respectively.
Figure 11B:
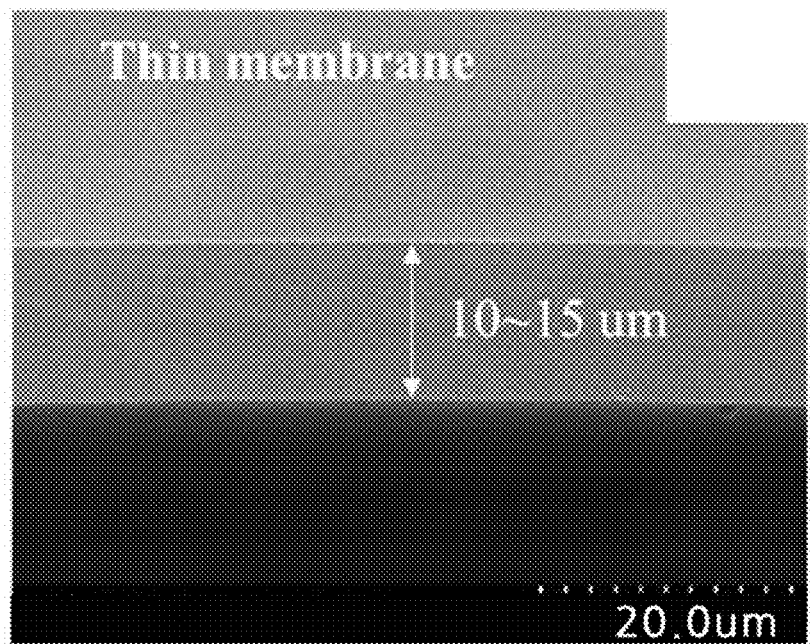
Figure 11C:
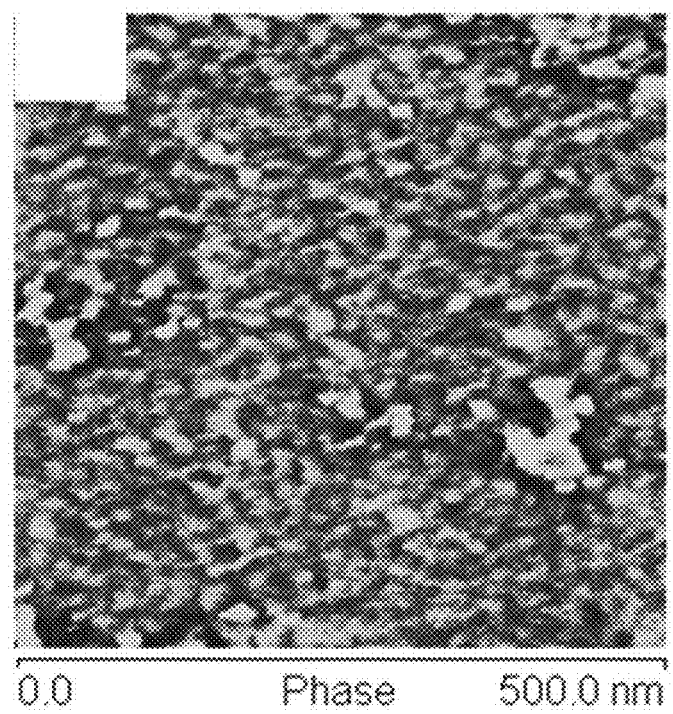
Figure 11D:
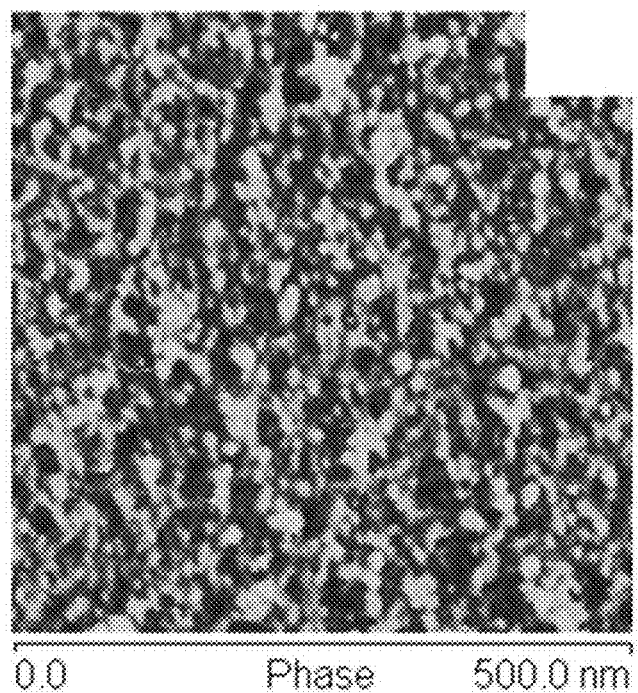
Figure 11E:
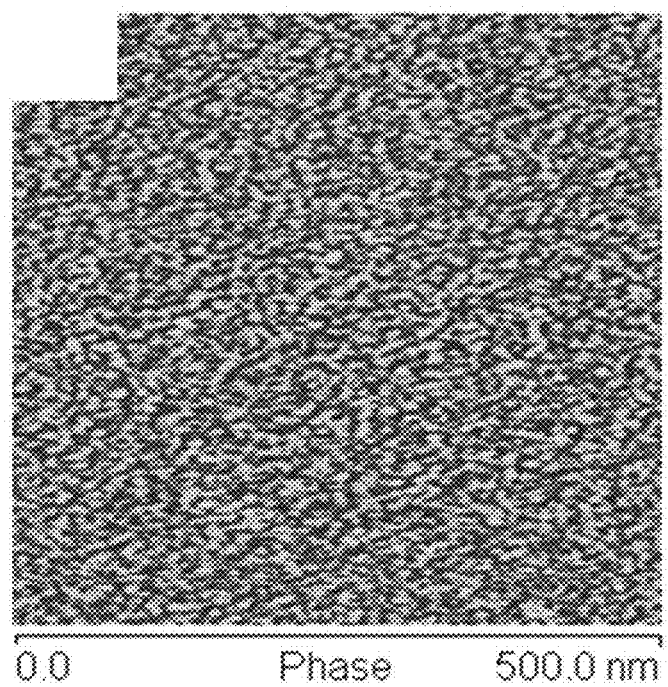
Figure 11F:
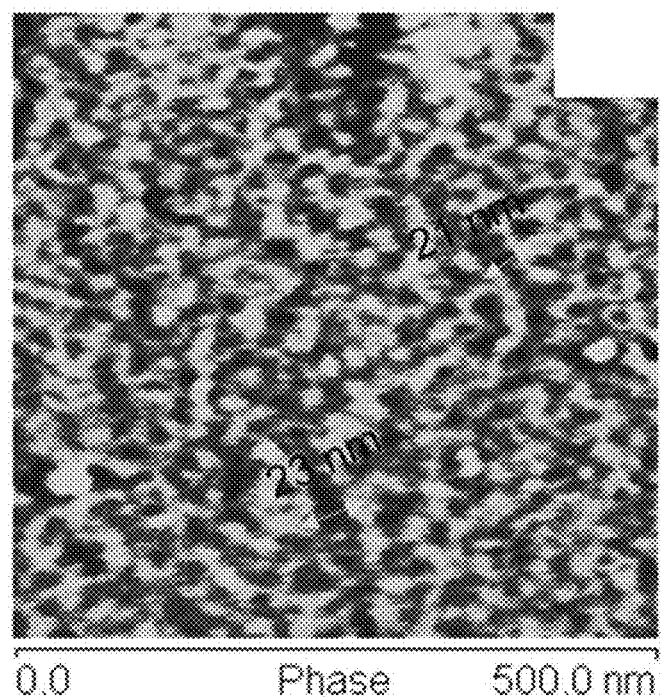

FIGS. 11A to 11F show in-plane (FIG. 11A) and cross-sectional scanning electron microscopy (SEM) images of the PFTP membrane fabricated in Example 5 (FIG. 11B). As shown in FIGS. 11A and 11B, the PFTP membrane had a dense morphology and a small thickness. FIGS. 11C to 11F show atomic force microscopy (AFM) images of hydrated PBP (Comparative Example 3), PFBP (Example 5), PTP (Comparative Example 3), and PFTP membranes (Example 5) in OH⁻ form, respectively. The bright region belongs to hydrophobic phases that are constructed by the rigid polymer backbone, while the dark region represents hydrophilic phases that are aggregated by piperidinium and water. After incorporation of the fluorene segments (blocks) into the polyarylpiperidinium backbone, the microphase separation was greatly enhanced compared to the PBP vs. PFBP and PTP vs. PFTP microphase separations. Particularly, the PFTP membrane (see FIG. 11E) showed the maximum hydrophobic/hydrophilic phase separation along the distinct and continuous ion channels whose size was 20-25 nm. This is the reason for the significantly high ion conductivity of the PFTP anion exchange membrane.

Figure 12A:
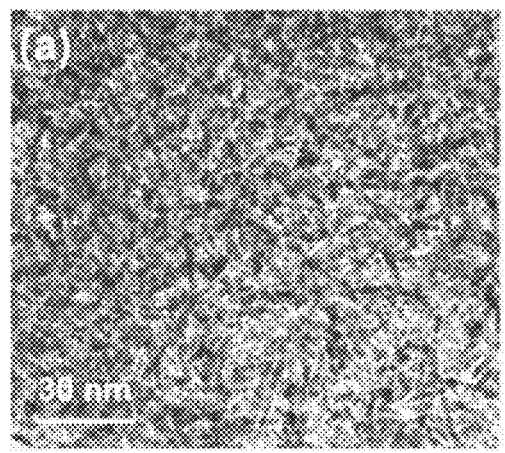
FIGS. 12A to 12C show transmission electron microscopy (TEM) images of PFTP (FIG. 12A), PFP (FIG. 12B), and PFPN (FIG. 12C) ionomers in I⁻ form prepared in Examples 1, 3, and 4, respectively.
Figure 12B:
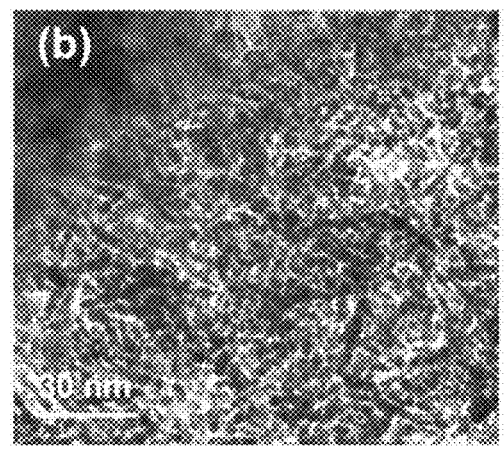
Figure 12C:
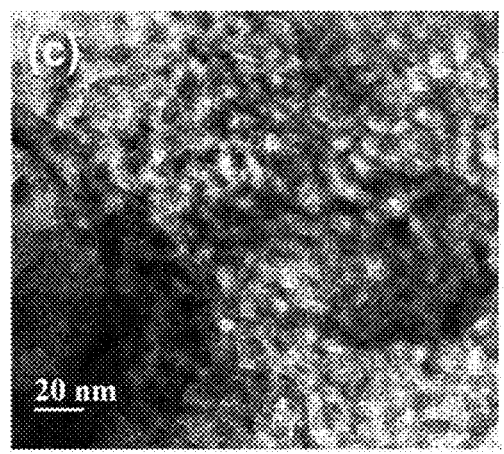

FIGS. 12A to 12C show transmission electron microscopy (TEM) images of PFTP (FIG. 12A), PFP (FIG. 12B), and PFPN ionomers (FIG. 12C) in I⁻ form prepared in Examples 1, 3, and 4, respectively. Similarly to those in the atomic force microscopy images, the dark regions are defined as hydrophilic phases and the bright regions are defined as hydrophobic phases. PFP and PFPN had enhanced microphase separation compared to PFTP. However, the PFP and PFPN ionomers had very limited molecular weights, greatly limiting fuel cell performance.

(Fuel Cell Performance)

Generally, anion exchange membranes require excellent mechanical properties and low water uptake (WU) along with superior dimensional stability and gas barrier properties, and anion exchange ionomers require good solubility (or dispersibility), low adsorption on catalysts, and good water permeability. Here, the effects of the type of the anion exchange ionomers, the type of the anion exchange membranes, the type of the catalysts, backpressure, relative humidity (RH), flow rate, and feed gas on fuel cells were systematically investigated to study the applicability to anion exchange membrane fuel cells. All fuel cell data were tested at least three times to ensure repeatability and reproducibility. Based on solubility measurements, most anion exchange polymers had good solubility in IPA/DI water, indicating that all anion exchange polymers can be used as anion exchange ionomers. Commercial FAA-2-30 membrane and Fumion ionomer were used for comparison.

1. Effect of Type of the Anion Exchange Ionomers

Figure 13A:
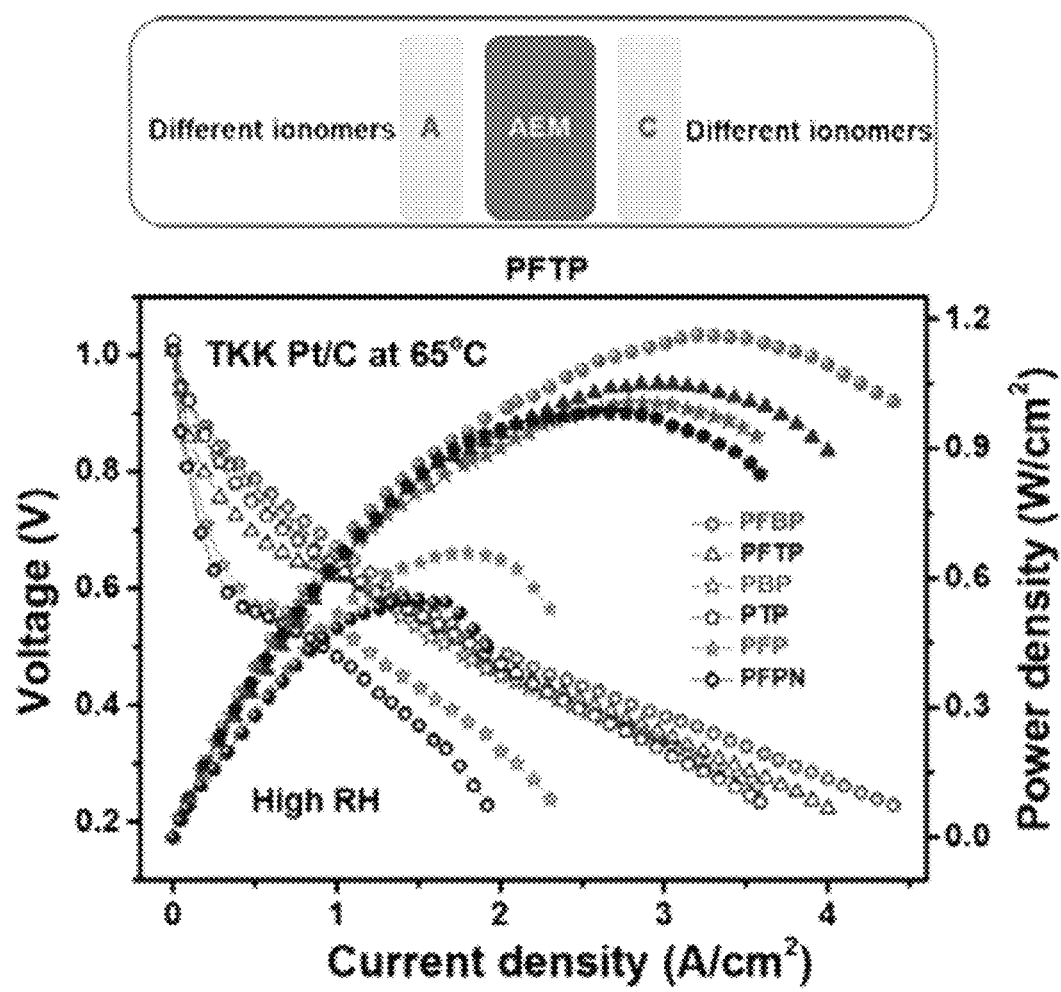
FIGS. 13A to 13D show the performances of fuel cells with different types of anion exchange ionomers based on TKK Pt/C catalysts (0.33 mg/cm²) under $H_2/O_2$ conditions (A/C flow rate: 1000/1000 mL/min): PFTP membrane (25±3 μm) at 65° C. (A/C dew points: 61/65° C. without backpressure) (FIG. 13A); PFTP membrane (25±3 μm) at 80° C. (A/C dew points: 66.5/80° C. and 2.0/1.1 bar A/C backpressure) (FIG. 13B); and commercial FAA-3-20 membrane (20±2 μm) at 65° C. (A/C dew points: 63/65° C., 1.1/1.1 bar backpressure) (FIG. 13C), and the performances of fuel cells with different types of anion exchange ionomers based on TKK Pt/C catalysts (0.33 mg/cm²) at 80° C. under $H_2/O_2$ conditions (A/C flow rate: 1000/1000 mL/min, A/C dew points: 66.5/80° C., 2.0/1.1 bar A/C backpressure) (FIG. 13D).
Figure 13B:
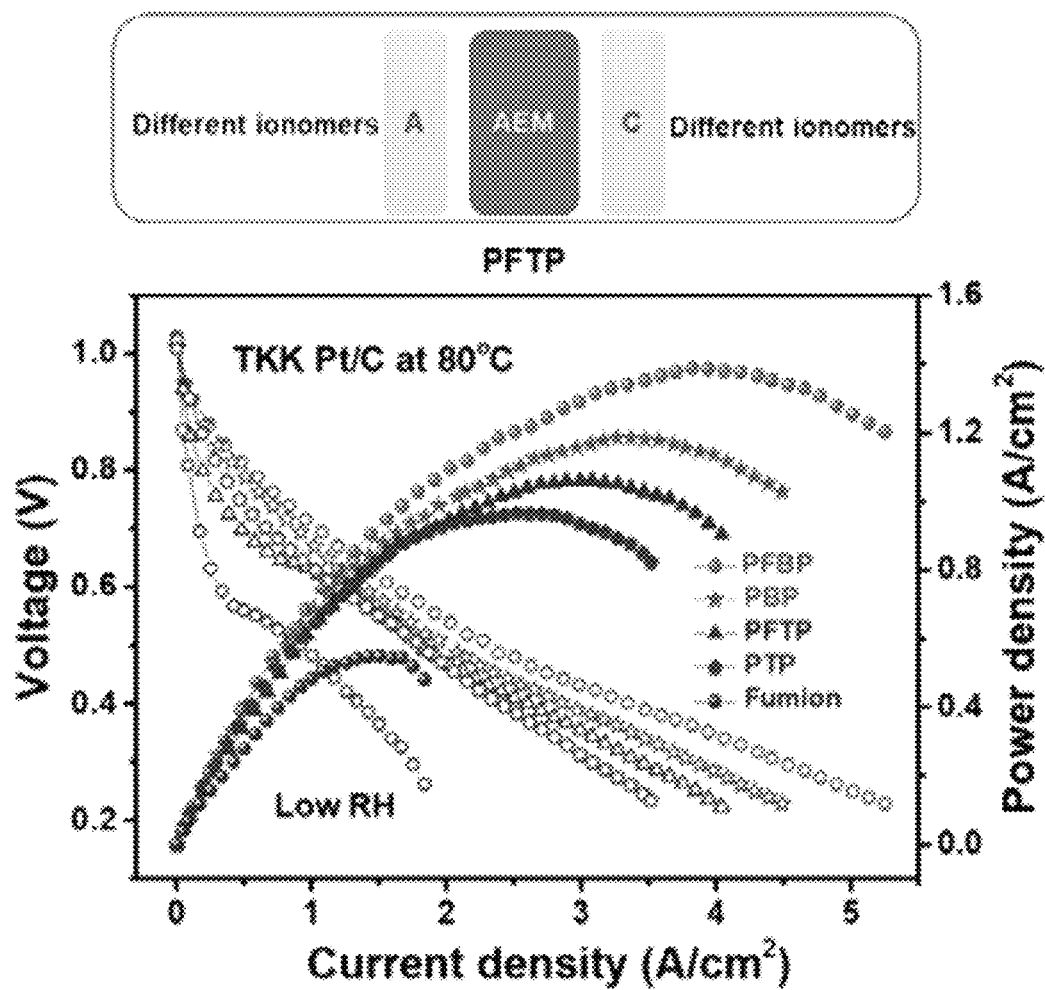
Figure 13C:
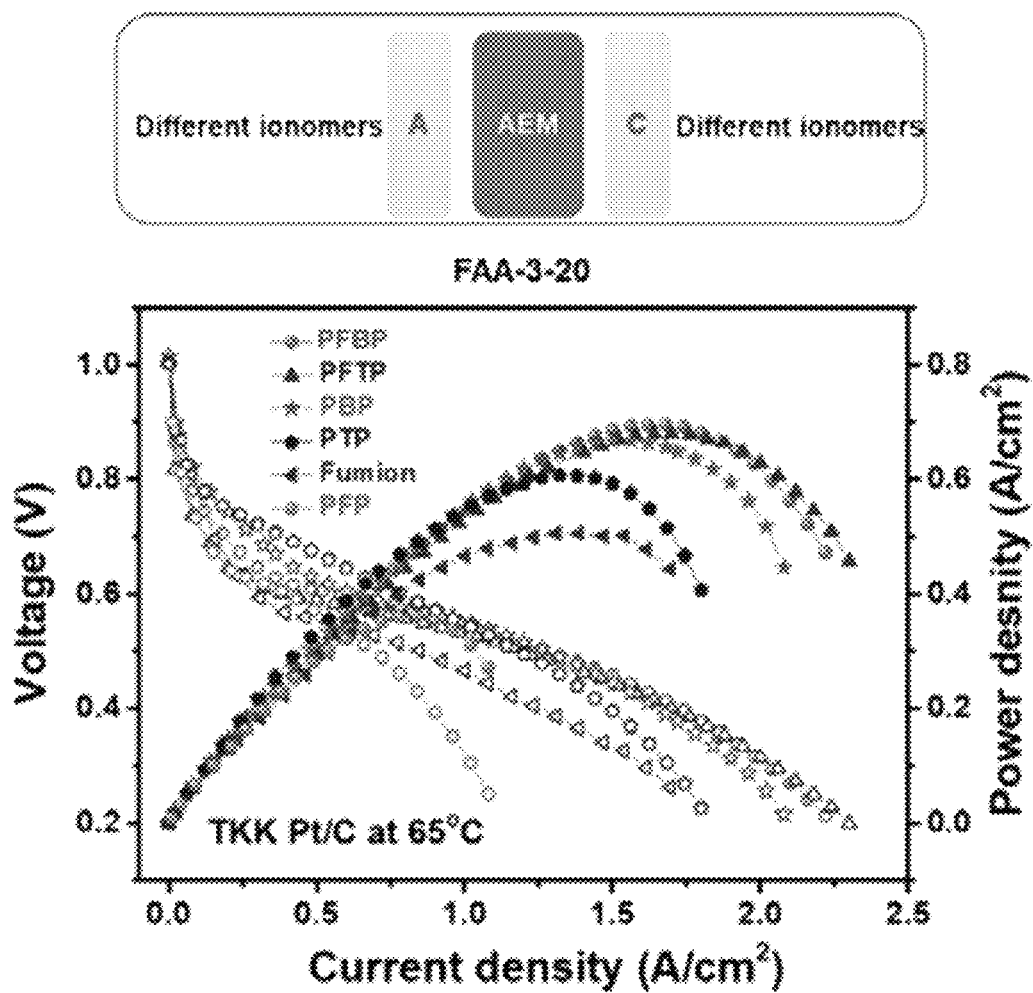
Figure 13D:
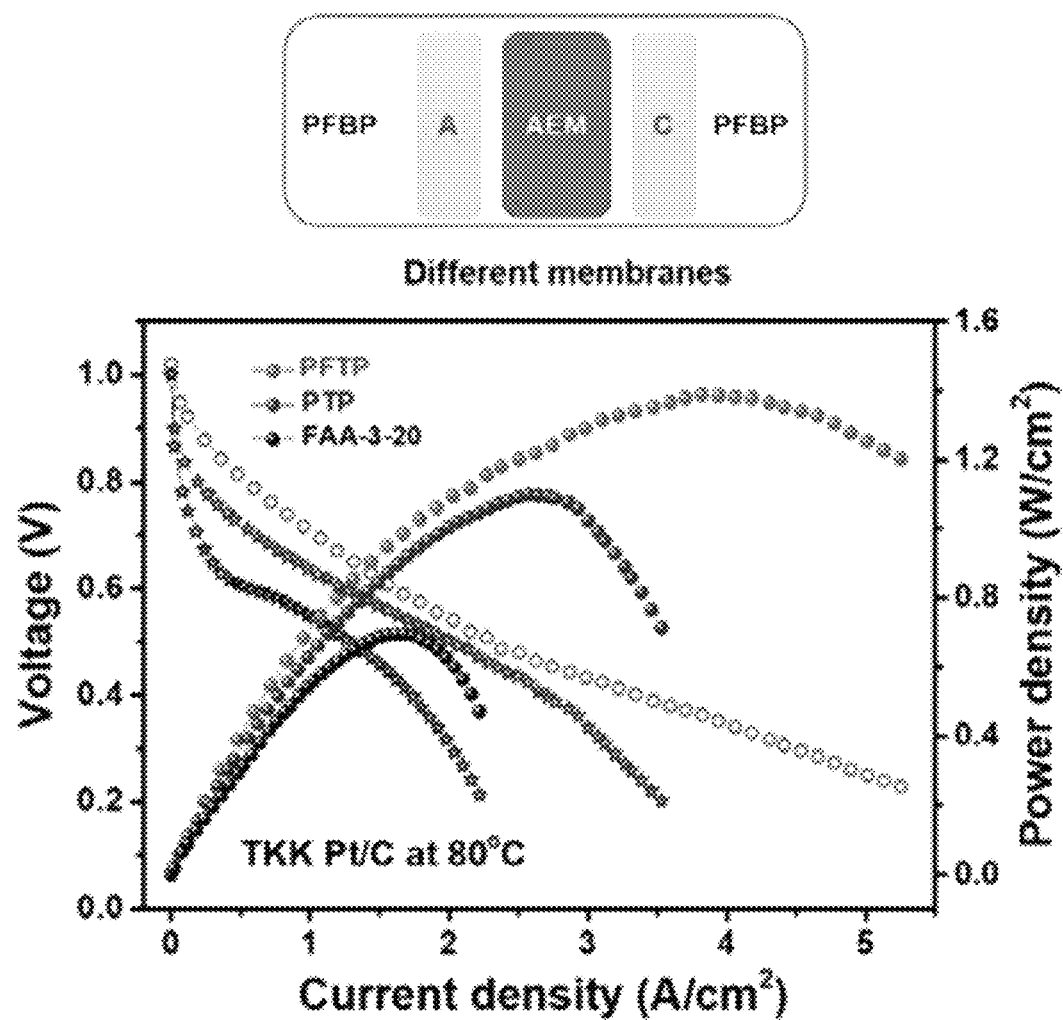

FIGS. 13A to 13D show the performances of fuel cells with different types of anion exchange ionomers based on TKK Pt/C catalysts (0.33 mg/cm²) under $H_2/O_2$ conditions (A/C flow rate: 1000/1000 mL/min): PFTP membrane (25±3 μm) at 65° C. (A/C dew points: 61/65° C. without backpressure) (FIG. 13A); PFTP membrane (25±3 μm) at 80° C. (A/C dew points: 66.5/80° C. and 2.0/1.1 bar A/C backpressure) (FIG. 13B); and commercial FAA-3-20 membrane (20±2 μm) at 65° C. (A/C dew points: 63/65° C., 1.1/1.1 bar backpressure) (FIG. 13C), and the performances of fuel cells with different types of anion exchange ionomers based on TKK Pt/C catalysts (0.33 mg/cm²) at 80° C. under $H_2/O_2$ conditions (A/C flow rate: 1000/1000 mL/min, A/C dew points: 66.5/80° C., 2.0/1.1 bar A/C backpressure) (FIG. 13D).

For the PFTP anion exchange membrane, the PFBP and PFTP ionomers had higher peak power densities (PPD) (>1 W/cm²) in the anode at high RH (85%) than the other anion exchange ionomers, as shown in FIG. 13A. This is probably because of low phenyl adsorption of the fluorene-based anion exchange polymers. Nevertheless, the PFBP and PBP anion exchange ionomers with water permeabilities in the anode at low RH (50%) showed much higher PPDs (PFBP:

1.42 W/cm$^2$) than the low water vapor permeabilities of the PFTP, PTP, and Fumion anion exchange ionomers, as shown in FIG. 13B. Moreover, the PPDs of the PFTP and PTP ionomers could not be further improved even at a high temperature (80° C.) in the anode at 50% RH due to severe dry-out in the anode at high current density. In contrast, the PFBP and PFTP ionomers were superior to other ionomers and showed similar PPDs at 100% RH to that of commercial FAA-3-20 membrane (see FIG. 13C). In practice, the use of an anion exchange ionomer with a low water uptake or the operation of a fuel cell at low RH contributes to solving anode flooding issues. That is, PFTP can become a very efficient ionomer for an anion exchange membrane fuel cell operating at high RH due to its high ion conductivity, low water uptake (WU), and phenyl adsorption effect. In addition, the PFBP ionomer showed a higher PPD in the anode at high RH than the PFTP ionomer because of its low phenyl adsorption and high water permeability, contributing to rapid water diffusion from the anode to the cathode at high current density. In this case, an anion exchange ionomer with low WU actually contributes to solving cathode flooding issues when operated at high RH. However, an anion exchange ionomer with low WU has practically limited water permeability and tends to dry out at low RH even in the cathode.

The PFP and PFPN ionomers with low phenyl adsorption were expected to show good fuel cell performance but displayed low PPDs compared to the PFTP and FAA-2-30 anion exchange membranes (0.3-0.7 W/cm$^2$). The use of PFP and PFPN was found to cause severe catalyst layer detachment during the preparation of a membrane electrode assembly due to their very low molecular weights. In contrast, the PTP ionomer with a very high intrinsic viscosity (4.775 dL/g) had limited solubility and power density. These results strongly indicate that an anion exchange ionomer is required to have an appropriate molecular weight to very tightly fix a catalyst to an anion exchange membrane but requires good solubility to form an effective triple phase boundary (TPB). That is, the PFBP ionomer with low phenyl adsorption, high ion conductivity, and high water vapor permeability ensures outstanding fuel cell performance at different RHs, thus becoming a suitable candidate for anion exchange ionomer applications.

Figure 14:
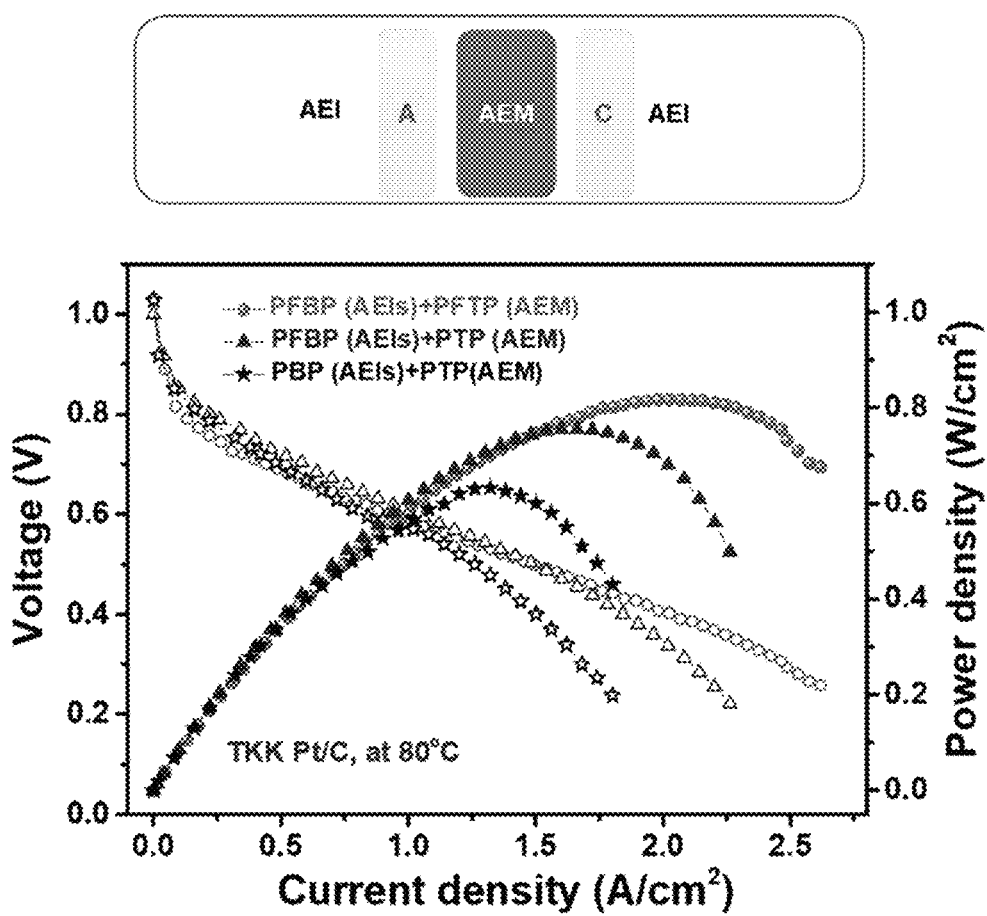
FIG. 14 compares the performances of fuel cells with PFTP and PTP membranes (thickness 25±3 μm) and PFBP and PBP ionomers based on TKK Pt/C catalysts (without backpressure)

Based on this, the performances of fuel cells with different anion exchange membranes using the optimized PFBP ionomer in both anode and cathode were compared, as shown in FIG. 13D and FIG. 14. As expected, the PFTP anion exchange membrane showed higher PPDs than the PTP and commercial FAA-2-30 membranes in all cases. The PPD of a membrane electrode assembly based on the FAA-2-30 membrane could not be further improved at 80° C. due to severe degradation of the separator. The PTP membrane showed a power density similar to the PFTP membrane without backpressure and its performance was not dramatically improved with backpressure. The PFBP ionomer had good compatibility with the commercial FAA-3-20 membrane as well as the PFTP-based anion exchange membrane.

2. Effects of Relative Humidity (RH) and Molecular Weight

Figure 15A:
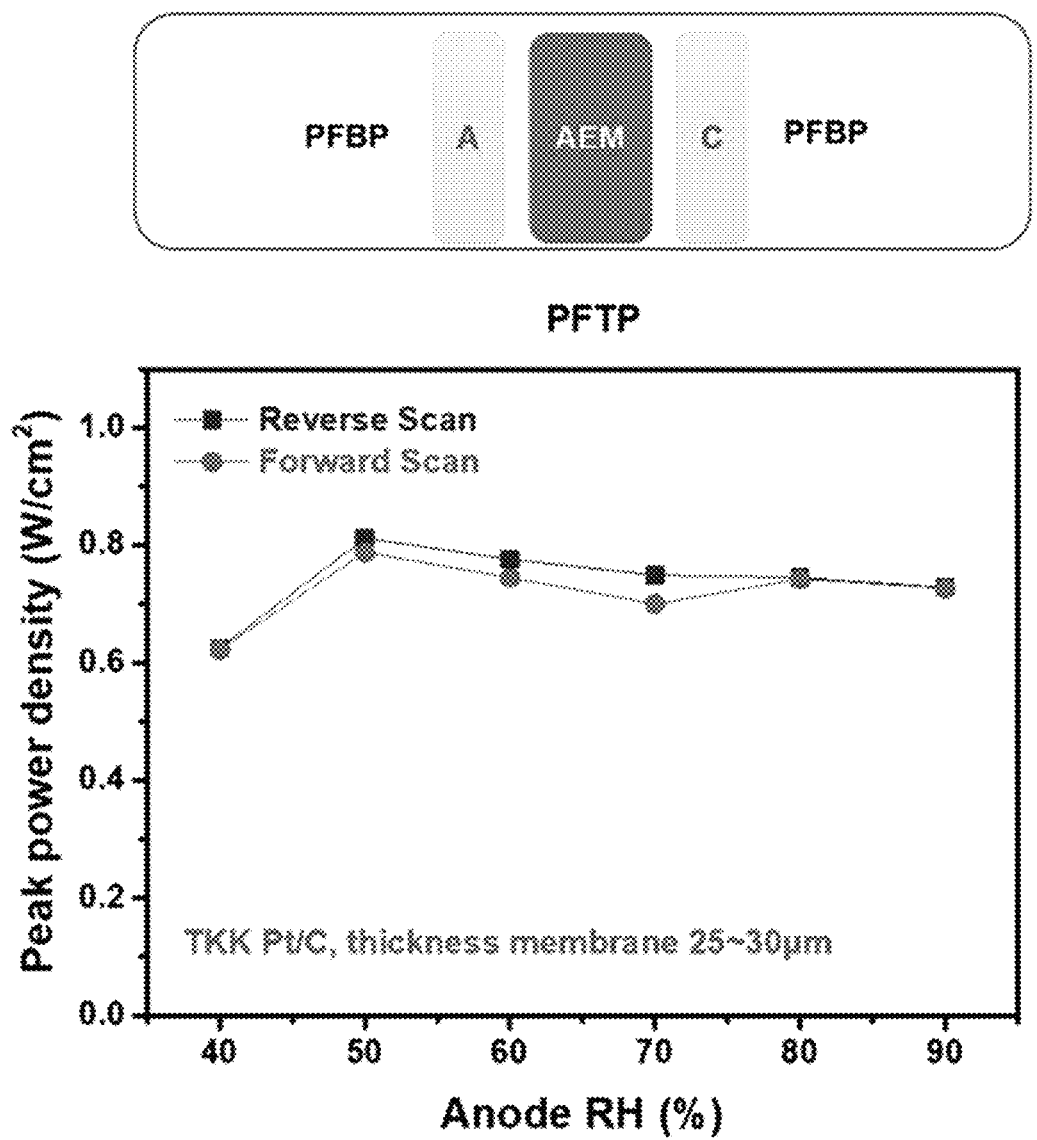
FIGS. 15A and 15B show the effect of relative humidity (RH) on the peak power density (PPD) of a fuel cell with a 25 to 30 μm thick membrane based on a TKK Pt/C catalyst: in the anode with the cathode at 100% relative humidity (FIG. 15A); and in the cathode with the anode at 50% relative humidity (FIG. 15B).
Figure 15B:
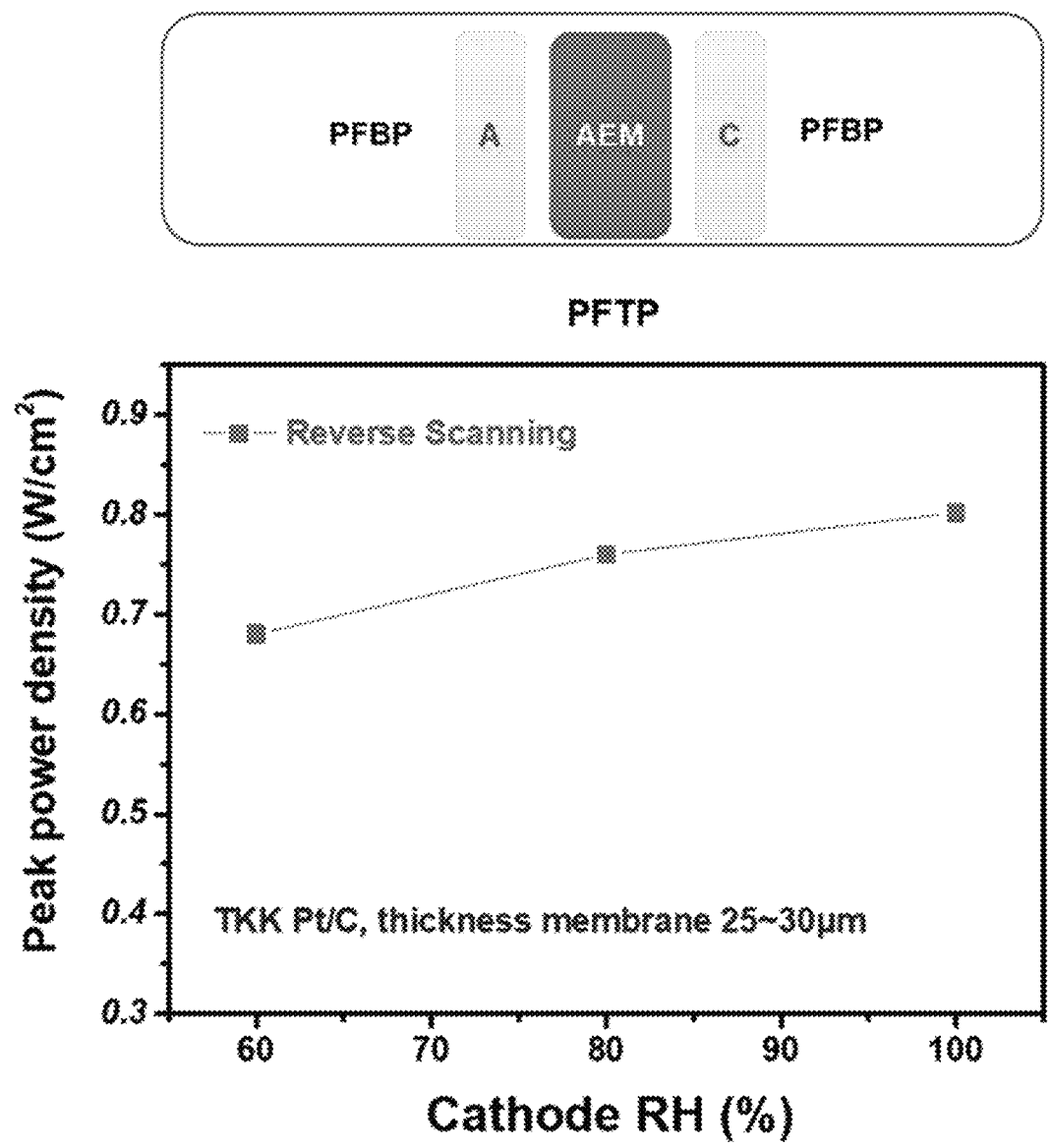
Figure 16A:
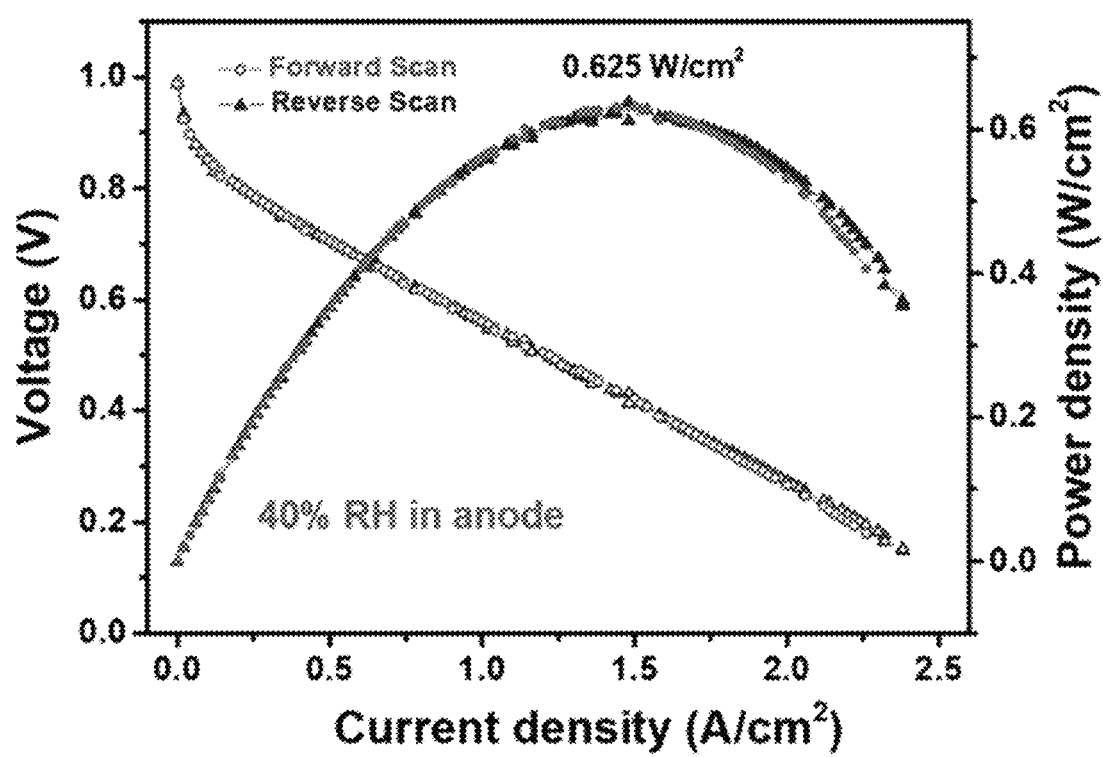
FIGS. 16A to 16F show detailed I-V curves revealing the effect of relative humidity (RH) on the peak power density (PPD) of the fuel cell of FIG. 15A by forward and reverse scanning.
Figure 16B:
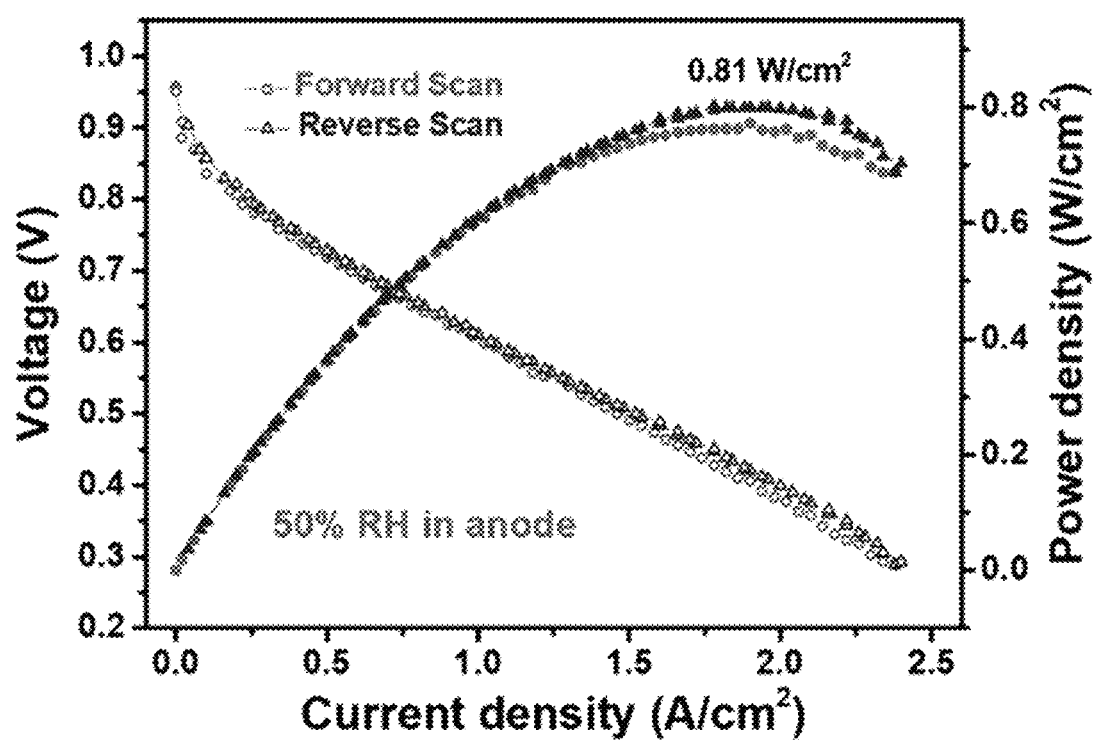
Figure 16C:
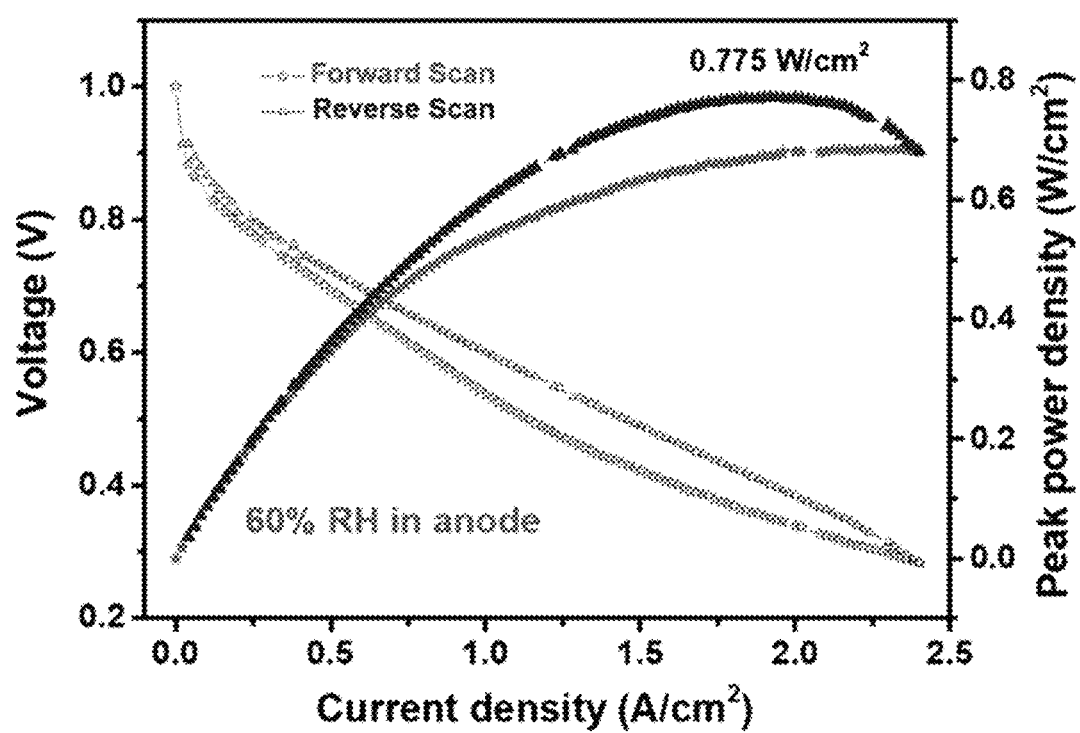
Figure 16D:
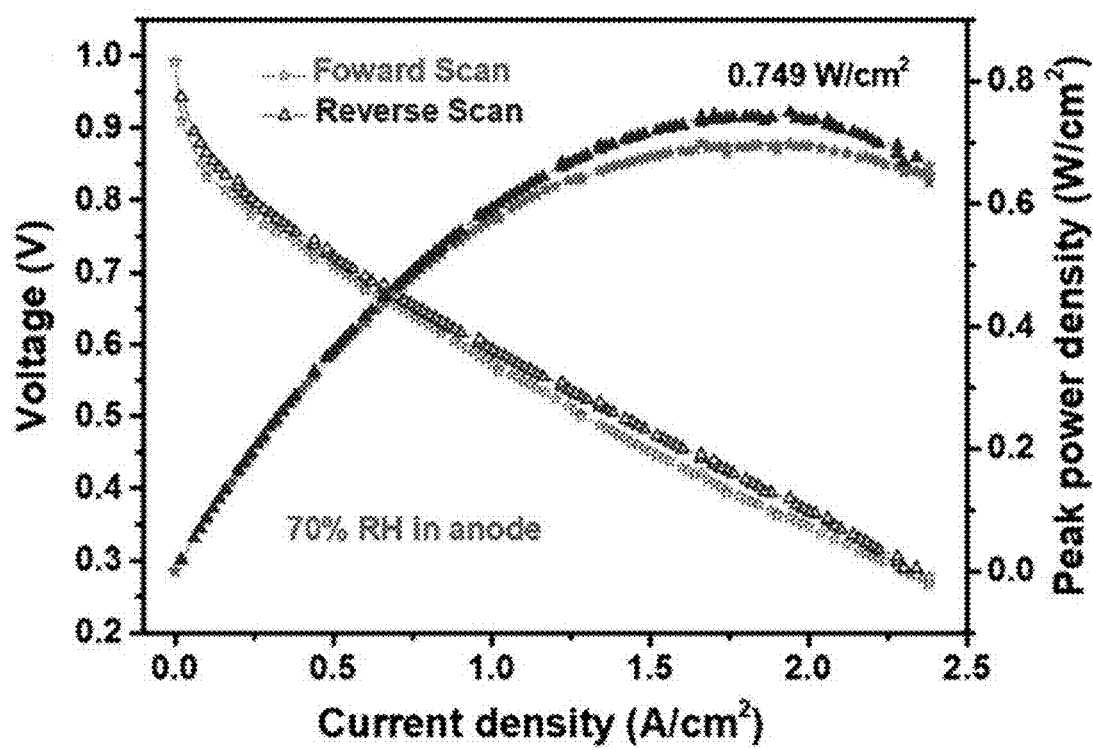
Figure 16E:
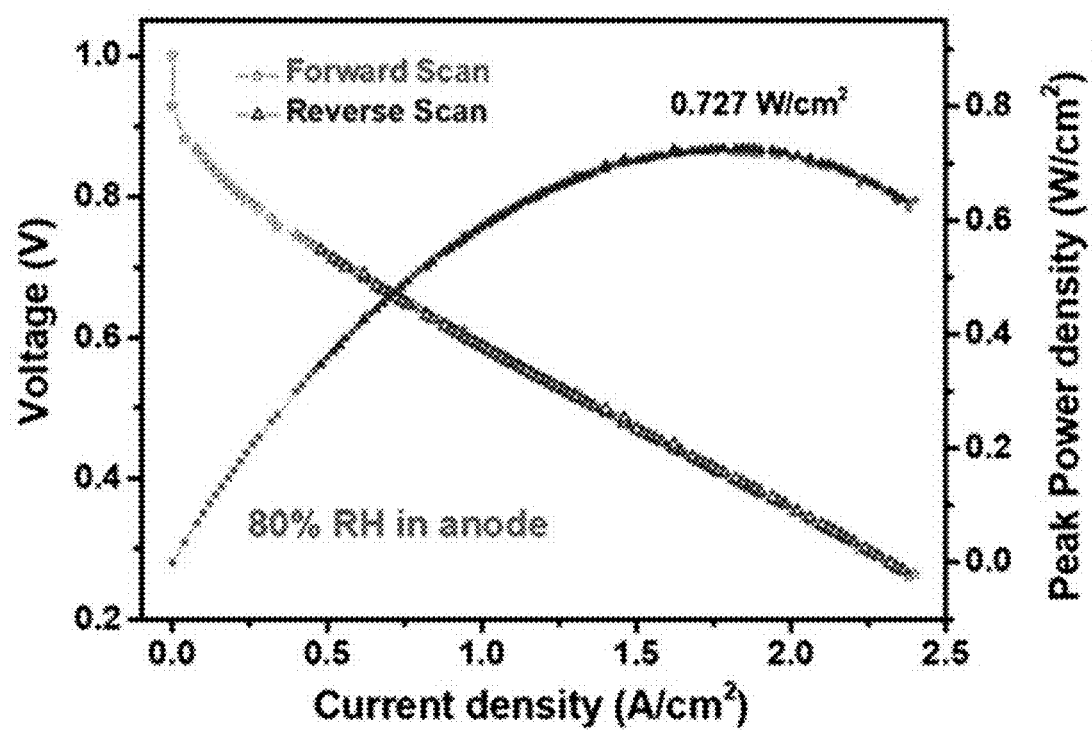
Figure 16F:
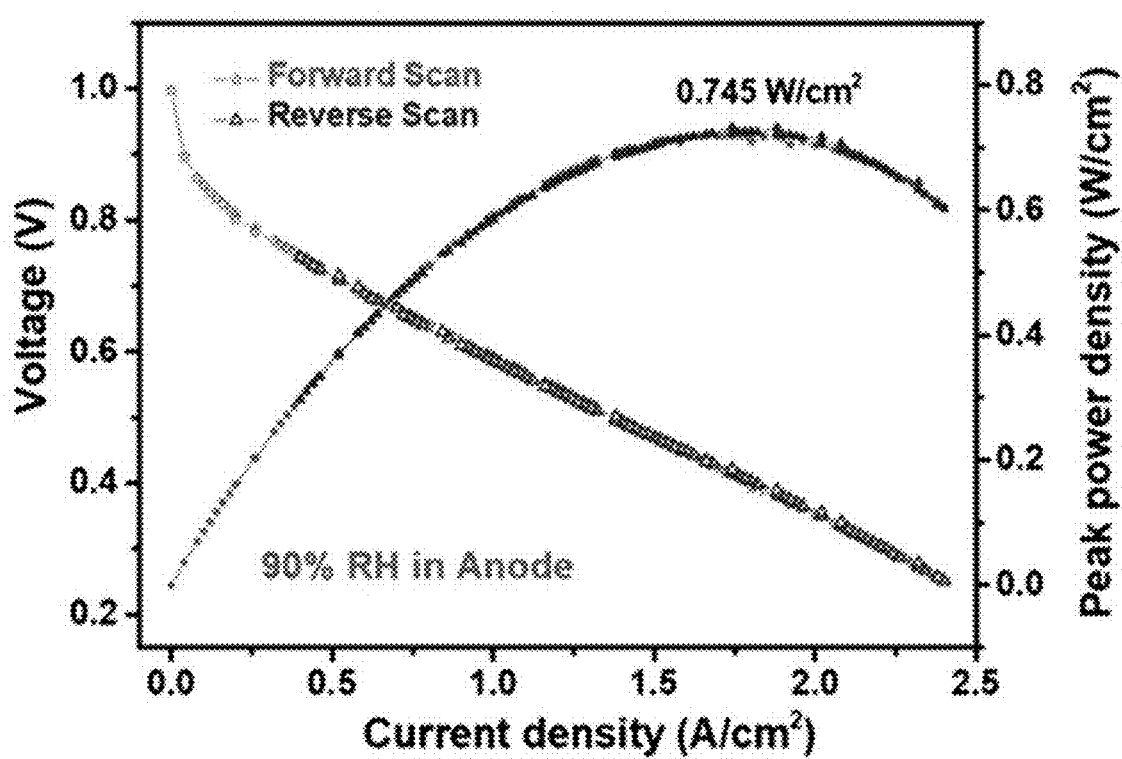

RH has a significant effect on power density, especially in the anode. FIGS. 15A and 15B show the effect of relative humidity (RH) on the peak power density (PPD) of a fuel cell with a 25 to 30 µm thick membrane based on a TKK Pt/C catalyst: in the anode with the cathode at 100% relative humidity (FIG. 15A); and in the cathode with the anode at 50% relative humidity (FIG. 15B).

FIGS. 16A to 16F show detailed I-V curves revealing the effect of relative humidity (RH) on the peak power density (PPD) of the fuel cell of FIG. 15A by forward and reverse scanning.

Figure 19:
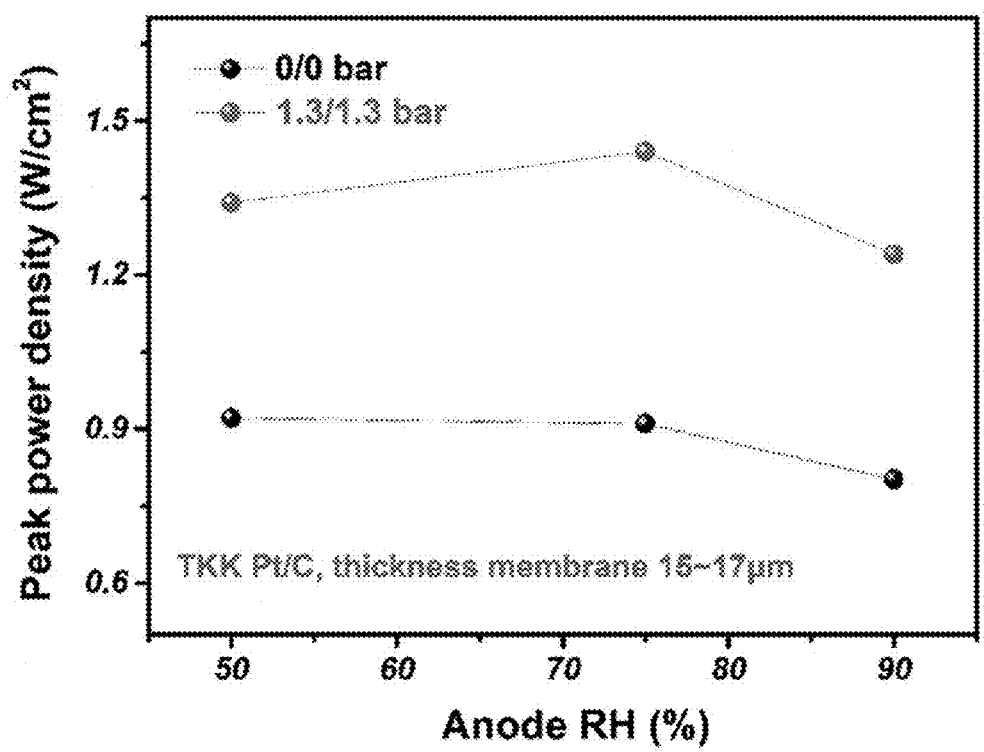
FIG. 19 shows the results of re-examining the effect of relative humidity (RH) on the performance of a fuel cell based on a thin membrane (15-17 μm) with reasonable backpressure.

50% RH in the cathode and 100% RH in the anode were previously determined as optimal conditions for the TKK Pt/C-based cell without backpressure (see FIGS. 15A to 15B and 16). However, 50% RH in the cathode tended to dry at high current density by backpressure. Therefore, the effect of RH by backpressure and thin membrane were again examined because backpressure and membrane thickness had an influence on the humid environment of the electrode, affecting the electrical performance of the fuel cell. As shown in FIG. 19, 75% RH at the cathode and 100% RH at the anode were set to optimal conditions with backpressure and thin membrane to prevent dry-out of the anode.

Figure 17:
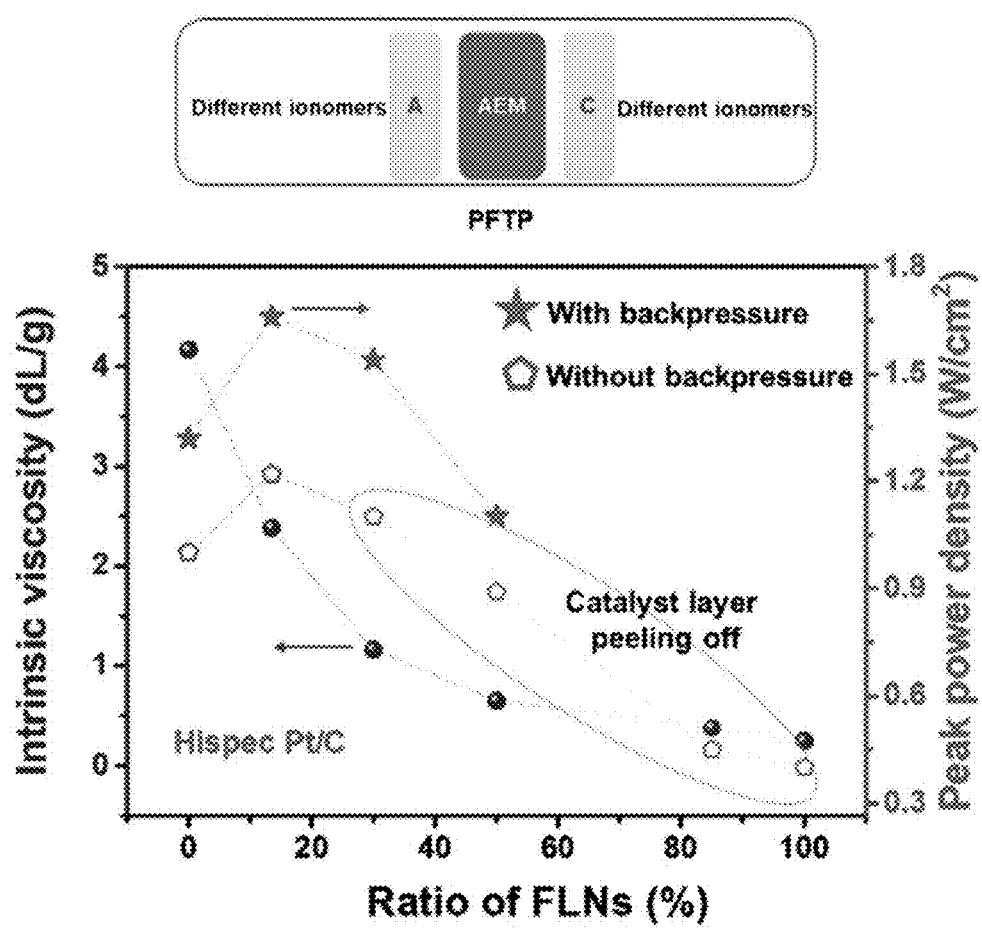
FIG. 17 shows the relationship between the intrinsic viscosity and the PPD of a PFBP ionomer prepared in Example 2 depending on the ratio of fluorenes under the same conditions (A/C catalyst: Hispec Pt/C with 0.33 mg/cm² loading, flow rate: 1000/1000 mL/min, dew point: 73.5/80° C., open red marks indicate PPDs without back pressure, solid red marks indicate PPDs at 1.3/1.3 bar back pressure).

FIG. 17 shows the relationship between the intrinsic viscosity and the PPD of the PFBP ionomer prepared in Example 2 depending on the ratio of fluorenes under the same conditions (A/C catalyst: Hispec Pt/C with 0.33 mg/cm$^2$ loading, flow rate: 1000/1000 mL/min, dew point: 73.5/80° C., open red marks indicate PPDs without back pressure, solid red marks indicate PPDs at 1.3/1.3 bar back pressure). As shown in FIG. 17, the relationship among intrinsic viscosity, PPD, and ratio of fluorenes was investigated. The intrinsic viscosity of the anion exchange ionomer decreased with increasing ratio of fluorenes in the copolymer. The PPD was 1.21 W/cm$^2$ when the ratio of fluorenes was 10-20% and no backpressure was applied at 80° C. The highest PPD (1.64 W/cm$^2$) were achieved with backpressure applied. However, when the intrinsic viscosity of the anion exchange ionomer was <1 dL/g, the catalyst layer was detached and the PPD was largely decreased. Indeed, when the ratio of fluorenes in the PFBP anion exchange ionomer was 30%, a very high PPD was achieved even though the catalyst layer was partially detached.

3. Effects of Catalyst Type, Backpressure and Flow Rate

Anion exchange membrane fuel cells have made great advances in terms of PPD but most high-performance fuel cells are based on rather unrealistic conditions such as high feed gas flow rate, backpressure, and use of pure O$_2$. Thus, the effects of catalyst type, backpressure, flow rate, and feed gas on fuel cell performance were systematically investigated under optimized cathode RH conditions. Backpressure has a great influence on power density. Many researchers have achieved high PPDs by applying backpressures of 250 kPa or more. In principle, backpressure is effective in improving PPD by 30-100% in the present invention, which is similar to that of the previously reported PAP-TP-85 membrane. Details of the TKK Pt/C-based backpressure effect can be found in FIG. 19. Only an anion exchange membrane that is physically robust and has a verified gas permeability is suitable for high backpressure application during measurement of membrane electrode assembly performance. Otherwise, backpressure may pose great hazards at high feed gas flow rates during measurement of fuel cell performance.

Figure 18A:
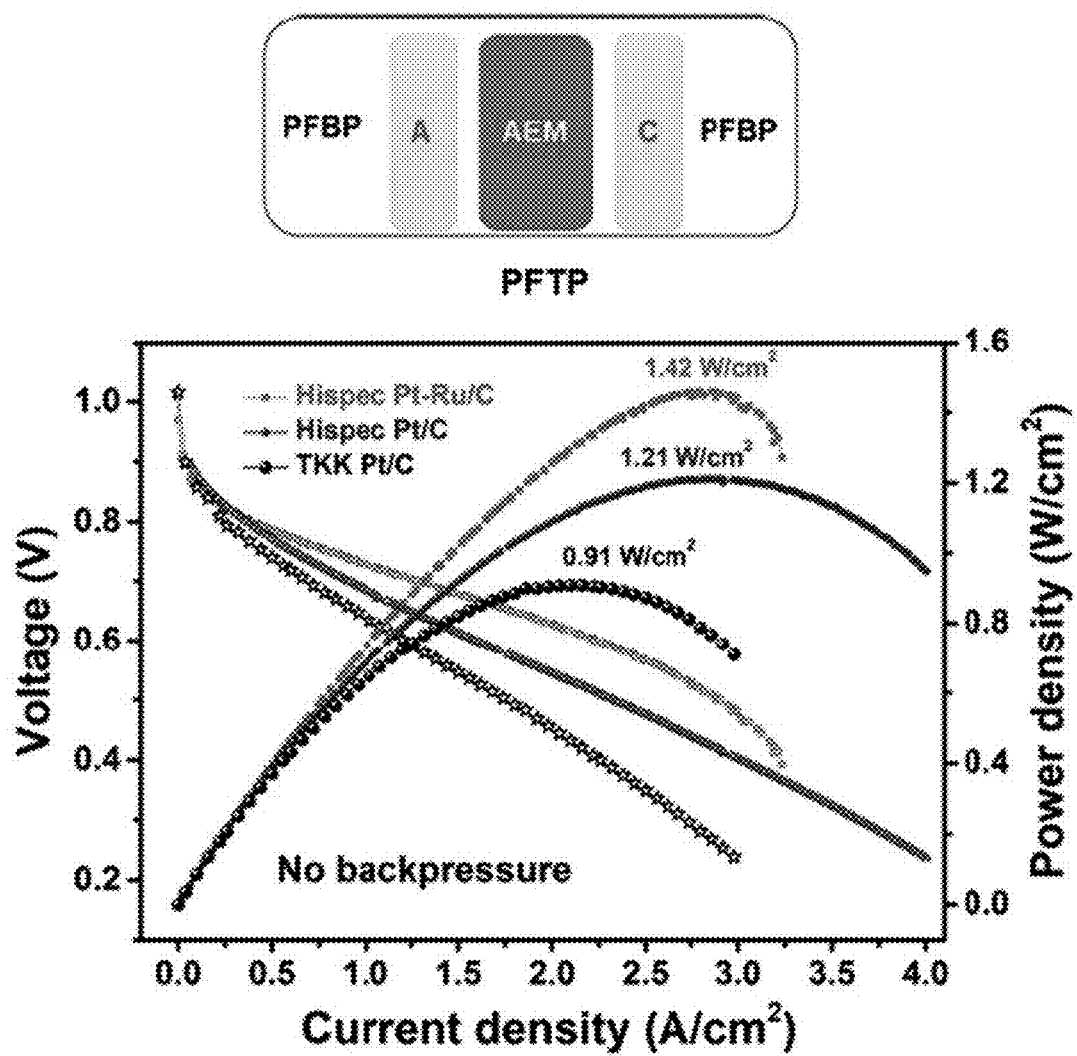
FIG. 18A shows effect of catalysts on PPD without backpressure.
Figure 18B:
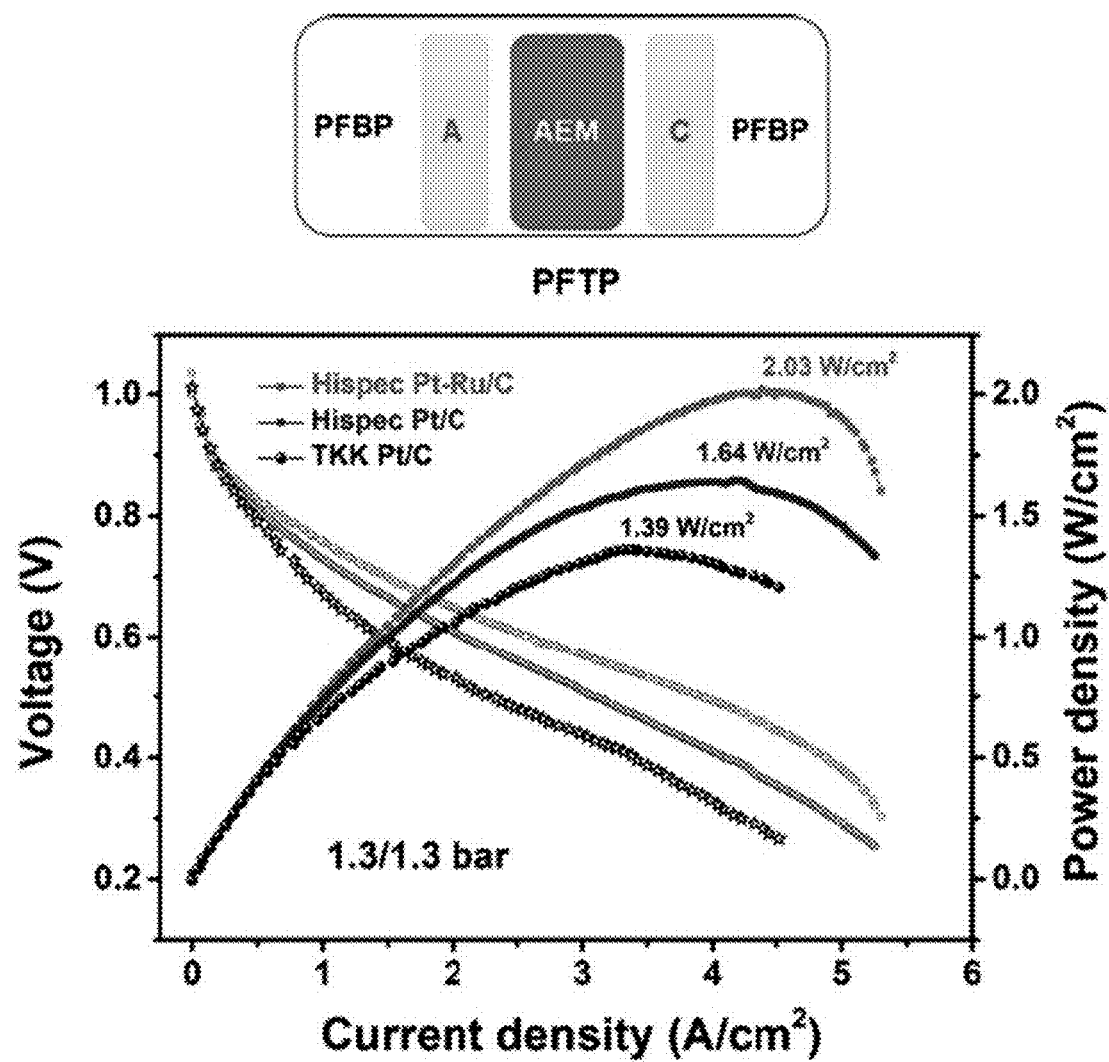
FIG. 18B shows effect of catalysts on power density with 1.3/1.3 bar backpressure applied to the cathode and anode.
Figure 18C:
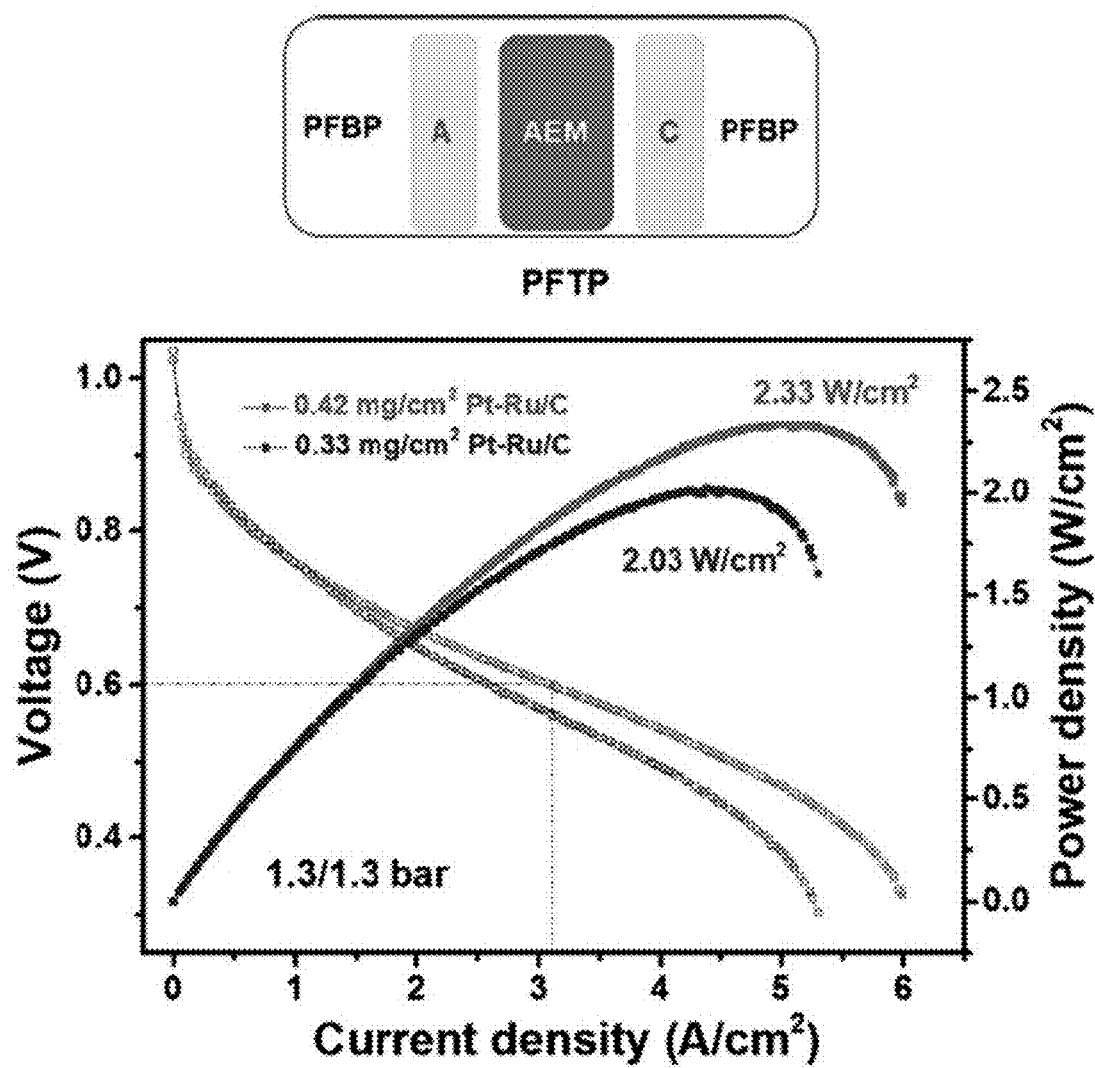
FIG. 18C shows effect of Pt—Ru/C content on power density.
Figure 18D:
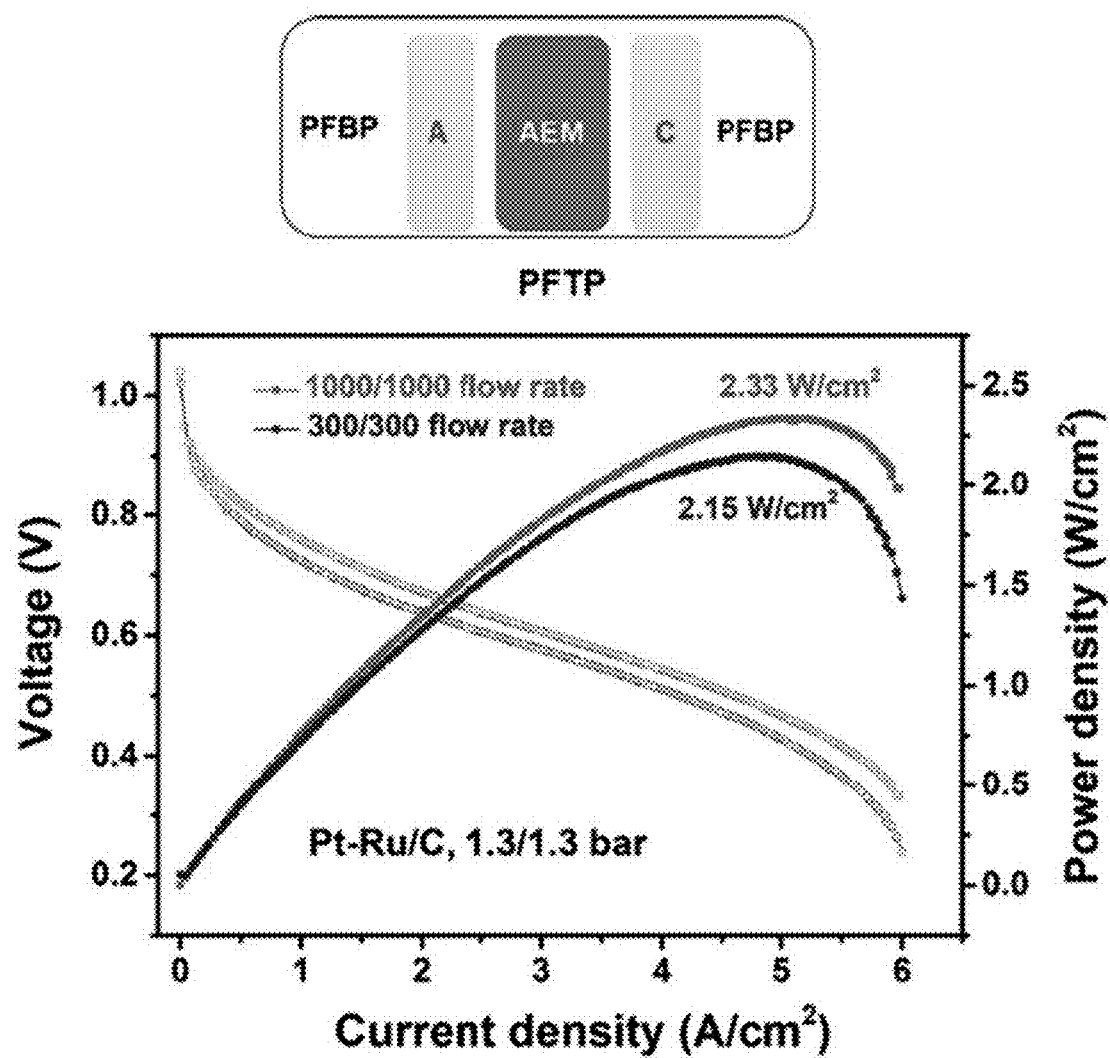
FIG. 18D shows effect of flow rate on power density in a PFTP membrane and a PFBP ionomer.

FIG. 18A shows effect of catalysts on PPD without backpressure, FIG. 18B shows effect of catalysts on power density with 1.3/1.3 bar backpressure applied to the cathode and anode, FIG. 18C shows effect of Pt—Ru/C content on power density, and FIG. 18D shows effect of flow rate on power density in the PFTP membrane and the PFBP ionomer. As shown in FIGS. 18A to 18D, the effects of catalyst types on fuel cell performance were examined to design three types of fuel cells: (1) a fuel cell based on Tanaka TKK Pt/C in both anode and cathode, (2) a fuel cell based on Hispec Pt/C in both anode and cathode, (3) a fuel cell based on Hispec Pt—Ru/C in the cathode and Hispec Pt/C, Pt—Ru/C, Hisspec Pt/C, and TKK Pt/C in the anode, which reached PPDs of 1.42 W/cm$^2$, 1.21 W/cm$^2$, and 0.91 W/cm$^2$, respectively, at 80° C. without backpressure. The Pt—Ru/C catalyst was actually superior and achieved a ~20% improved power density compared to the Pt/C catalyst. The PPD of His spec Pt/C was improved by ~30% compared to TKK Pt/C.

Figure 20:
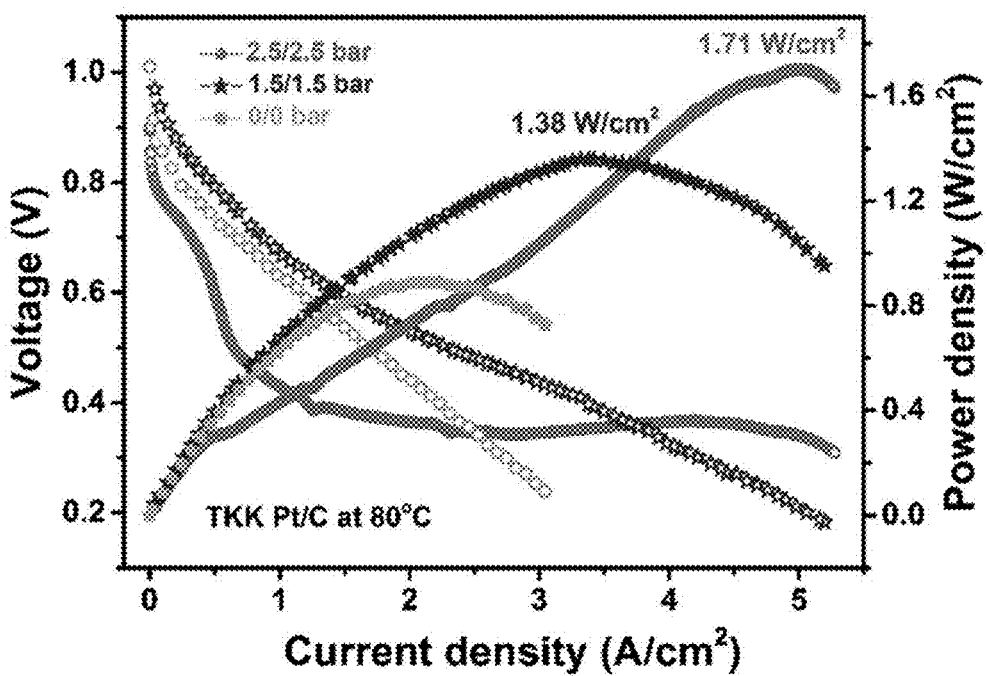
FIG. 20 shows the effect of backpressure on the performance of a fuel cell with an anode and a cathode based on a TKK Pt/C catalyst at 80° C. and at relative humidities of 50%/100% (anode/cathode).

The PPDs of single cells were dramatically improved by backpressure. The PPD of the Pt—Ru/C-based cell was 43% higher than that (2 W/cm$^2$) of the cell without backpressure (see FIG. 18B). The PPD of the cell based on TKK Pt/C was significantly improved (40-92%) with backpressure and was in the range of 1.2-1.71 W/cm$^2$ (see FIG. 20). However, although the limiting current density of the Hispec Pt/C-based cell was 5.5 A/cm$^2$, which is similar to that of the Pt—Ru/C-based cell, the PPD of the Hispec Pt/C-based cell was not improved as much as expected (by 33% compared to the cell without backpressure) due to an unknown performance loss. After the weight of Pt—Ru/C was slightly increased from 0.33 to 0.42 mg/cm$^2$, the PPD reached 2.34 W/cm$^2$ at 80° C. with reasonable backpressure (1.3/1.3 bar) (see FIG. 18C).

It is noteworthy that most of the recent anion exchange membrane fuel cells use a high flow rate (>1000 mL/min) and a high Pt—Ru/C content. In contrast, even when the flow rate was reduced to 300 mL/min in the present invention (see FIG. 18D), the PPD still reached 2.15 W/cm$^2$. Fuel cell conditions with backpressure are much more complex than those without backpressure. In practice, a fuel cell at a flow rate of 100/100 mL/min exhibits a PPD similar to or higher than that of a cell at a flow rate of 1000/1000 mL/min.

4. Effect of Feed Gas

Figure 21:
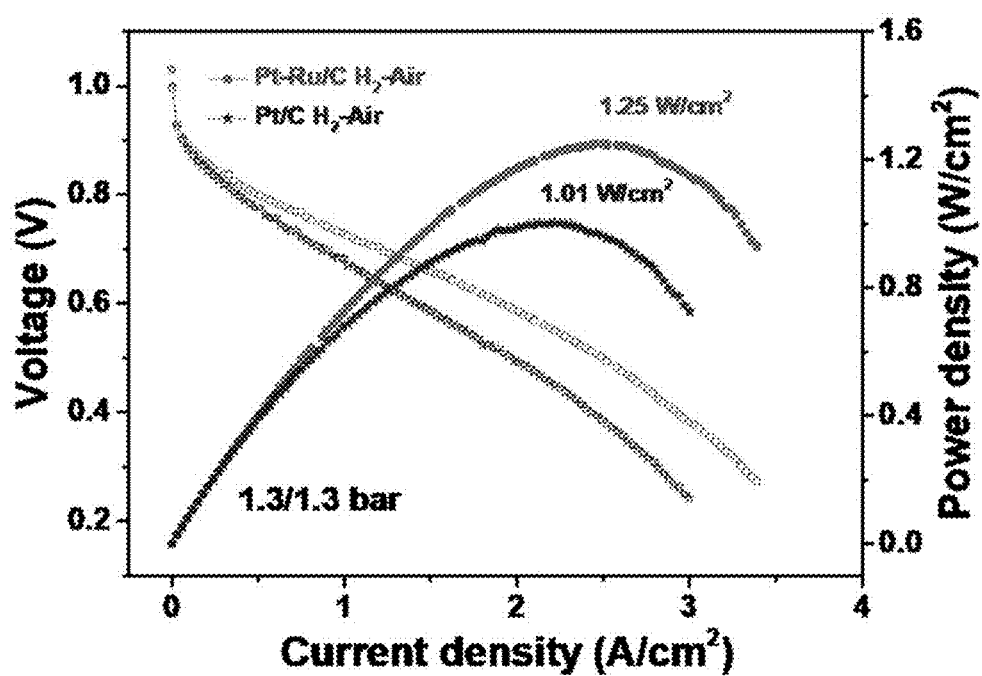
FIG. 21 shows the performances of fuel cells (anode catalyst: Hispec Pt/C, A/C flow rate: 1000/2000 mL/min, A/C backpressure: 1.3/1.3 bar, A/C catalyst content: 0.42 mg/cm²) based on different cathode catalysts (Hispec Pt—Ru/C and Pt/C) at 80° C. under H₂-air conditions.

Anion exchange membrane fuel cells operating in H$_2$/air have not much been investigated. FIG. 21 shows the performances of fuel cells (anode catalyst: Hispec Pt/C, A/C flow rate: 1000/2000 mL/min, A/C backpressure: 1.3/1.3 bar, A/C catalyst content: 0.42 mg/cm$^2$) based on different cathode catalysts (Hispec Pt—Ru/C and Pt/C) at 80° C. under H$_2$-air conditions.

The optimized cell supplied with H$_2$/air reached a PPD of 1.25 W/cm$^2$ based on Pt—Ru/C and a PPD of ≥1 W/cm$^2$ based on Hispec Pt/C at 80° C., as shown in FIG. 21. These PPD values are higher than those of cells under H$_2$/air conditions that are currently being studied. It has also been reported that a high content of Pt—Ru/C leads to a significant improvement in power density, which is also well shown in FIG. 18C. That is, the PPDs of the PFTP and PFBP-based fuel cells can be further improved with increasing catalyst content.

5. Ex-Situ and In-Situ Durability

The above results show that the PFTP membrane fabricated in Example 5 exhibits high ion conductivity and good dimensional stability. That is, a trade-off relationship between IEC or ion conductivity and dimensional stability of the anion exchange polymer was verified. The PPD of a polyfluorene-based fuel cell can easily exceed 2 W/cm$^2$ with Pt—Ru/C at 80° C. Therefore, the in-situ durability problem associated with membrane electrode assemblies is currently being focused on by the research community. Many reports demonstrated that ex-situ durability is not consistent with in-situ durability.

Figure 22A:
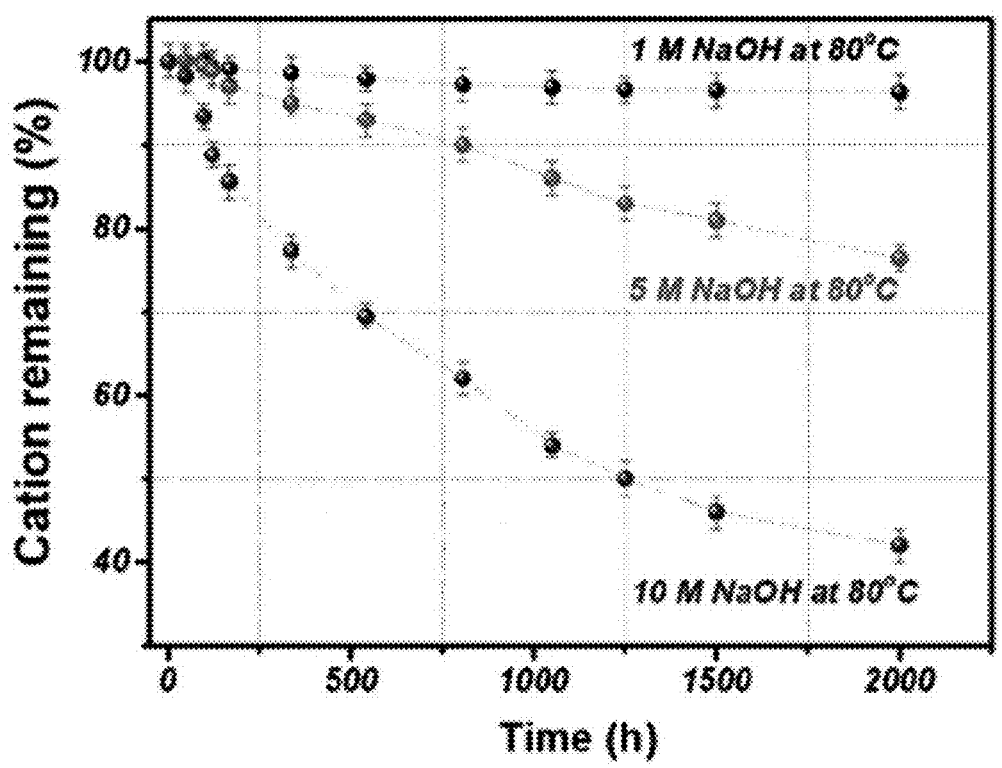
FIGS. 22A and 22B show the alkaline stability of a PFTP membrane fabricated in Example 5 under alkaline conditions: PFTP cations remaining under different alkaline conditions, which were detected by ¹H NMR (FIG. 22A), and predicted half-lives of PFTP in 1 M and 5 M NaOH at 80° C.
Figure 22B:
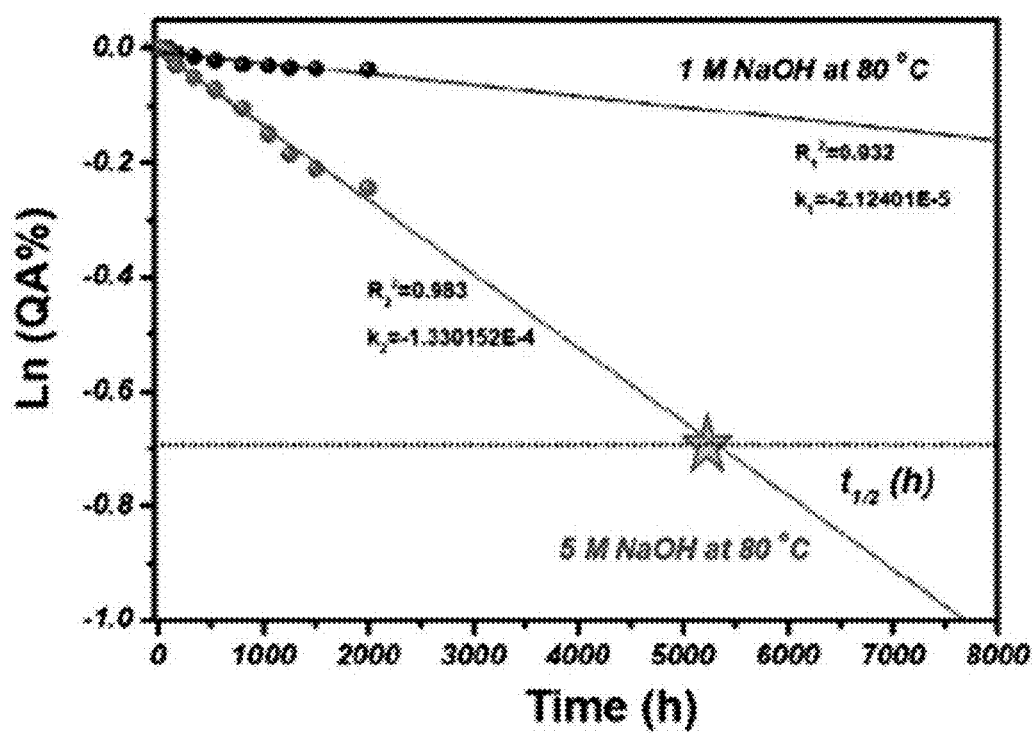

FIGS. 22A and 22B show the alkaline stability of the PFTP membrane fabricated in Example 5 under alkaline conditions: PFTP cations remaining under different alkaline conditions, which were detected by $^1$H NMR (FIG. 22A), and predicted half-lives of PFTP in 1 M and 5 M NaOH at 80° C. (FIG. 22B), FIG. 23 shows a $^1$H NMR spectrum and an actual image of the PFTP membrane after alkaline treatment in 1 M NaOH at 80° C. for 2000 hours, and FIG. 24 shows a $^1$H NMR spectrum and an actual image of the PFTP membrane after alkaline treatment in 5 M NaOH at 80° C. for 1500 hours.

Figure 23:
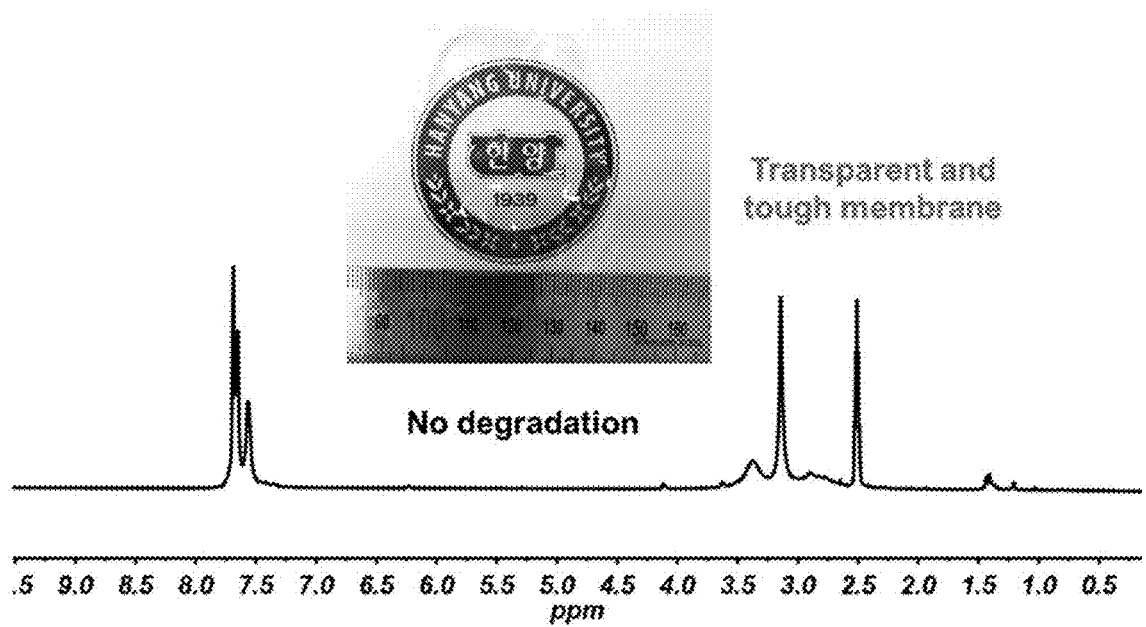
FIG. 23 shows a ¹H NMR spectrum and an actual image of a PFTP membrane fabricated in Example 5 after alkaline treatment in 1 M NaOH at 80° C. for 2000 hours.
Figure 24:
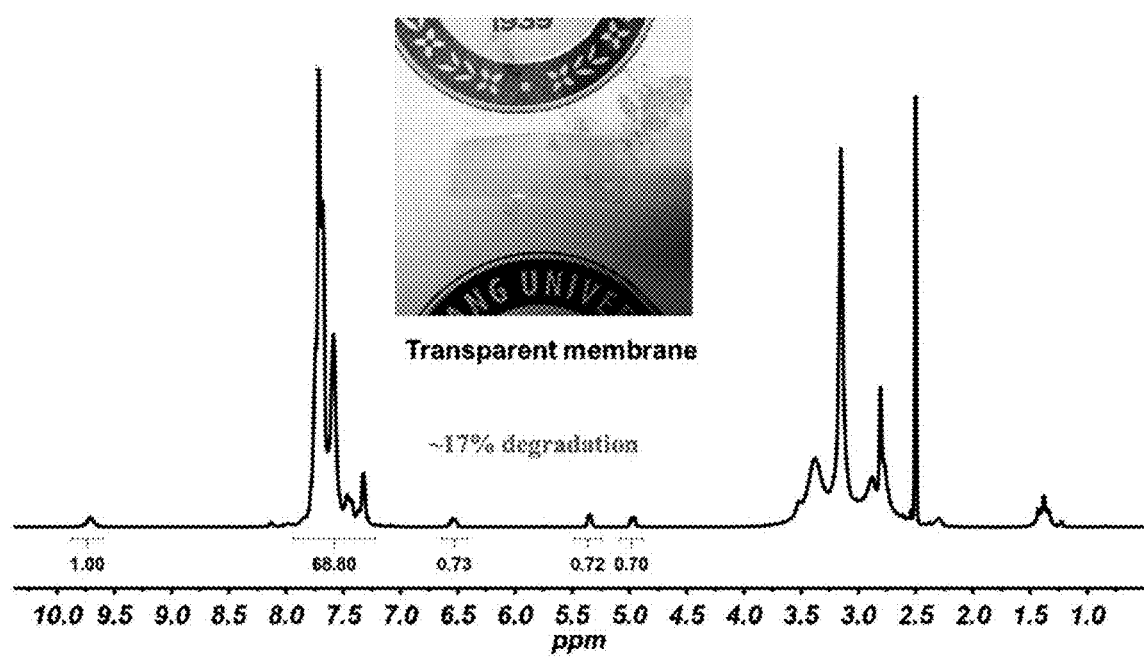
FIG. 24 shows a ¹H NMR spectrum and an actual image of a PFTP membrane fabricated in Example 5 after alkaline treatment in 5 M NaOH at 80° C. for 1500 hours.
Figure 25:
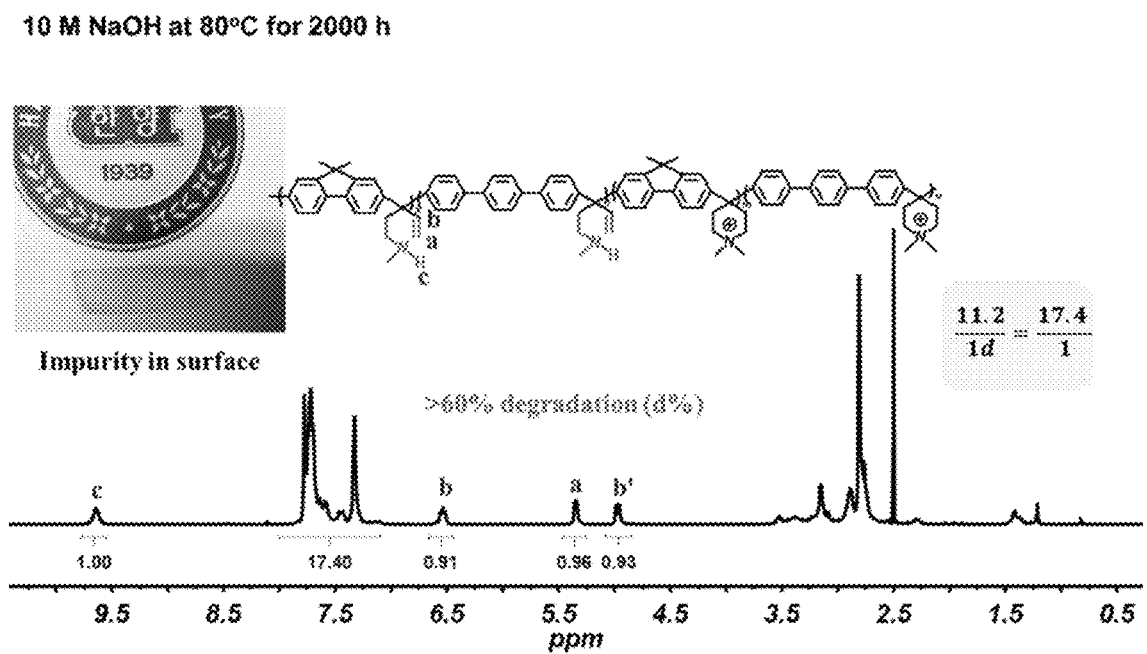
FIG. 25 shows a ¹H NMR spectrum and an actual image of a PFTP membrane fabricated in Example 5 after alkaline treatment in 10 M NaOH at 80° C. for 2000 hours.
Figure 26:
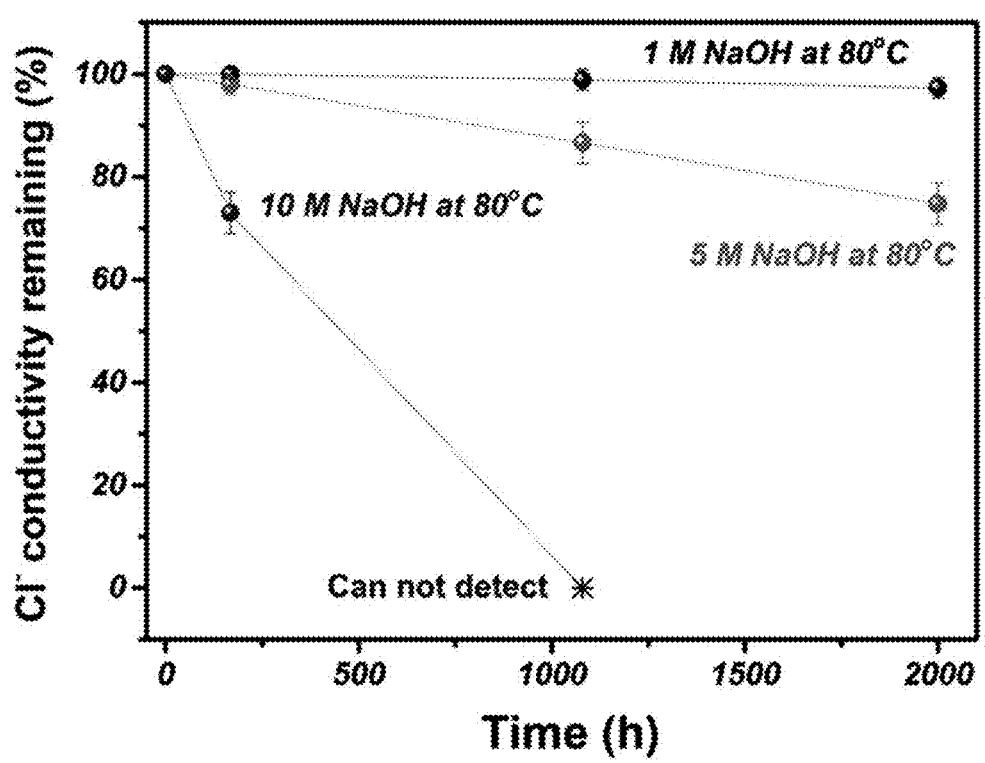
FIG. 26 shows changes in the Cl⁻ conductivity of a PFTP membrane fabricated in Example 5 after being soaked in different alkaline conditions at 80° C. for different times.
Figure 27A:
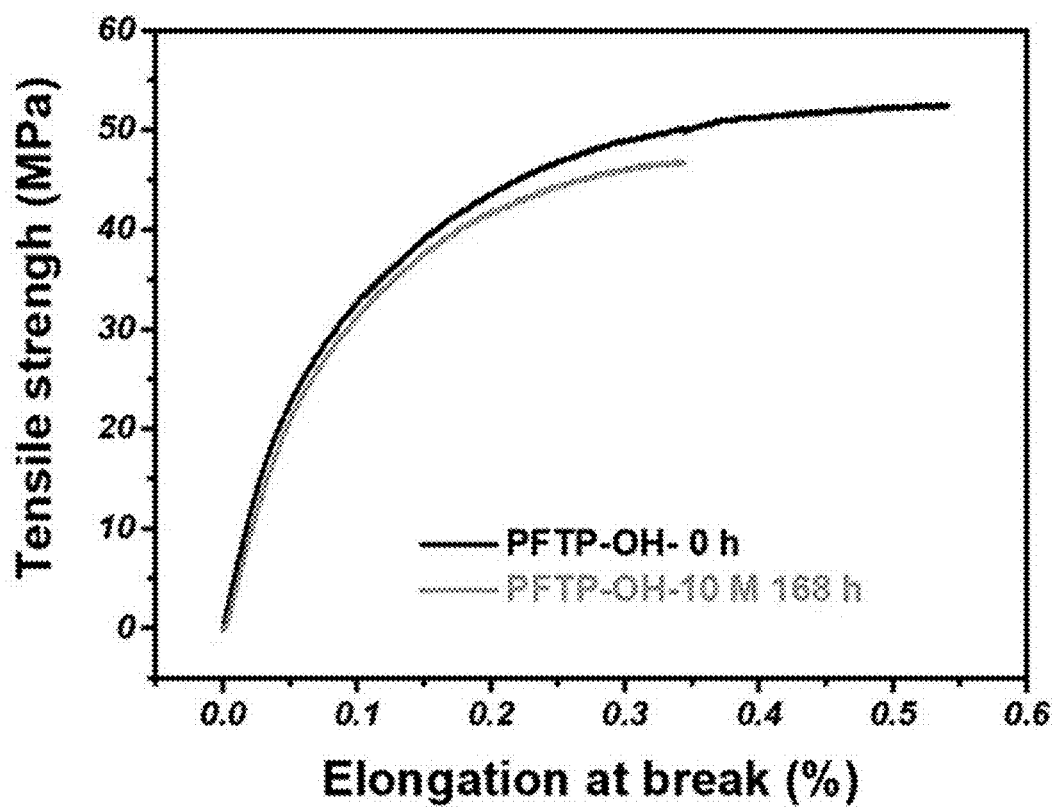
FIG. 27A shows mechanical properties of a hydrated PFTP membrane (OH⁻ form) fabricated in Example 5 and FIG. 27B shows thermal stability of the PFTP membrane after being soaked in 10 M NaOH at 80° C. for 168 hours.
Figure 27B:
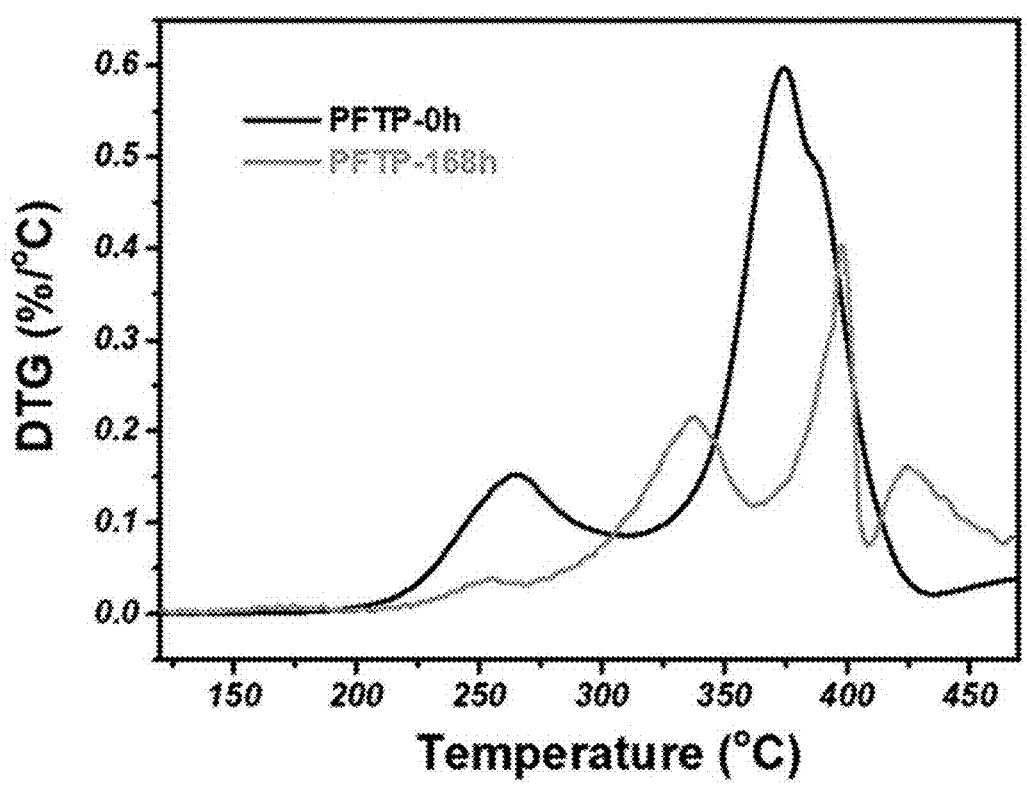

As shown in FIG. 22A, FIG. 23, and FIG. 24, the PFTP membrane was very stable in 1 M NaOH and 5 M NaOH at 80° C. for 2000 h. According to recent high-throughput testing of state-of-the-art anion exchange membranes by the U.S. National Renewable Energy Laboratory (NREL), most of the anion exchange membranes showed severe deformation and even exhibited fracture along with color changes after testing in 1 M KOH at 80° C. for 1000 h. However, the inventive PFTP membrane maintained its transparent and mechanical toughness after testing in 1 M NaOH at 80° C. for 2000 h (see FIG. 23) and did not undergo obvious piperidinium decomposition, which was confirmed by $^1$H NMR spectroscopy. A performance deterioration (~20%) was observed in 5 M NaOH at 80° C. for 2000 h. In practice, however, PFTP was unstable in 10 M NaOH at 80° C. and apparent degradation of dimethylpiperidinium (DMP) groups was detected within 168 h (see FIGS. 25 and 26). More than 60% of the DMP groups were degraded after 2000 h in 10 M NaOH at 80° C. After 1000 h, the Cl$^-$ conductivity was too low to record. The change in ion conductivity does not always coincide with the change in the chemical structure of the cationic groups. The loss of ion conductivity is usually slightly greater than the degradation of the ammonium groups. As shown in FIGS. 27A and 27B. the mechanical properties and TGA of PFTP showed significant decreases after immersion in 10 M NaOH at 80° C. for 168 h. The performance deterioration of the anion exchange polymer is associated not only with the piperidinium groups but also with the aging of the backbone, which impairs the mechanical properties.

FIG. 22B shows predicted half-lives ($t_{1/2}$) of PFTP in 1 M and 5 M NaOH at 80° C. from the equation: $\ln(QA\%) = k \times t$, where QA % is the ratio of the content of piperidinium remaining in the membrane after testing to the initial content, k is the degradation constant, and t is the cycle. The $t_{1/2}$ of PFTP is greater than 30,000 h in 1 M NaOH at 80° C. and greater than 5000 h in 5 M NaOH.

Figure 28A:
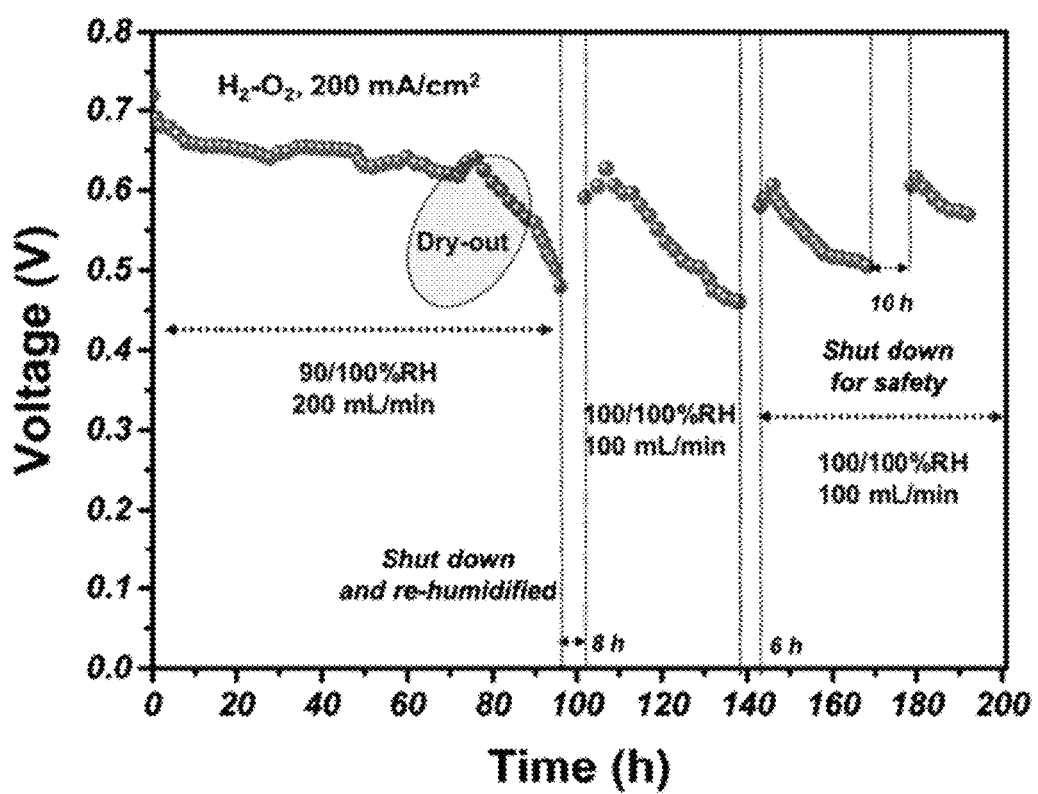
FIG. 28A shows in-situ stability of a membrane electrode assembly measured at 0.2 A/cm² for 168 hours.
Figure 28B:
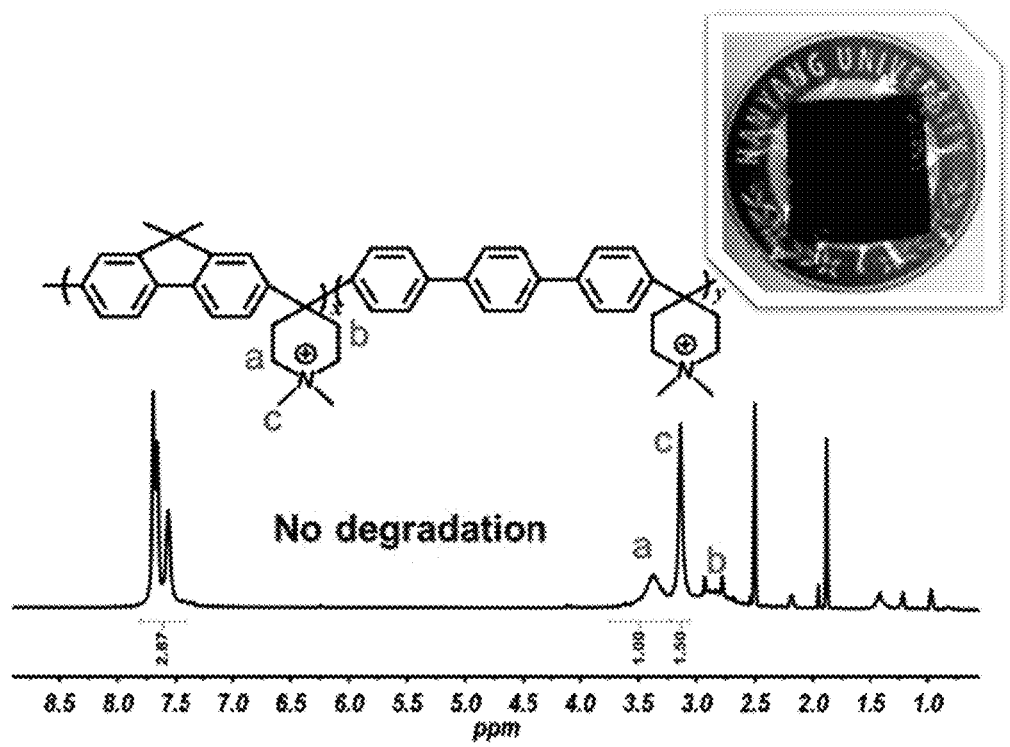
FIG. 28B shows ¹H NMR spectrum and actual image of a PFTP-based membrane electrode assembly measured at 0.2 A/cm² for 168 hours.
Figure 28C:
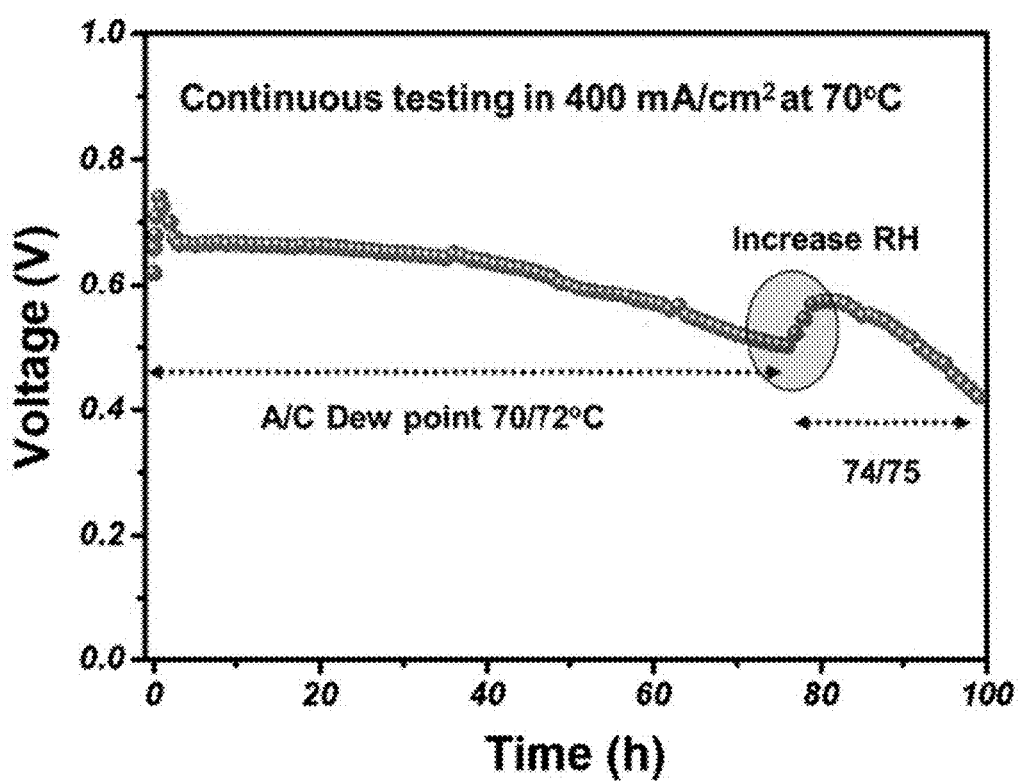
FIG. 28C shows in-situ stability of a membrane electrode assembly measured at 0.4 A/cm² for 100 hours.

FIGS. 28A to 28D and 29 show the in-situ durabilities of cells operating in H$_2$—O$_2$, which were measured at current densities of 0.2 A/cm$^2$ and 0.4 A/cm$^2$ at low gas flow rates (100-200 mL/min). PFTP was almost stable at 0.2 A/cm$^2$ for 100 h. However, the voltage loss of the cell suddenly increased after 100 h. When the cell was humidified again, the voltage was recovered to 0.6 V, with a loss of 10-20%, after testing for 168 h (see FIG. 28A). As shown in FIG. 28C, the cell tended to dry-out because a larger voltage loss was detected at 0.4 A/cm$^2$ than at 0.2 A/cm$^2$. In contrast, the commercial FAA-3-20 membrane-based single cell showed a dramatic voltage loss at 0.2 A/cm$^2$ within 2 days (see FIG. 29). Keeping in mind the fact that water management is very important in H$_2$—O$_2$ conditions, it was found that a slight change in RH could lead to a large voltage loss during testing using the polymer with high IEC. The single cell tended to dry-out because the measurement was performed with the moisture-sensitive anion exchange ionomer. When these membrane electrode assemblies were examined after in situ durability testing at 0.2 A/cm$^2$ for 168 h and the membrane and ionomer were re-degraded with DMSO-d$_6$, no signs of deterioration were detected in the $^1$H NMR spectra of the membrane electrode assemblies (see FIG.

Figure 28D:
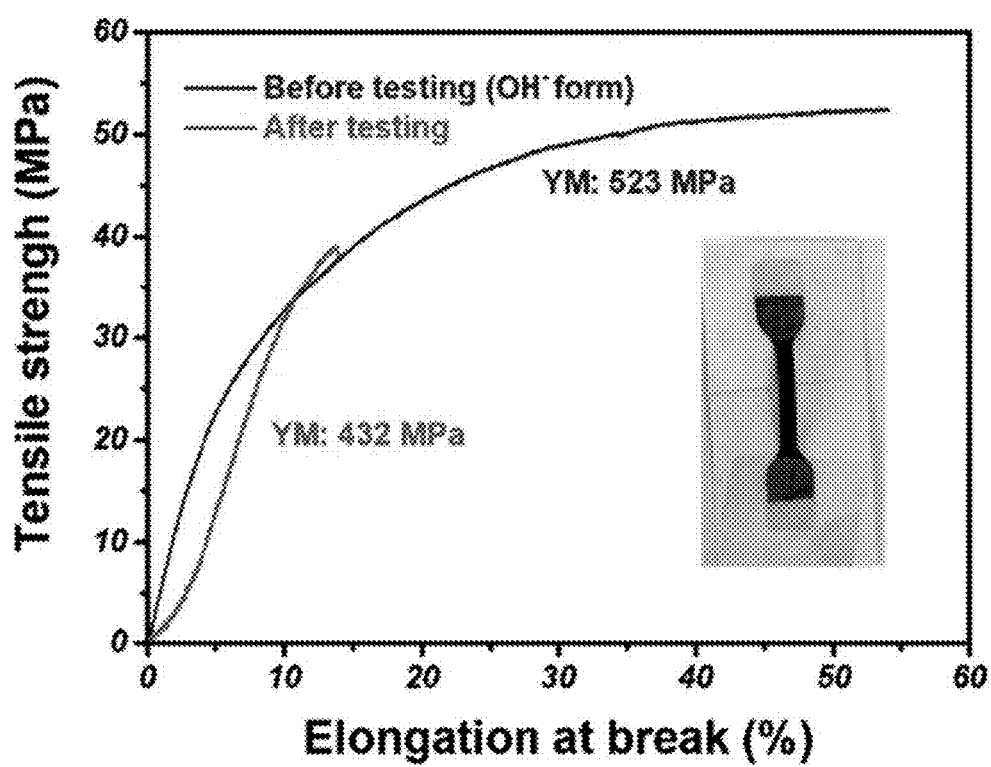
FIG. 28D shows physical properties and an actual image of a PFTP-based membrane electrode assembly measured at 0.4 A/cm² for 100 hours.
Figure 29:
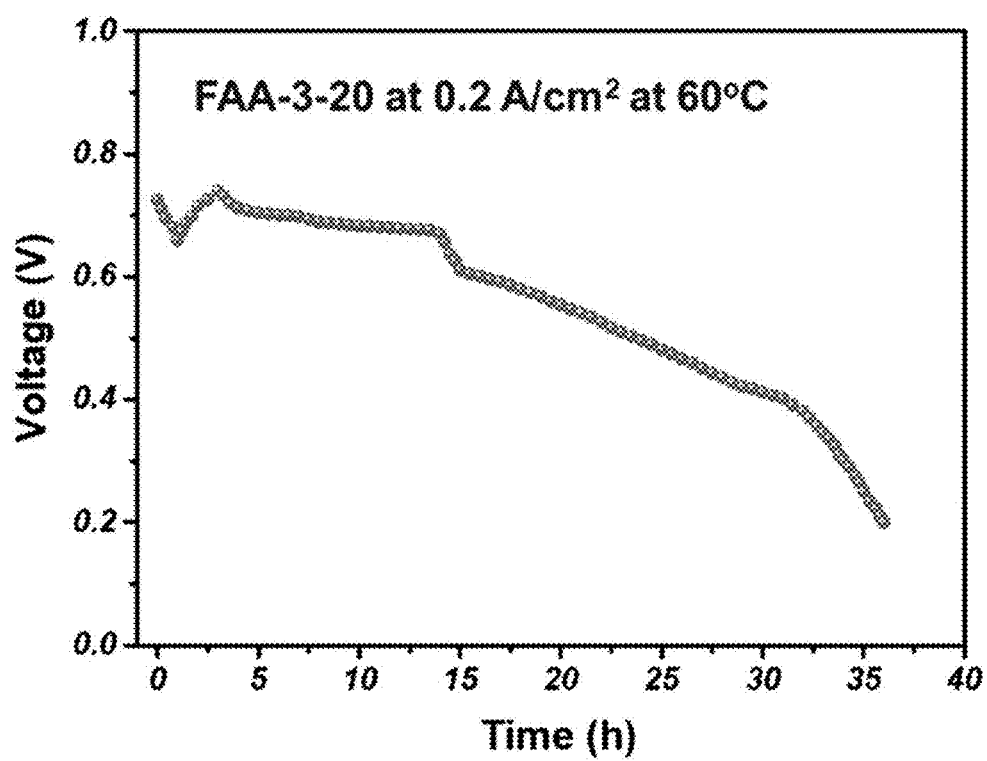
FIG. 29 shows the in-situ durability of a commercial FAA-2-30-based membrane electrode assembly (0.2 A/cm², 60° C., flow rate 200/200 mL/min, without backpressure).
Figure 30A:
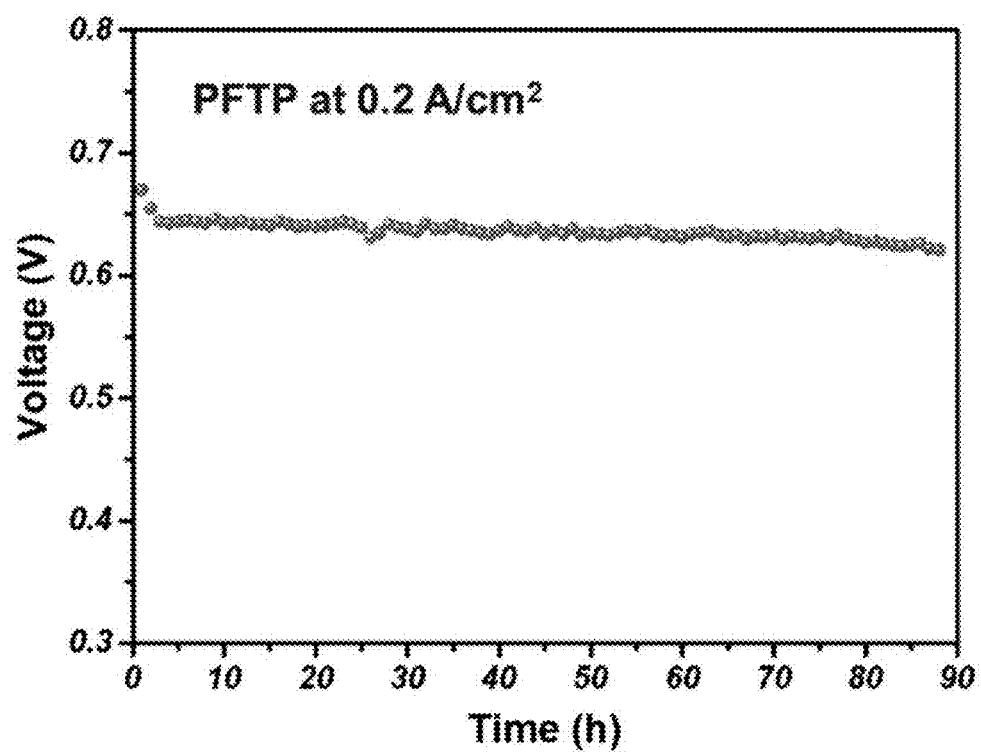
FIG. 30A shows in-situ durability of a cell after I-V testing at 0.2 A/cm² and 70° C. for 1 hour
Figure 30B:
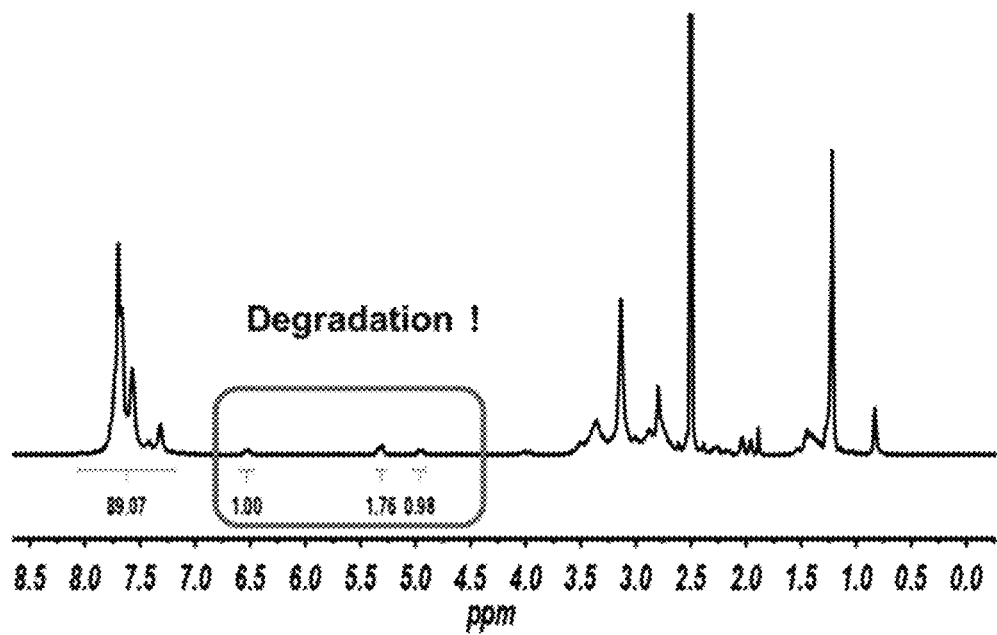
FIG. 30B shows 1H NMR spectrum of a PFTP-based membrane electrode assembly after I-V testing at 80° C. from 0 to 5 A/cm² at a scan rate of 0.1 mA/cm² for 1 hour (subsequently, the cell was tested for in-situ durability at 0.2 mA/cm² at 60° C. for 120 hours).

28C). Interestingly, however, a ¹H NMR spectrum after I-V testing from 0 to 5 A/cm² at a scan rate of 0.1 A/cm² for ~20 cycles (~1 h) and in-situ durability testing revealed that the DMP groups were degraded (see FIGS. 30A and 30B). The in-situ durability testing also showed that the anion exchange membrane was readily decomposed at high current densities above 5 A/cm². The mechanical properties of the membrane electrode assembly were also investigated after testing at 0.4 A/cm² for 120 h. As shown in FIG. 28D, the tensile strength, elongation at break, and Young's modulus of the PFTP membrane after the in-situ durability test for 120 h showed losses of ~25%, ~70%, and ~20%, respectively, compared to those of a general PFTP membrane.

In fact, the in-situ stability of current membranes is still not good enough compared to commercial PTFE-reinforced PNB and BTMA-HDPE membranes due to an unknown voltage loss. However, PTFE-reinforced PNB and BTMA-HDPE membranes are based on commercial pre-formed films or PTFE reinforcement, and support-free PFTP membranes already show ≥168 h in-situ durability. According to the present invention, in-situ stability is closely related to mechanical properties and water control. It is expected that in-situ stability will be further improved by reinforcing the anion exchange membrane and optimizing the water content of the anion exchange ionomer.

The invention claimed is:

1. A polyfluorene-based ionomer having repeating units, represented by Formula 1:

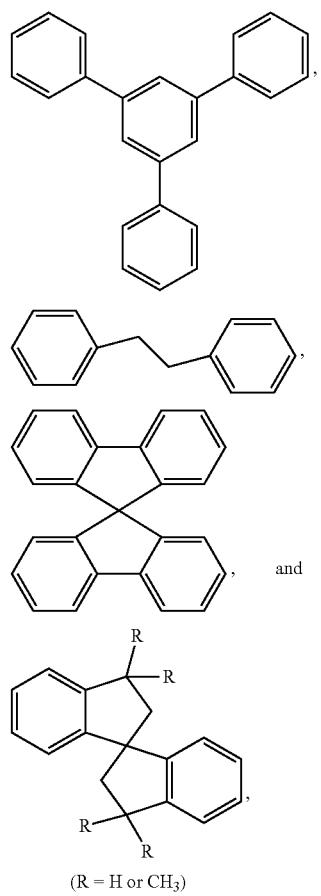

wherein the segments A, B, C, and D are identical to or different from each other and are each independently selected from

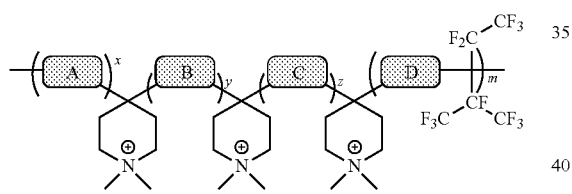

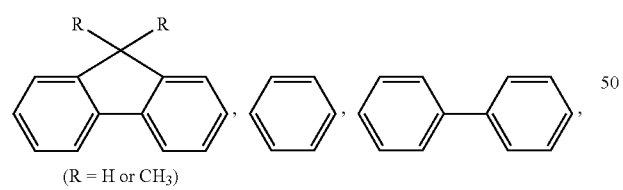

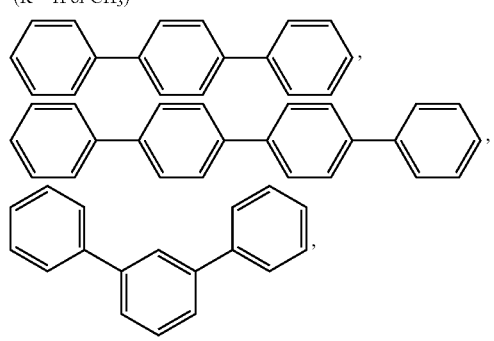

(R = H or CH₃)

with the proviso that at least one of the segments is

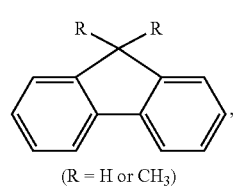

(R = H or CH₃)

and the sum of x, y, z, and m representing the mole fractions of the corresponding repeating units is 1.

2. A method for preparing a polyfluorene-based ionomer, comprising: (I) dissolving fluorene or 9,9'-dimethylfluorene and 1-methyl-4-piperidone or fluorene or 9,9'-dimethylfluorene, 1-methyl-4-piperidone, and a compound selected from

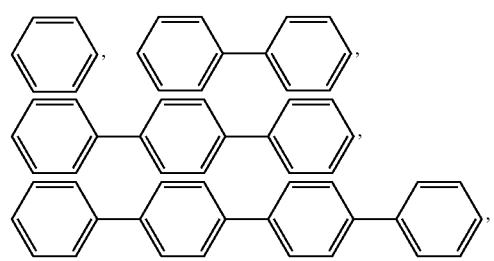

or 1,1,1,2,2,4,5,5,5-nonafluoro-4-(trifluoromethyl)-3-pentanone as a comonomer in an organic solvent to form a solution; (II) adding a strong acid catalyst to the solution and allowing the solution to react with stirring; (III) precipitating the solution to obtain a precipitate and washing and drying the precipitate to obtain a solid polymer; (IV) dissolving the solid polymer in an organic solvent to form a polymer solution, adding $K_2CO_3$ and an excess of a halomethane to the polymer solution, and allowing the polymer solution to react to form quaternary piperidinium salts; and (V) precipitating the polymer solution to obtain a precipitate and washing and drying the precipitate.

3. The method according to claim 2, wherein in step (I), the organic solvent comprises at least one halogenated solvent selected from the group consisting of dichloromethane, chloroform, dichloroethane, dibromomethane, and tetrachloroethane.

4. The method according to claim 2, wherein in step (II), the strong acid catalyst comprises at least one of trifluoroacetic acid, trifluoromethanesulfonic acid, pentafluoroethanesulfonic acid, heptafluoro-1-propanesulfonic acid, perfluoropropionic acid, heptafluorobutyric acid, or a mixture thereof.

5. The method according to claim 2, wherein in step (IV), the organic solvent comprises a mixture of at least one of N-methylpyrrolidone, dimethylacetamide, dimethyl sulfoxide or dimethylformamide, and trifluoroacetic acid as a cosolvent.

6. The method according to claim 2, wherein in step (IV), the halomethane comprises at least one of fluoromethane, chloromethane, bromomethane or iodomethane.

7. An anion exchange membrane comprising the polyfluorene-based ionomer according to claim 1.

8. A method for fabricating an anion exchange membrane, comprising: (a) dissolving the polyfluorene-based ionomer according to claim 1 in an organic solvent to form a polymer solution; (b) casting and drying the polymer solution on a glass plate to obtain a membrane; and (c) treating the membrane with 1 M NaOH, 1 M NaCl or 1 M $Na_2CO_3$, followed by washing the membrane with ultrapure water and drying the membrane.

9. The method according to claim 8, wherein the organic solvent comprises at least one of N-methylpyrrolidone, dimethylacetamide, dimethyl sulfoxide or dimethylformamide.

10. The method according to claim 8, wherein the polymer solution has a concentration of 2 to 5% by weight.

11. The method according to claim 8, wherein in step (b), the drying is performed by heating in an oven at 80 to 90° C. for 24 hours to remove the organic solvent and heating in a vacuum oven at 120 to 150° C. for 24 hours to remove the organic solvent.

12. A binder for an alkaline fuel cell comprising the polyfluorene-based ionomer according to claim 1.

13. A membrane electrode assembly for an alkaline fuel cell comprising the anion exchange membrane according to claim 7.

14. An alkaline fuel cell comprising the anion exchange membrane according to claim 7.

15. A water electrolysis device comprising the anion exchange membrane according to claim 7.

* * * * *